(12) United States Patent
Taguchi et al.

(10) Patent No.: US 10,624,002 B2
(45) Date of Patent: Apr. 14, 2020

(54) COMMUNICATION SYSTEM

(71) Applicant: Mitsubishi Electric Corporation, Chiyoda-ku (JP)

(72) Inventors: Taiki Taguchi, Tokyo (JP); Mitsuru Mochizuki, Tokyo (JP); Kuniyuki Suzuki, Tokyo (JP); Haruka Nozawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/761,653

(22) PCT Filed: Nov. 2, 2016

(86) PCT No.: PCT/JP2016/082549
§ 371 (c)(1),
(2) Date: Mar. 20, 2018

(87) PCT Pub. No.: WO2017/078057
PCT Pub. Date: May 11, 2017

(65) Prior Publication Data
US 2018/0352481 A1      Dec. 6, 2018

(30) Foreign Application Priority Data

Nov. 4, 2015  (JP) ................................ 2015-216759

(51) Int. Cl.
*H04W 36/00*       (2009.01)
*H04W 72/04*       (2009.01)
(Continued)

(52) U.S. Cl.
CPC ...... *H04W 36/0011* (2013.01); *H04W 36/023* (2013.01); *H04W 36/08* (2013.01);
(Continued)

(58) Field of Classification Search
None
See application file for complete search history.

(56) References Cited

U.S. PATENT DOCUMENTS

2016/0029376 A1* 1/2016 Fukuta ............. H04W 72/0426
370/329
2016/0227459 A1* 8/2016 Fujishiro ............... H04W 16/32
(Continued)

FOREIGN PATENT DOCUMENTS

| JP | 2006-140844 A | 6/2006 |
|---|---|---|
| WO | WO 2014/090283 A1 | 6/2014 |
| WO | WO 2014/148874 A1 | 9/2014 |

OTHER PUBLICATIONS

International Search Report dated Jan. 31, 2017, in PCT/JP2016/082549 filed Nov. 2, 2016.
(Continued)

*Primary Examiner* — Diane L Lo
(74) *Attorney, Agent, or Firm* — Oblon, McClelland, Maier & Neustadt, L.L.P.

(57) ABSTRACT

In a communication system, a UE and an MeNB perform both a direct communication and a communication through a SeNB. Along with moving of the UE, a handover process of switching the MeNB to which the UE is connected, from an S-MeNB to a T-MeNB is performed. The connection between the UE and the SeNB is maintained during the handover process. The UE starts transmitting data to the SeNB before a communication path between the UE and the MeNB is changed from a path formed by the S-MeNB and the UE to a path formed by the T-MeNB and the UE.

4 Claims, 48 Drawing Sheets

(51) Int. Cl.
 H04W 36/02 (2009.01)
 H04W 36/08 (2009.01)
 H04W 16/32 (2009.01)
 H04W 84/04 (2009.01)
(52) U.S. Cl.
 CPC ............ *H04W 72/04* (2013.01); *H04W 16/32* (2013.01); *H04W 36/0069* (2018.08); *H04W 84/045* (2013.01)

(56) References Cited

U.S. PATENT DOCUMENTS

2016/0286449 A1    9/2016  Choi et al.
2016/0373972 A1*  12/2016  Vesely .............. H04W 36/0033
2018/0041932 A1*   2/2018  Mitsui .................. H04W 16/32

OTHER PUBLICATIONS

ZTE Corporation, Discussion on Handover Procedure for Small Cell [online], 3GPP TSG-RAN WG2 #85 R2-140114, (2014), Agenda Item: 7.2.1, 6 pages.
3GPP TS36.300 V13.0.0, 3$^{rd}$ Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2, (Release 13), (2015), 254 pages.
3GPP TSG-SA1 #42, S1-083461, "LS on HNB/HeNB Open Access Mode", Work Item: EHNB, (2008), 2 pages.
3GPP TR 36.814 V9.0.0, 3$^{rd}$ Generation Partnership Project; Technical Specification Group Radio Access Network; Evolved Universal Terrestrial Radio Access (E-UTRA); Further Advancements for E-Utra Physical Layer Aspects (Release 9), (2010), 104 pages.
3GPP TR 36.912 V10.0.0, 3$^{rd}$ Generation Partnership Project; Technical Specification Group Radio Access Network; Feasibility Study for Further Advancements for E-UTRA (LTE-Advanced) (Release 10), (2011), 252 pages.
3GPP TR 36.819 V11.2.0, 3$^{rd}$ Generation Partnership Project; Technical Specification Group Radio Access Network; Coordinated Multi-Point Operation for LTE Physical layer Aspects (Release 11), (2013), 70 pages.
3GPP TR 36.842 V12.0.0, 3$^{rd}$ Generation Partnership Project; Technical Specification Group Radio Access Network; Study on Small Cell Enhancements for E-UTRA and E-UTRAN; Higher Layer Aspects (Release 12), (2013), 71 pages.
3GPP TS 36.141 V13.0.0, 3$^{rd}$ Generation Partnership Project; Technical Specification Group Radio Access Network; Evolved Universal Terrestrial Radio Access (E-UTRA); Base Station (BS) Conformance Testing, (Release 13), (2015), 266 pages.
3GPP TR 36.875 V13.0.0, 3$^{rd}$ Generation Partnership Project; Technical Specification Group Radio Access Network; Evolved Universal Terrestrial Radio Access Network (E-UTRAN); Extension of Dual Connectivity in E-UTRAN, (Release 13), (2015), 38 pages.
3GPP TSG-RAN WG2 Meeting #90, Tdoc R2-152359, "BSR Trigger for Uplink Split Bearer", (2015), Agenda Item: 7.9, 2 pages.
3GPP TSG-RAN WG2 Meeting #89bis, R2-151180, "User Plane Enhancement for Uplink Bearer Split", (2015), Agenda Item: 7.9, 8 pages.
3GPP TSG-RAN WG2 Meeting #90, R2-152338, "Preventing Over-Scheduling with Double Reporting", LG Electronics, (2015), Agenda Item: 7.9, 2 pages.
International Preliminary Report on Patentability and Written Opinion dated May 17, 2018 PCT/JP2016/082549 with English translation.
Extended European Search Report dated May 2, 2019 in Patent Application No. 16862117.5, 10 pages.

* cited by examiner

F I G . 1
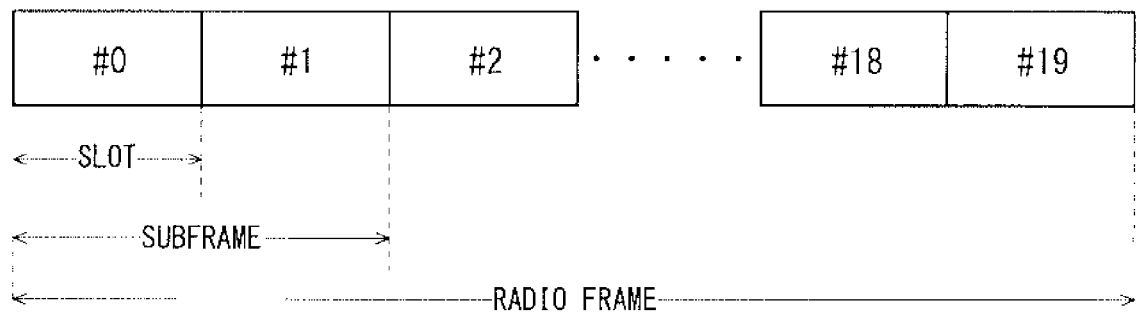

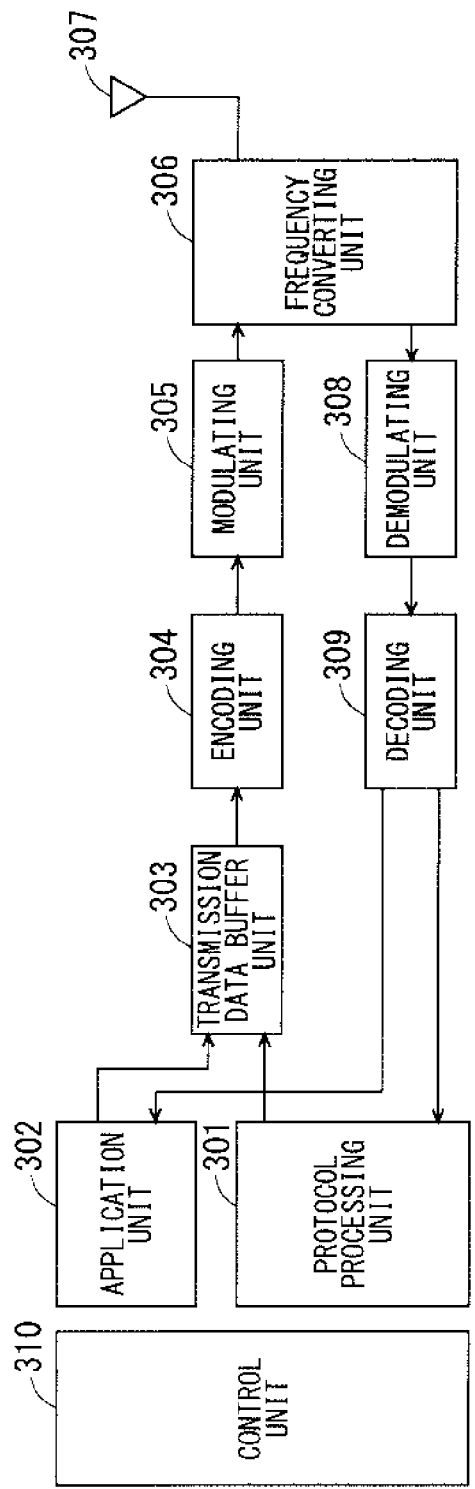

F I G. 4

203

- 401 EPC COMMUNICATION UNIT
- 402 COMMUNICATION WITH ANOTHER BASE STATION UNIT
- 403 PROTOCOL PROCESSING UNIT
- 404 TRANSMISSION DATA BUFFER UNIT
- 405 ENCODING UNIT
- 406 MODULATING UNIT
- 407 FREQUENCY CONVERTING UNIT
- 408 (antenna)
- 409 DEMODULATING UNIT
- 410 DECODING UNIT
- 411 CONTROL UNIT F I G. 5
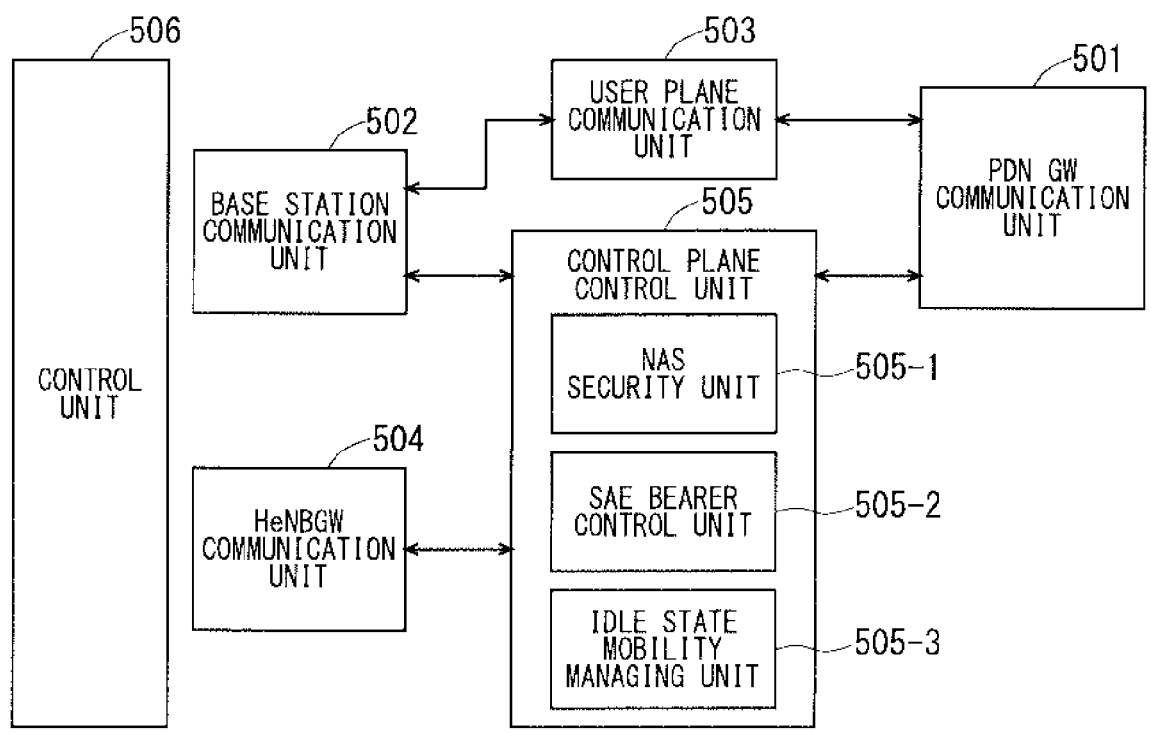

F I G. 6
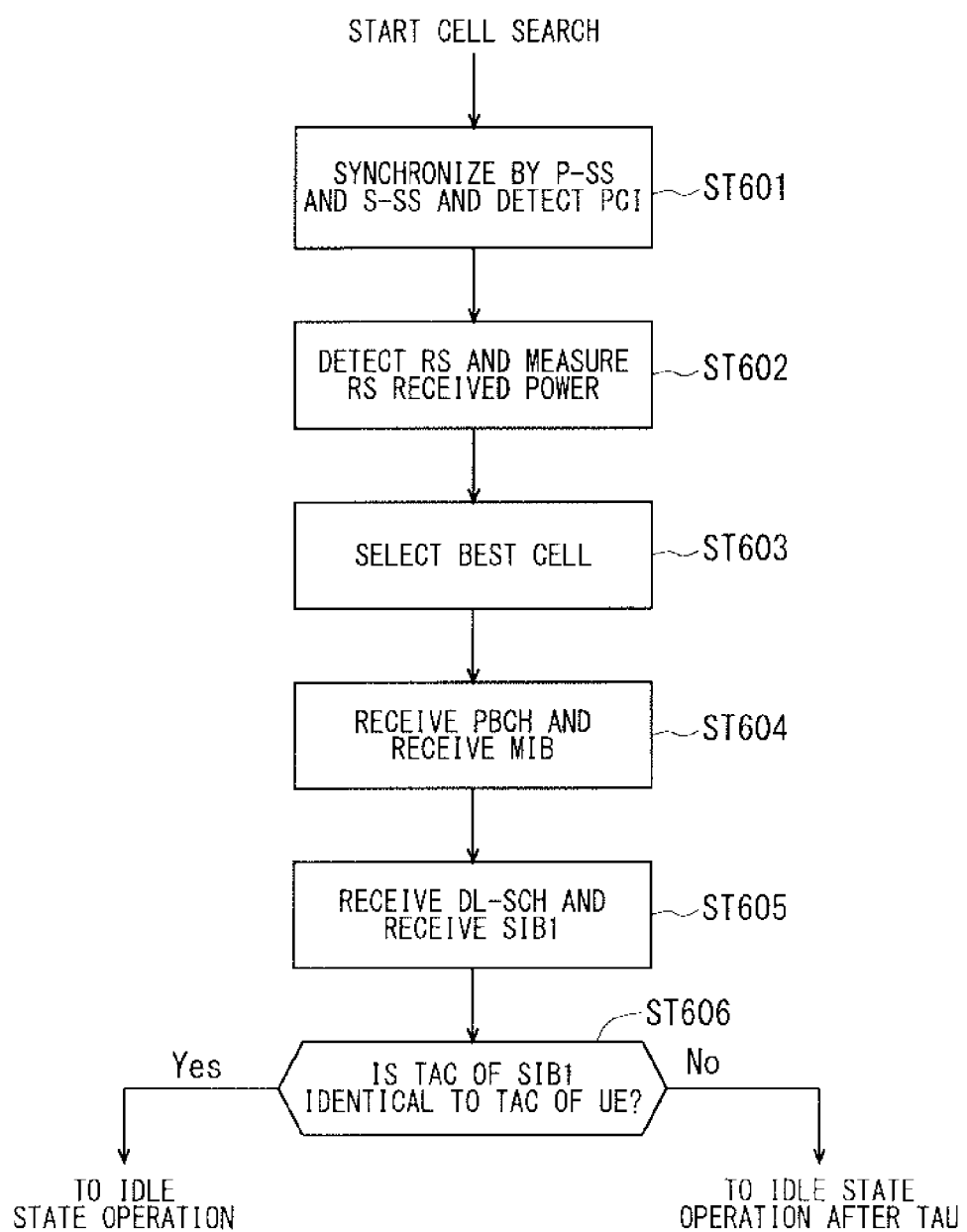

F I G. 7
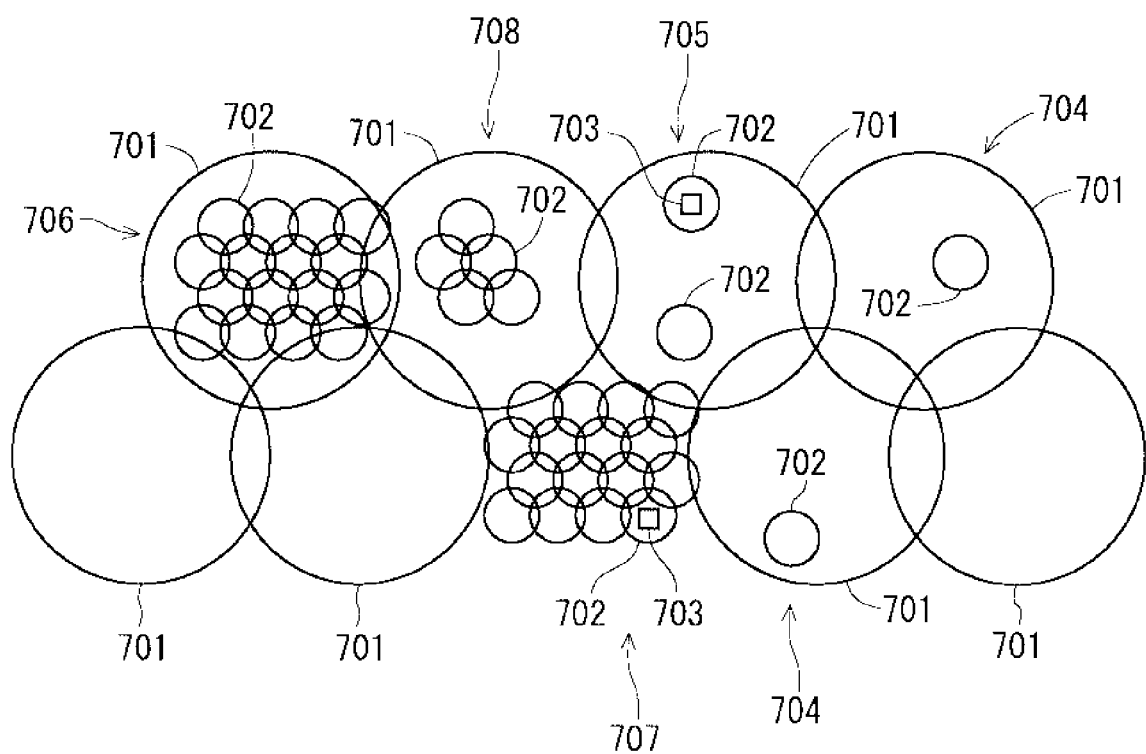

F I G. 9
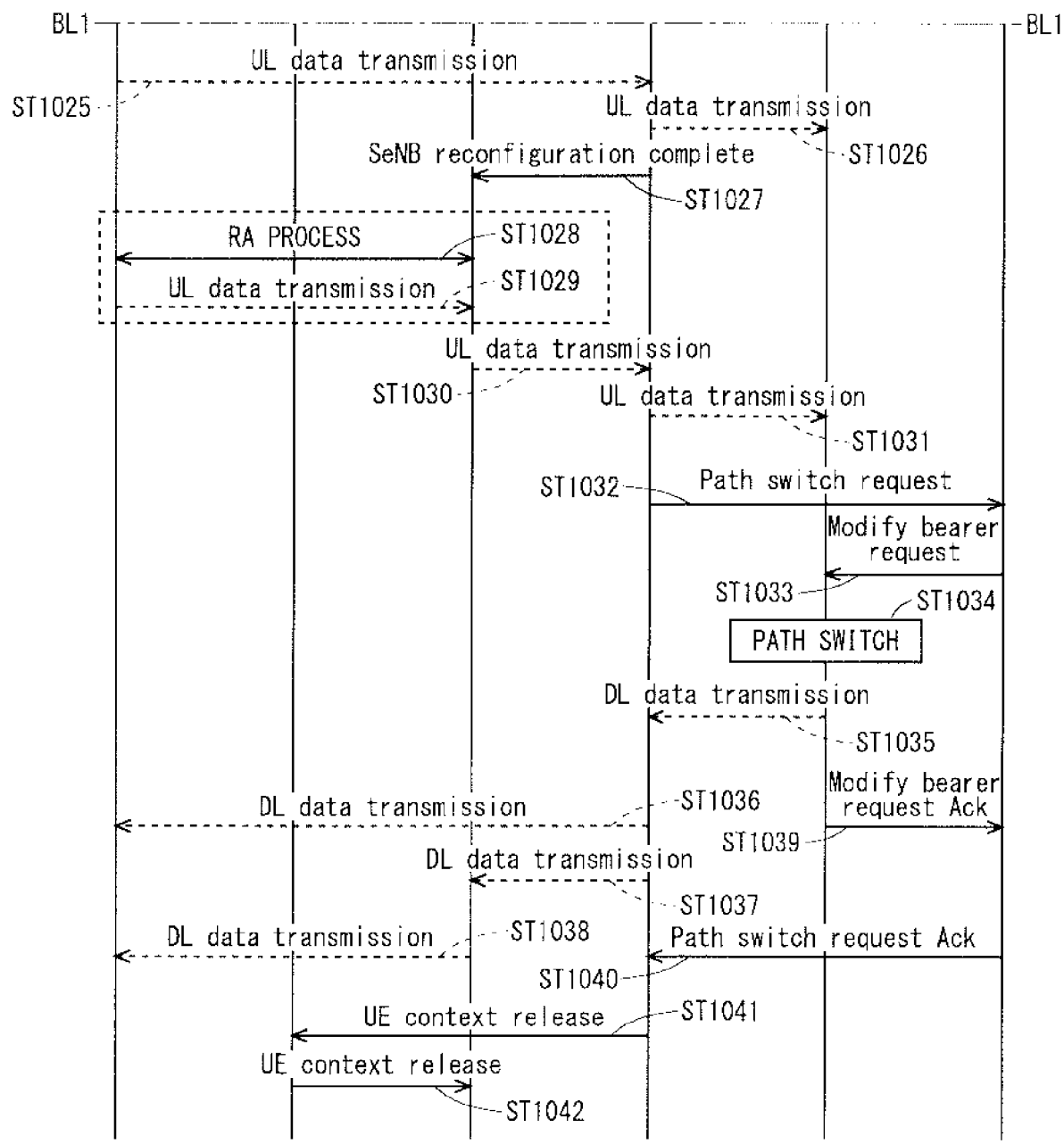

F I G . 1 1
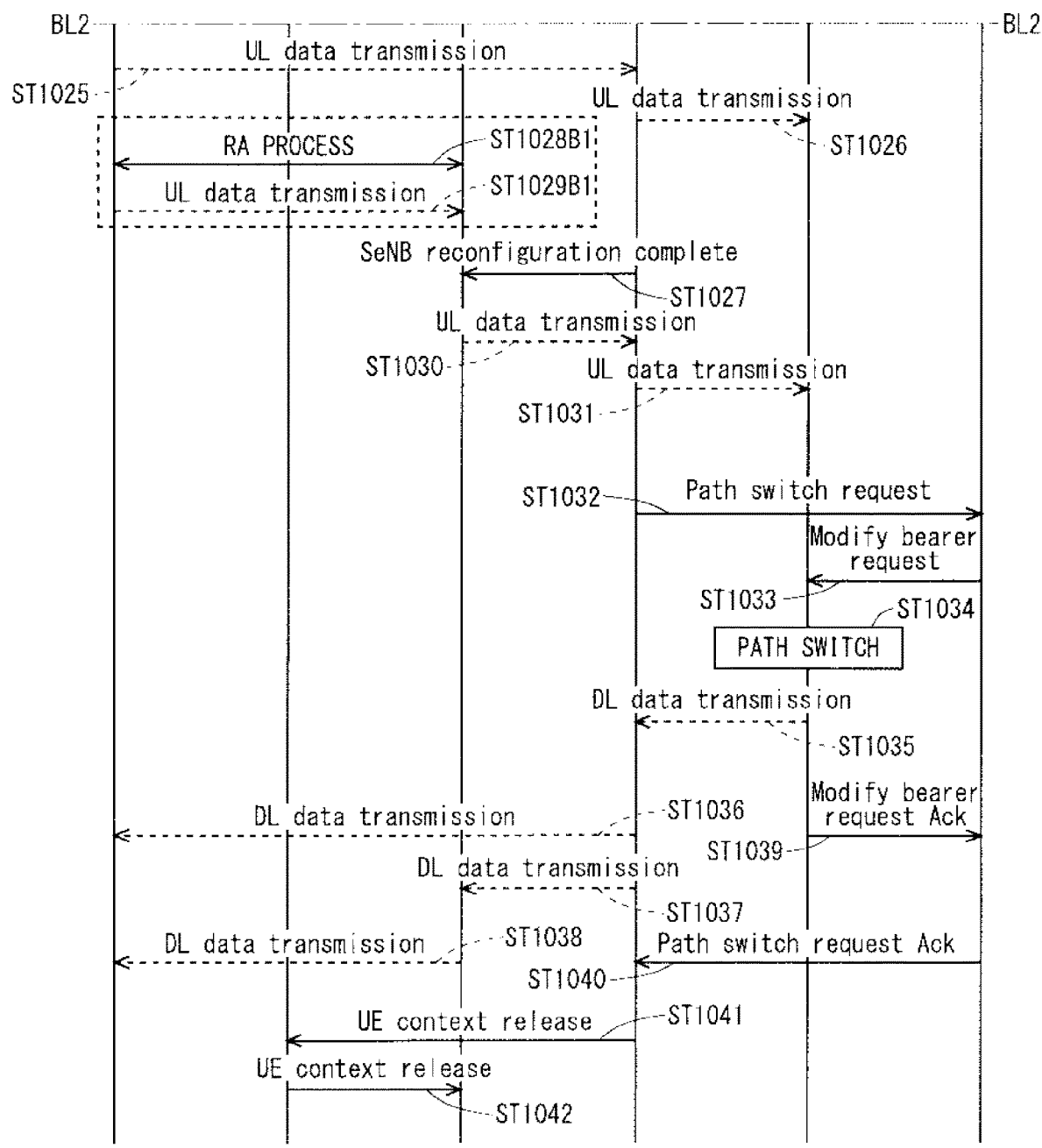

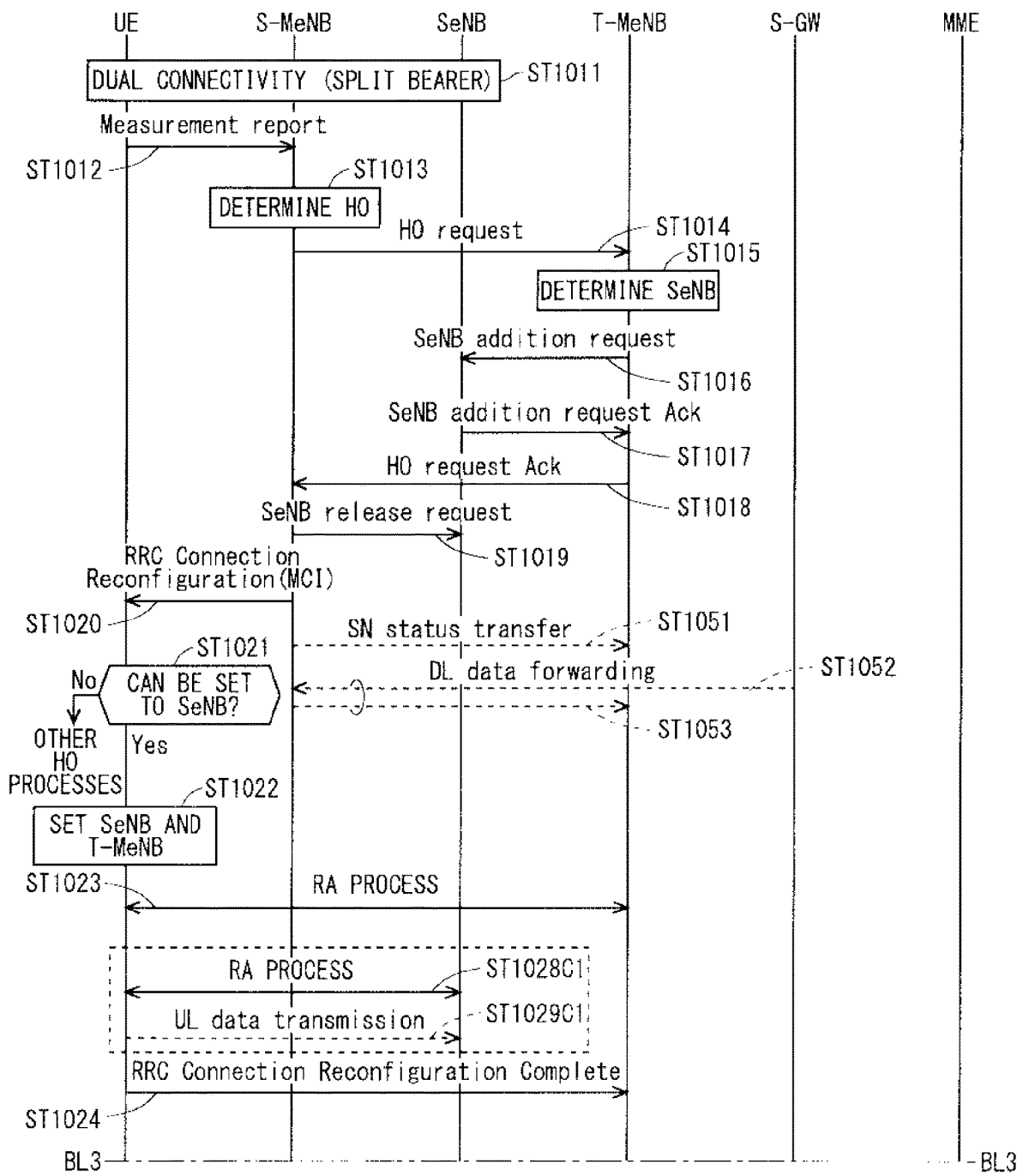
F I G . 1 2

F I G. 1 3
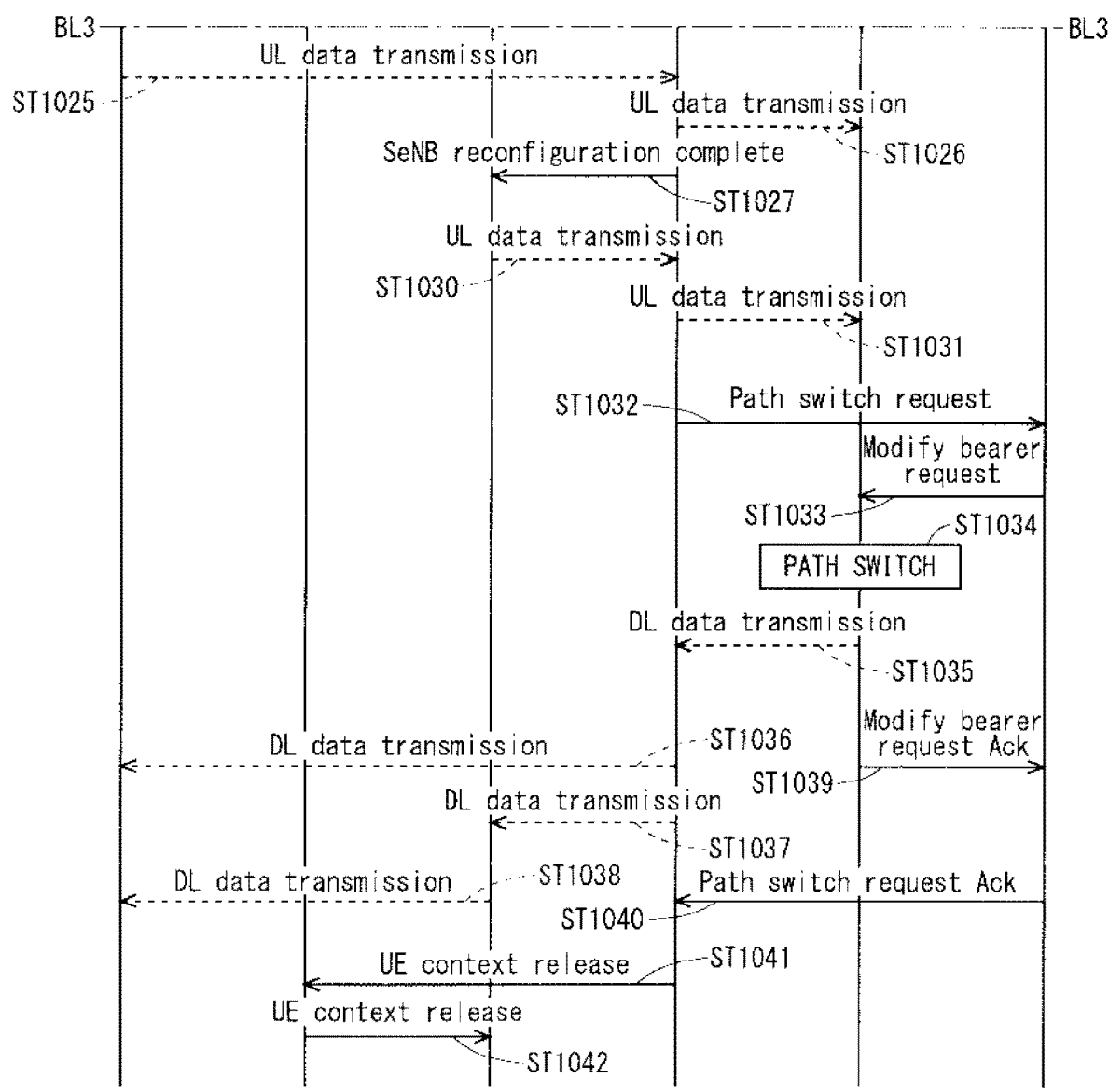

F I G . 1 5
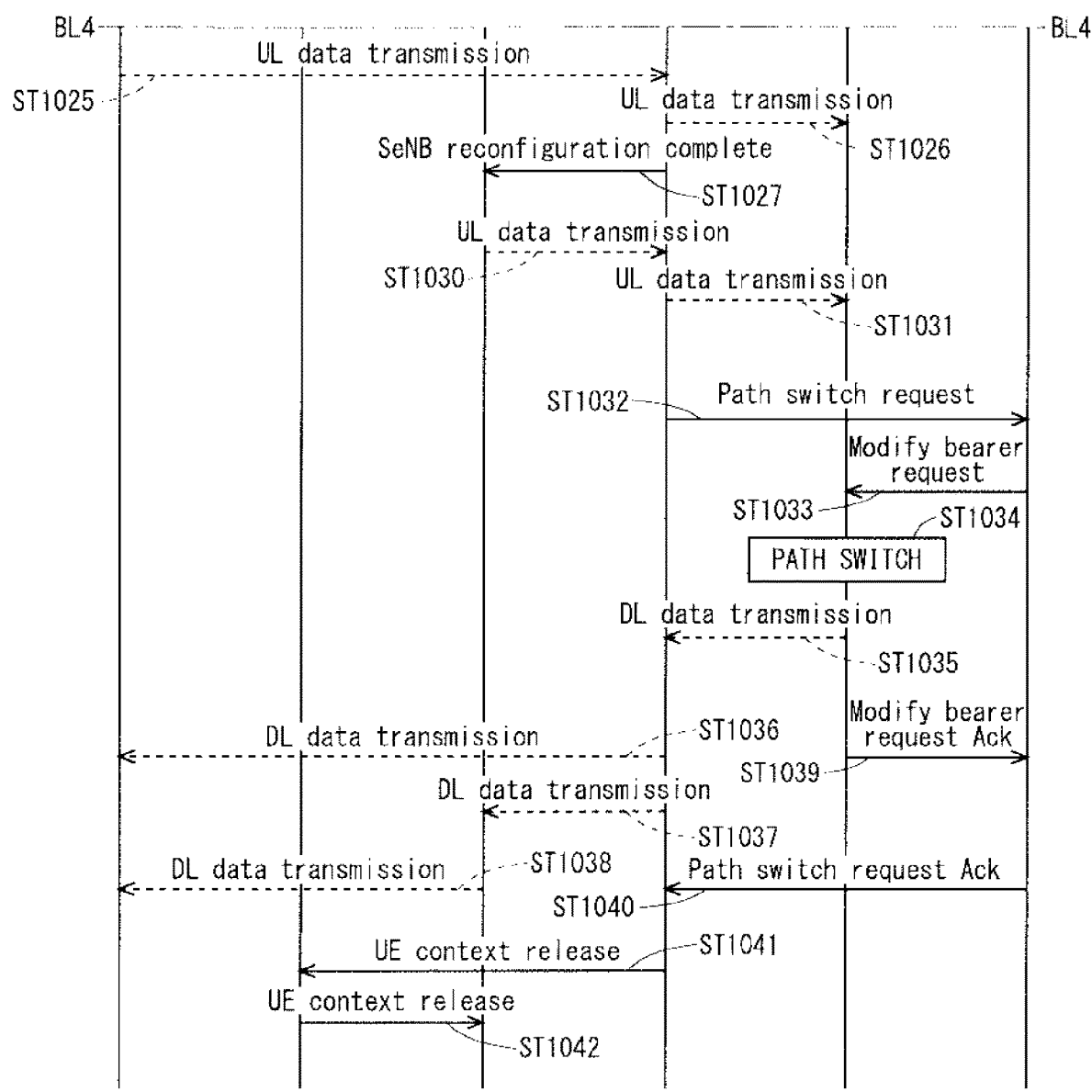

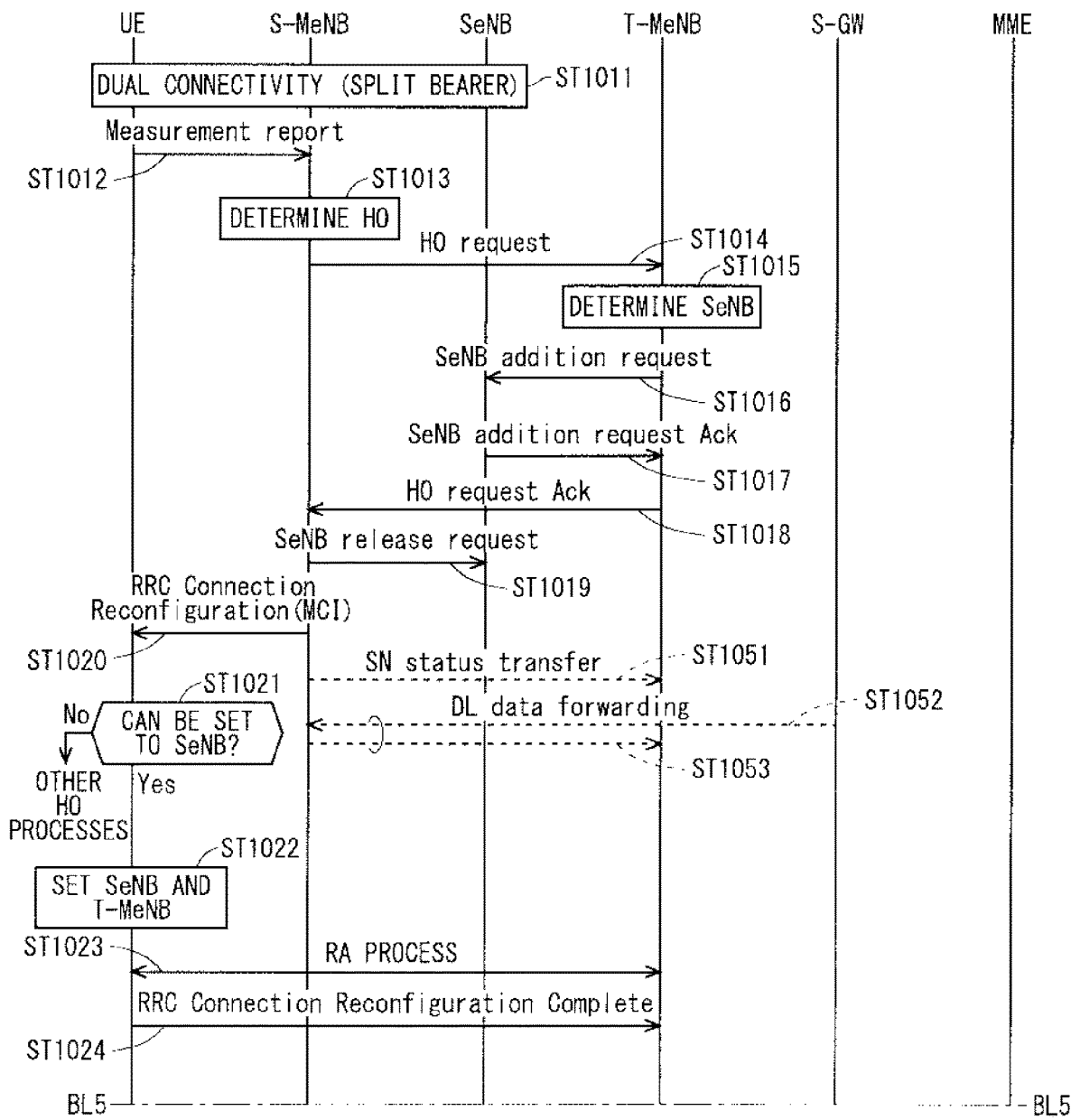
F I G . 1 6

F I G . 1 9
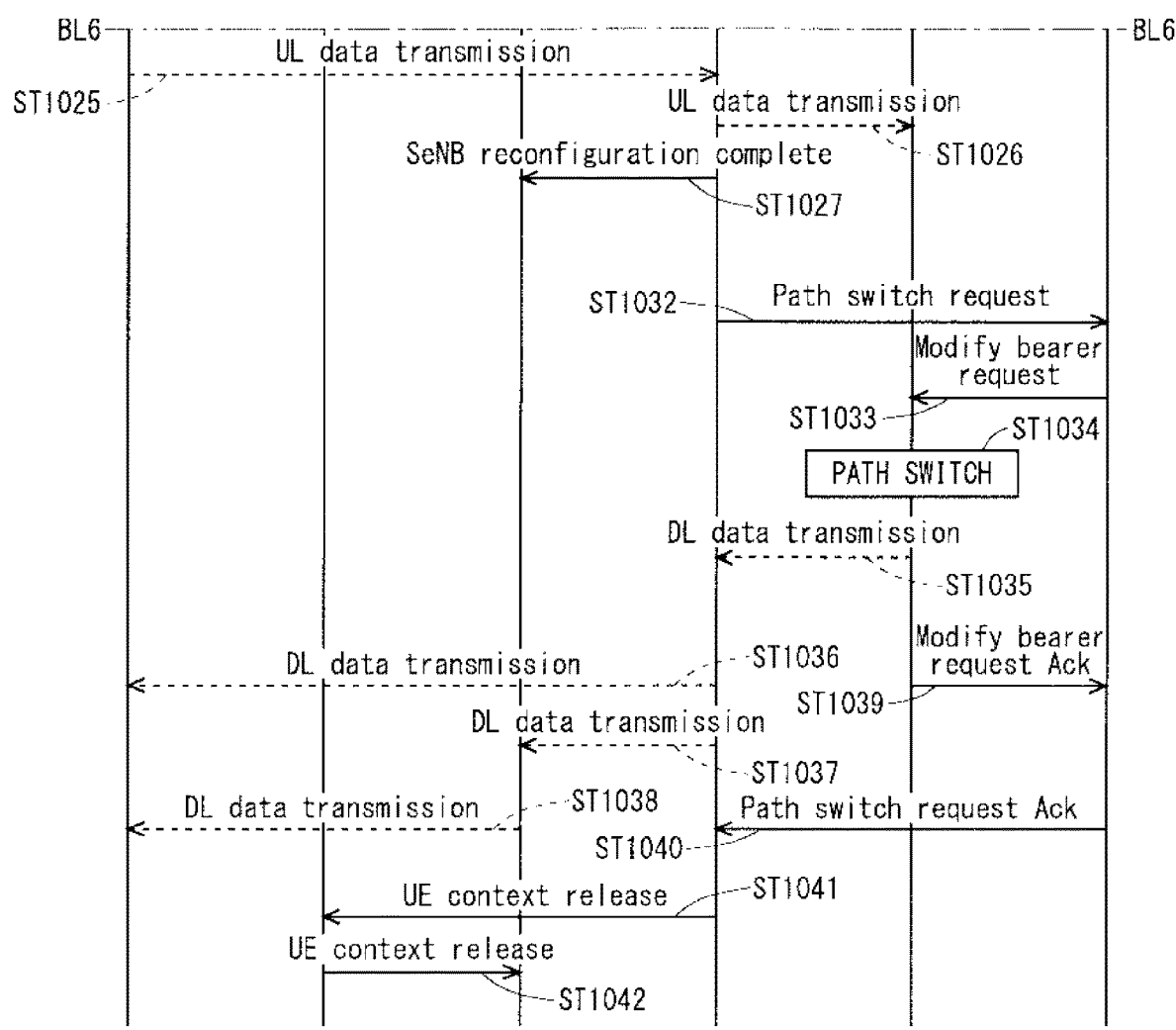

F I G . 2 0
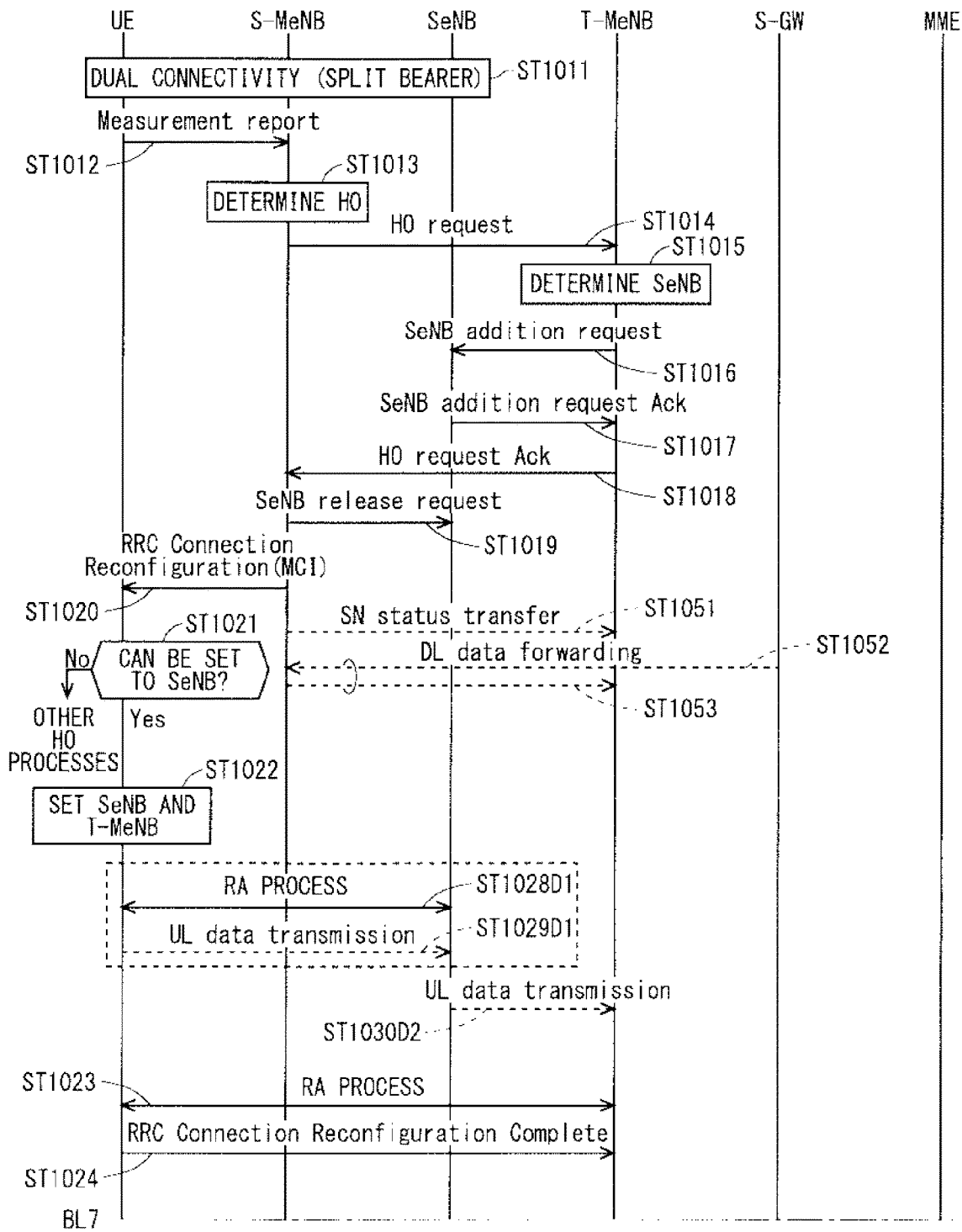

F I G . 2 2
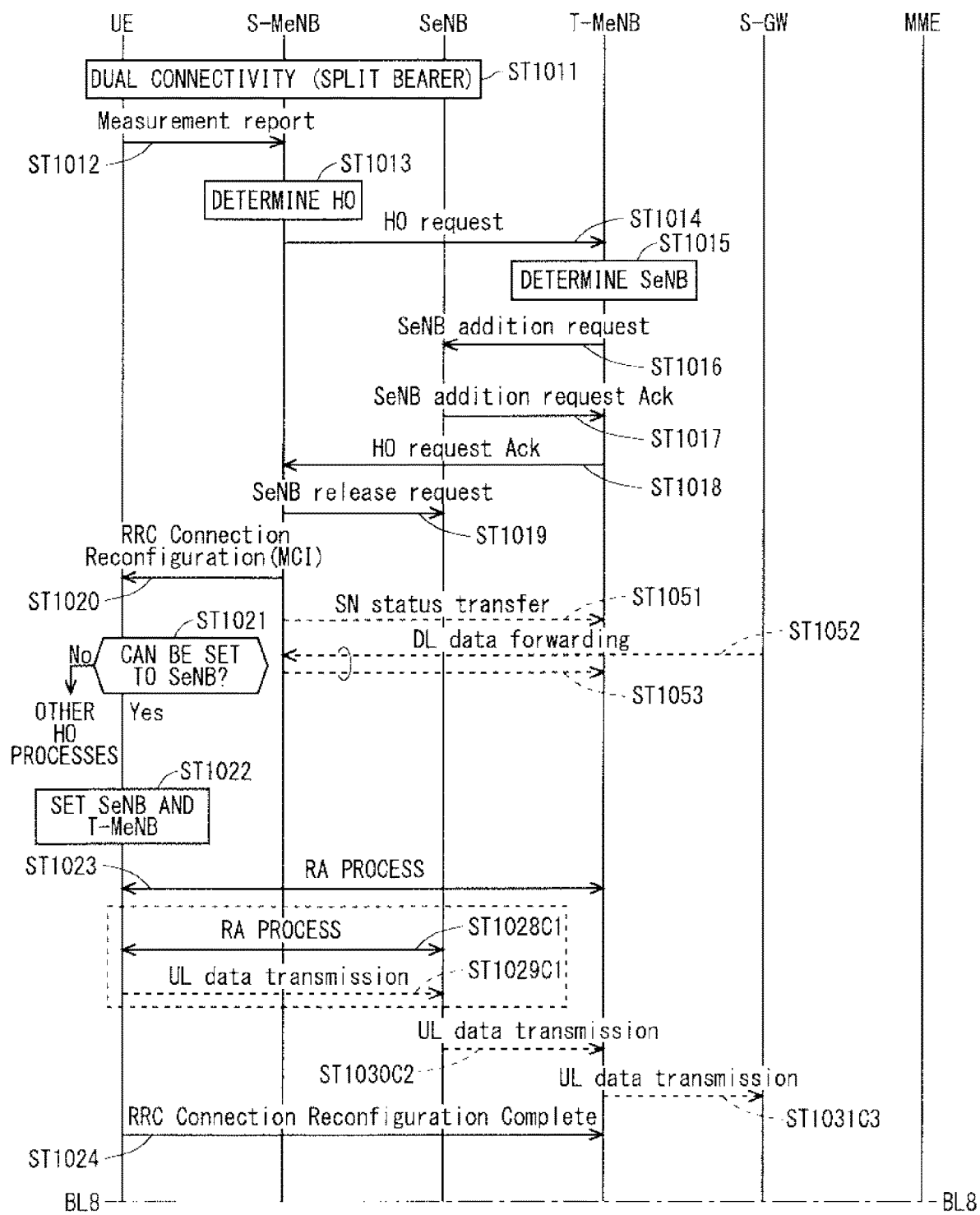

F I G. 2 5
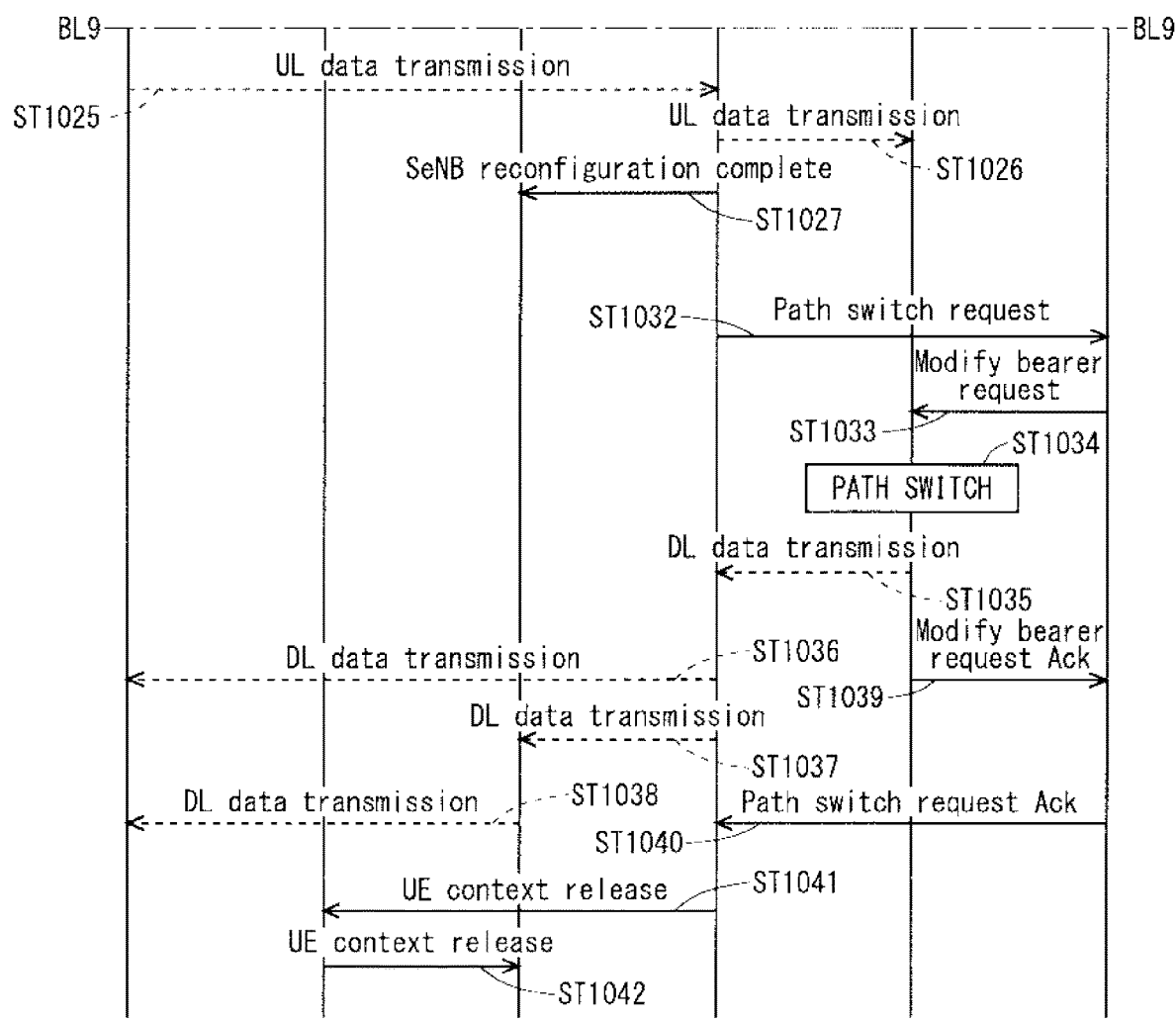

F I G . 2 7
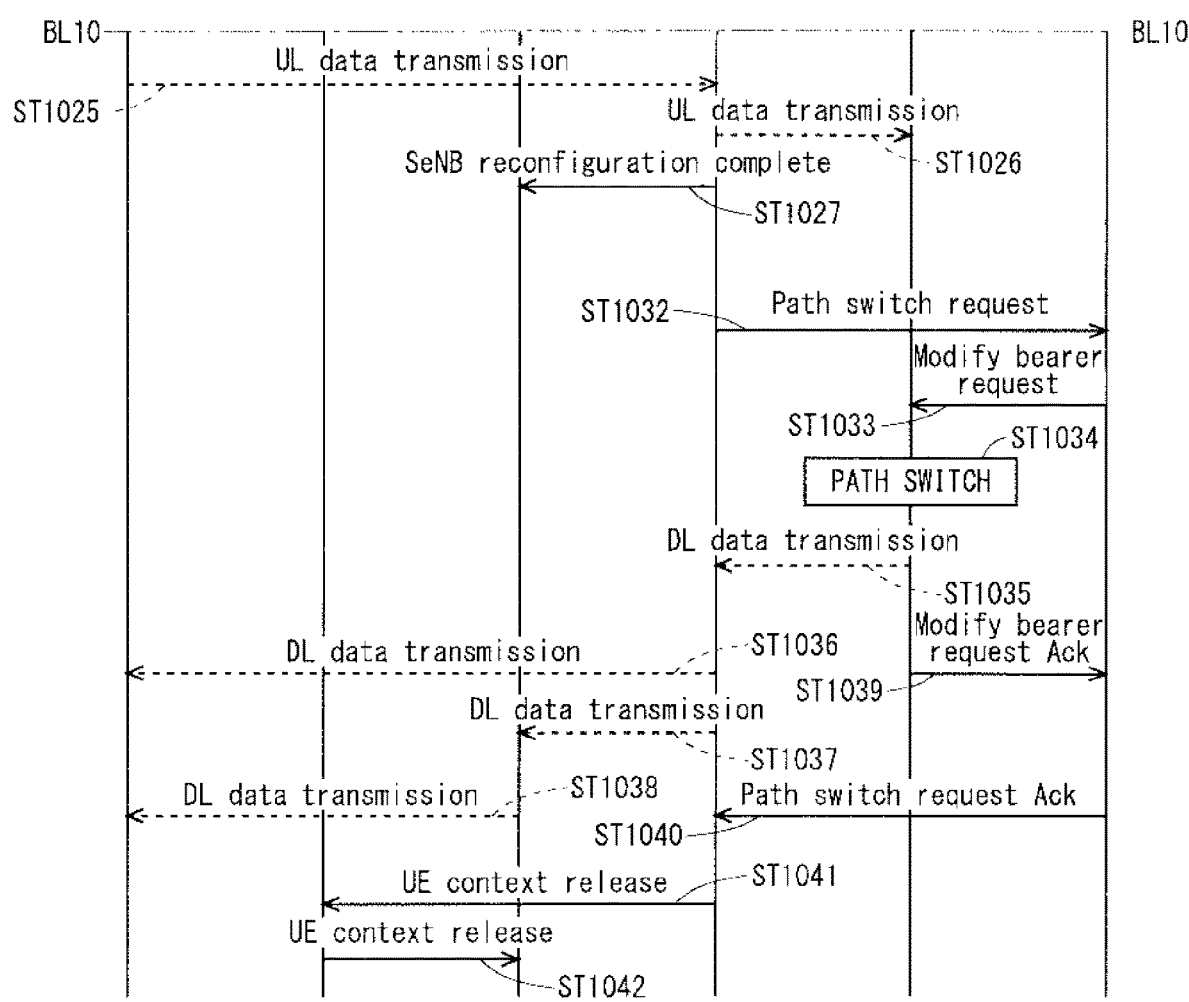

F I G. 2 9
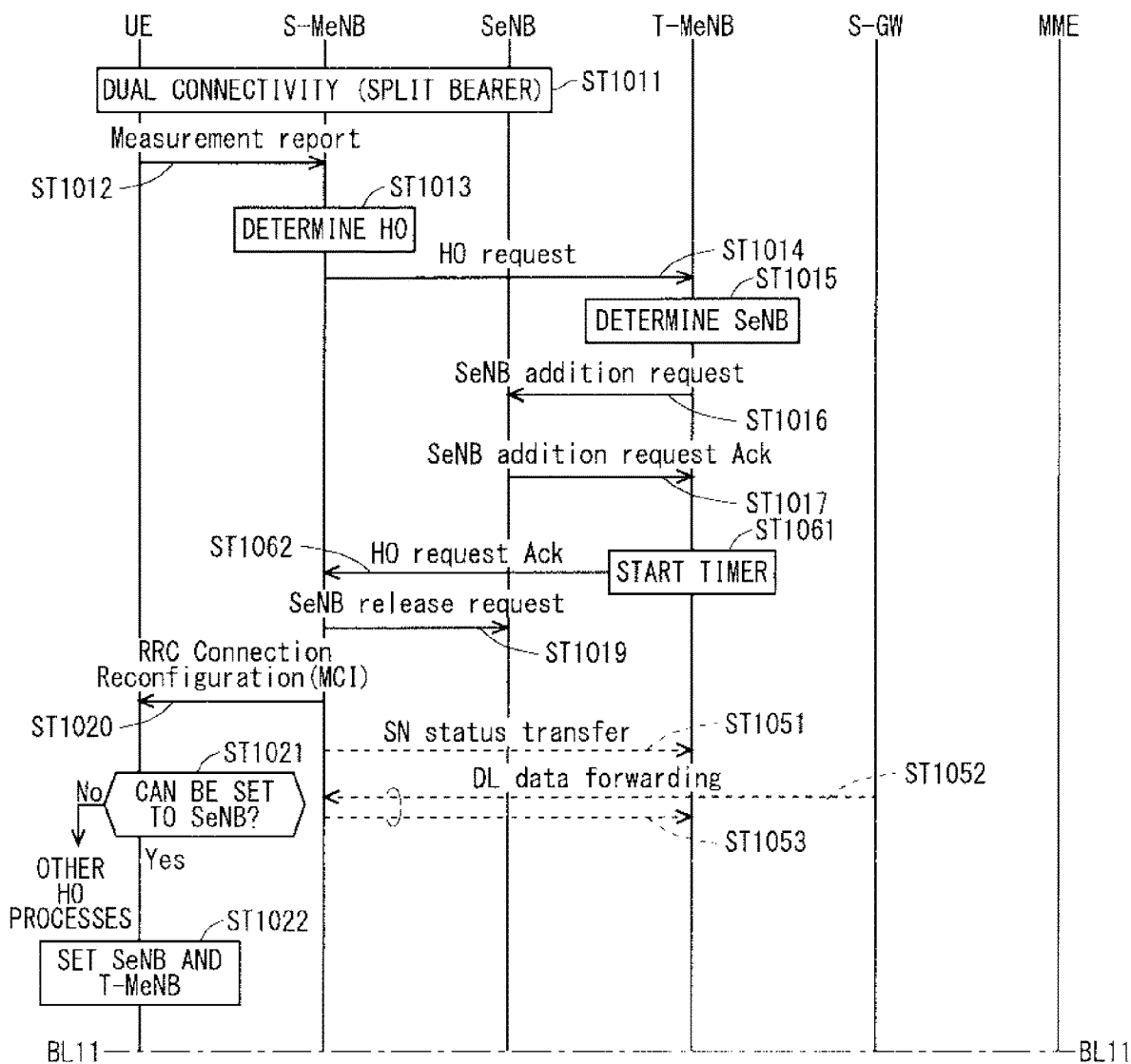

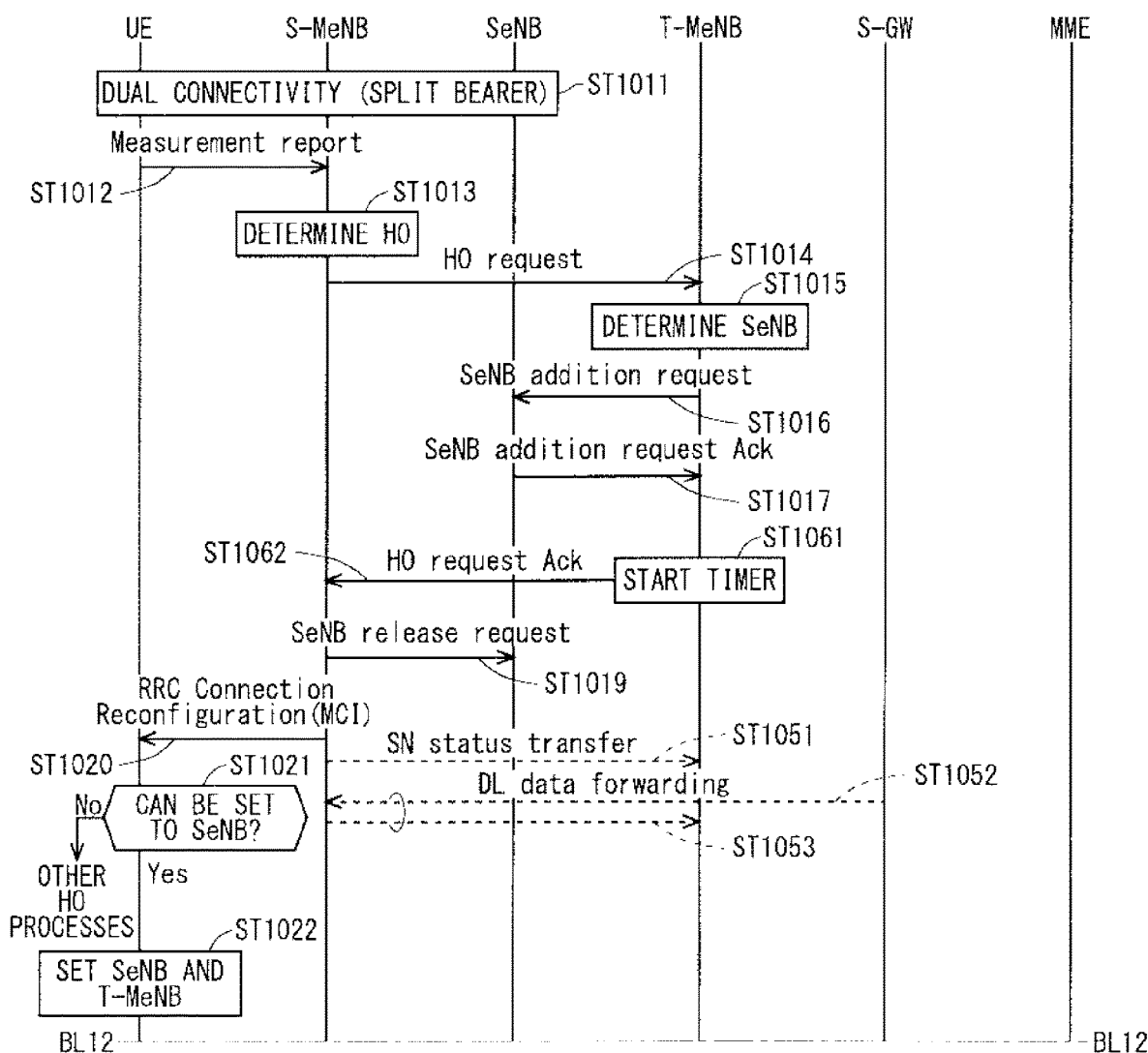
F I G . 3 1

F I G . 3 2
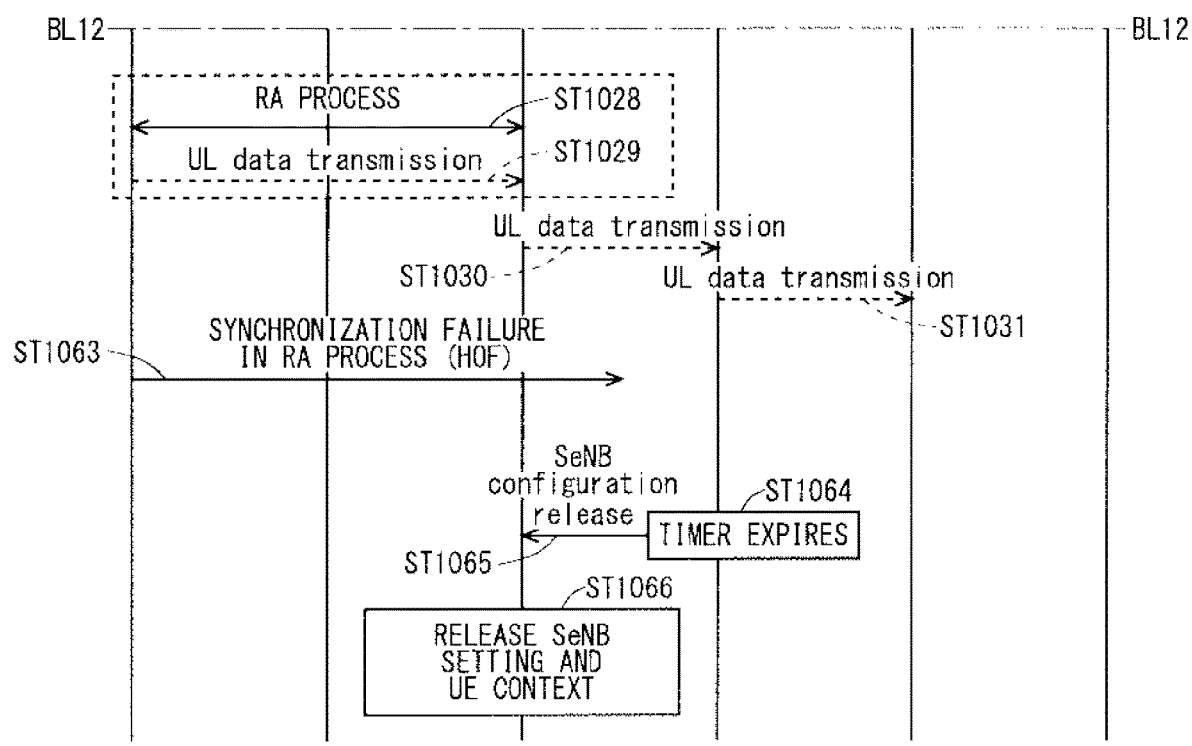

F I G. 3 6
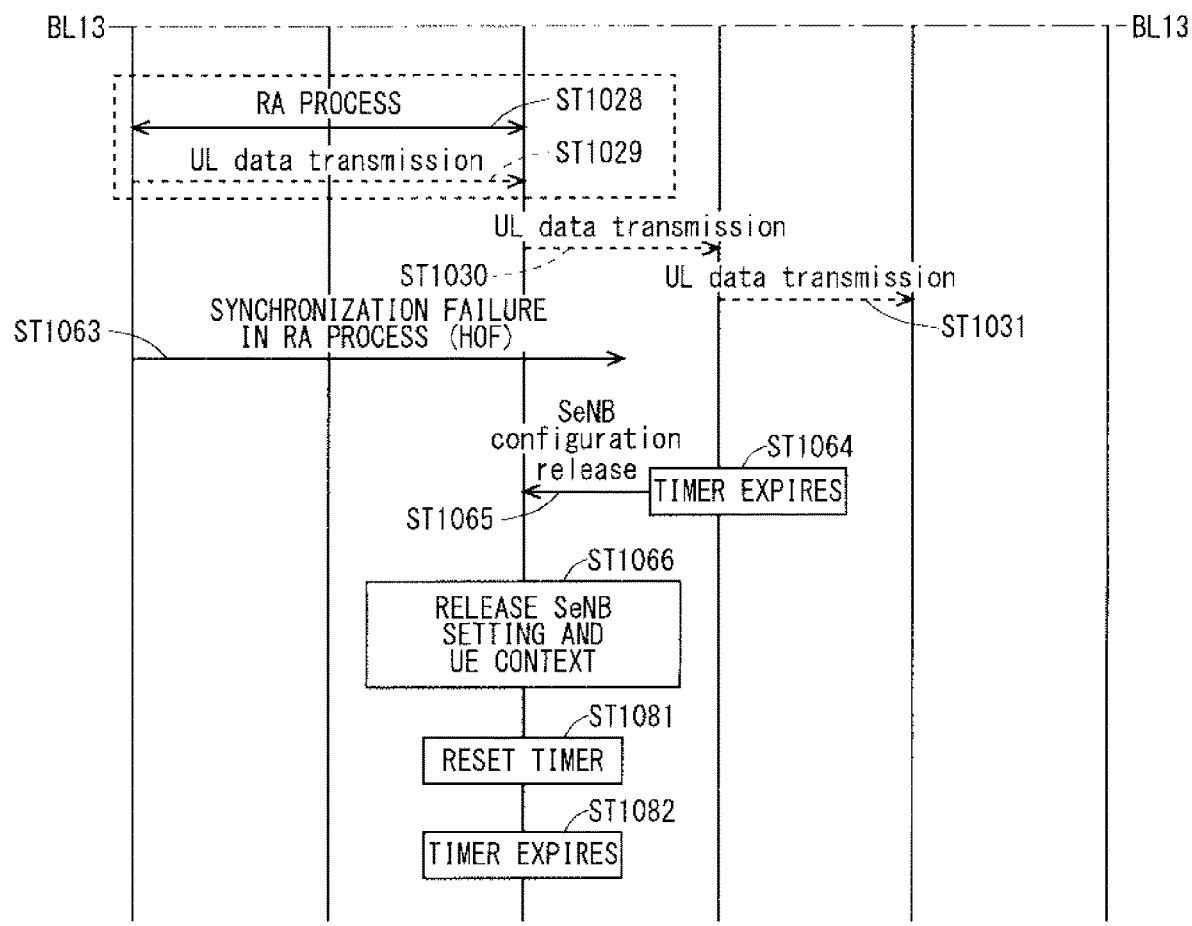

F I G . 4 0
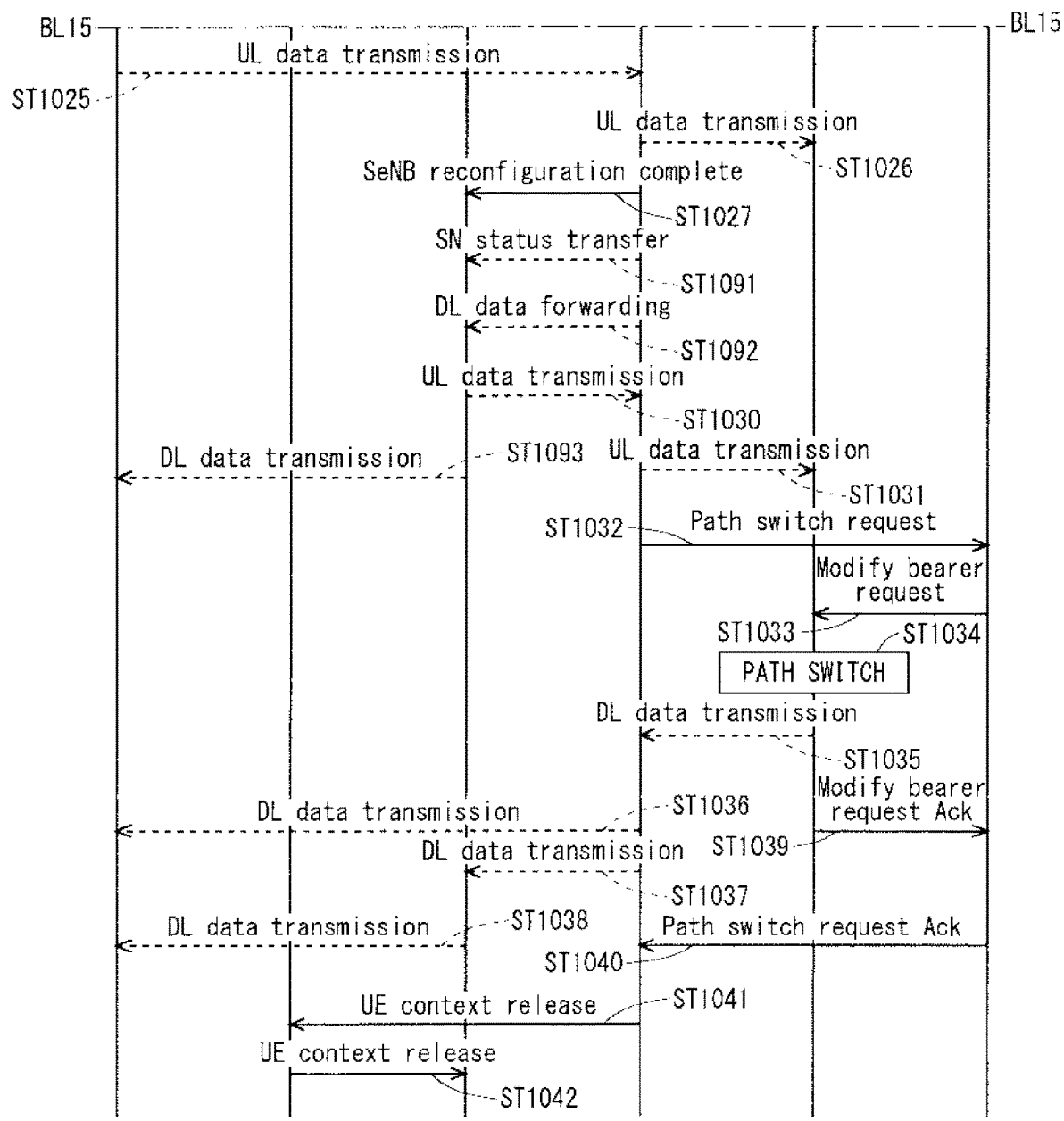

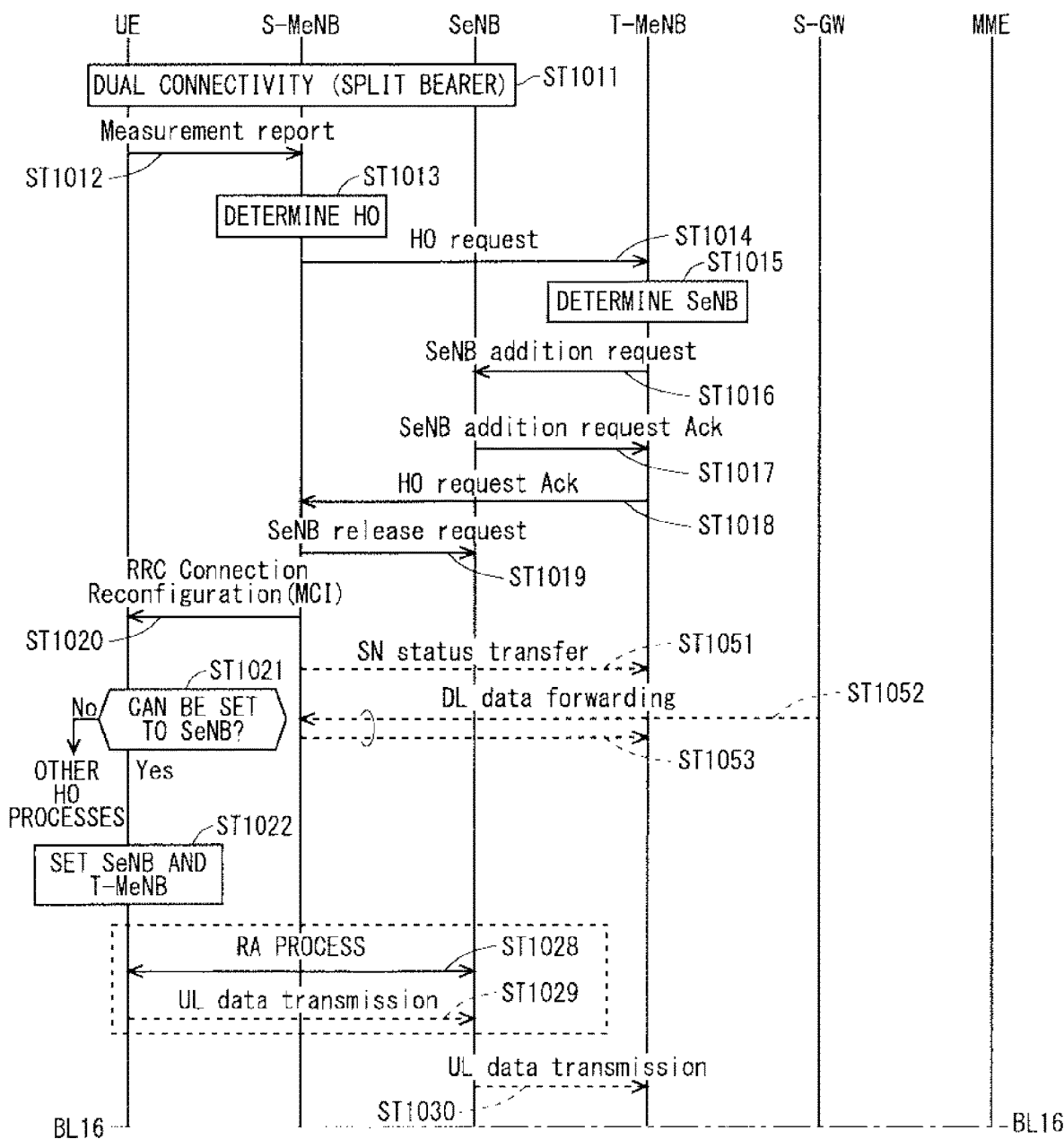
F I G. 4 1

F I G . 4 2
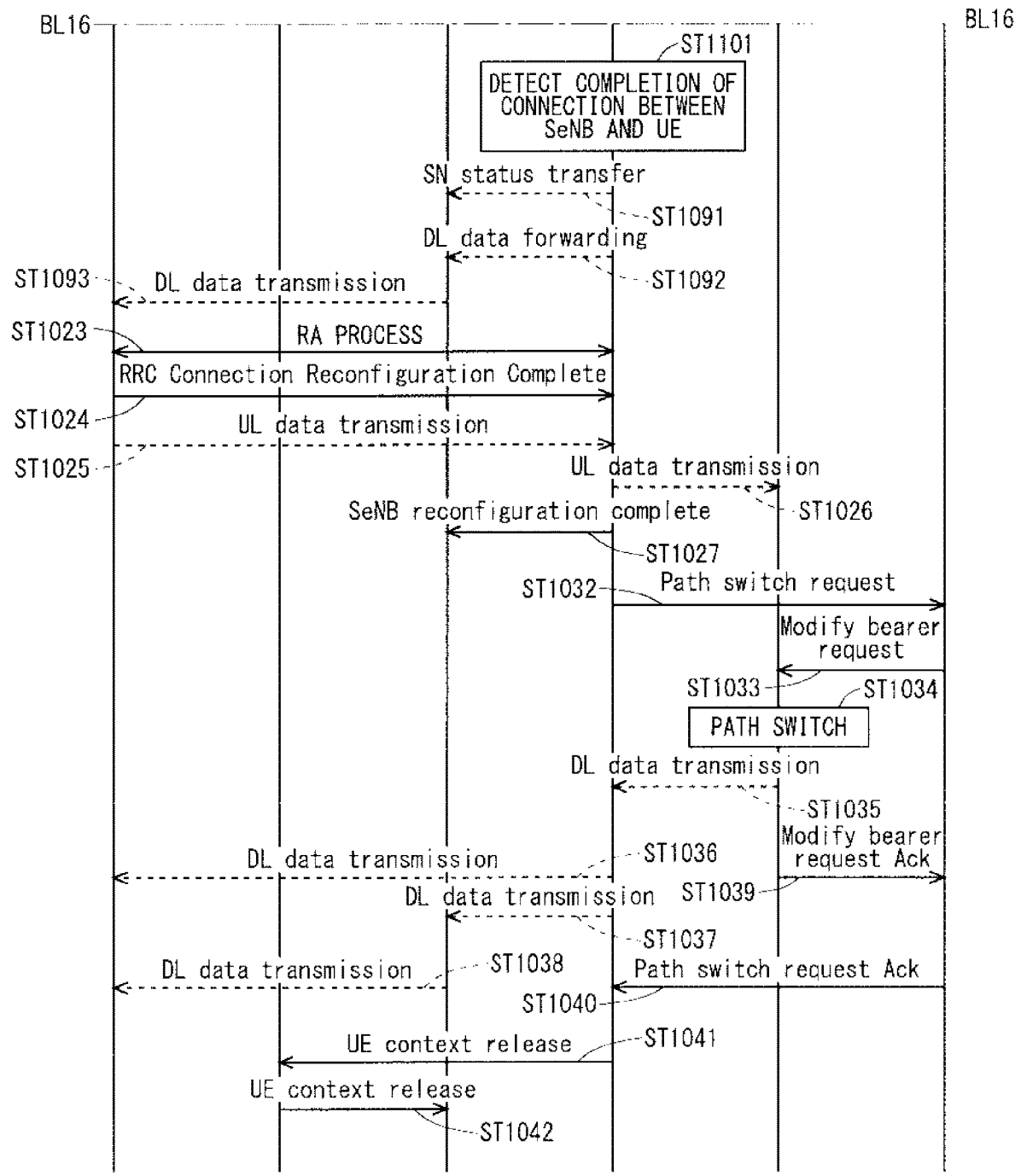

F I G . 4 3
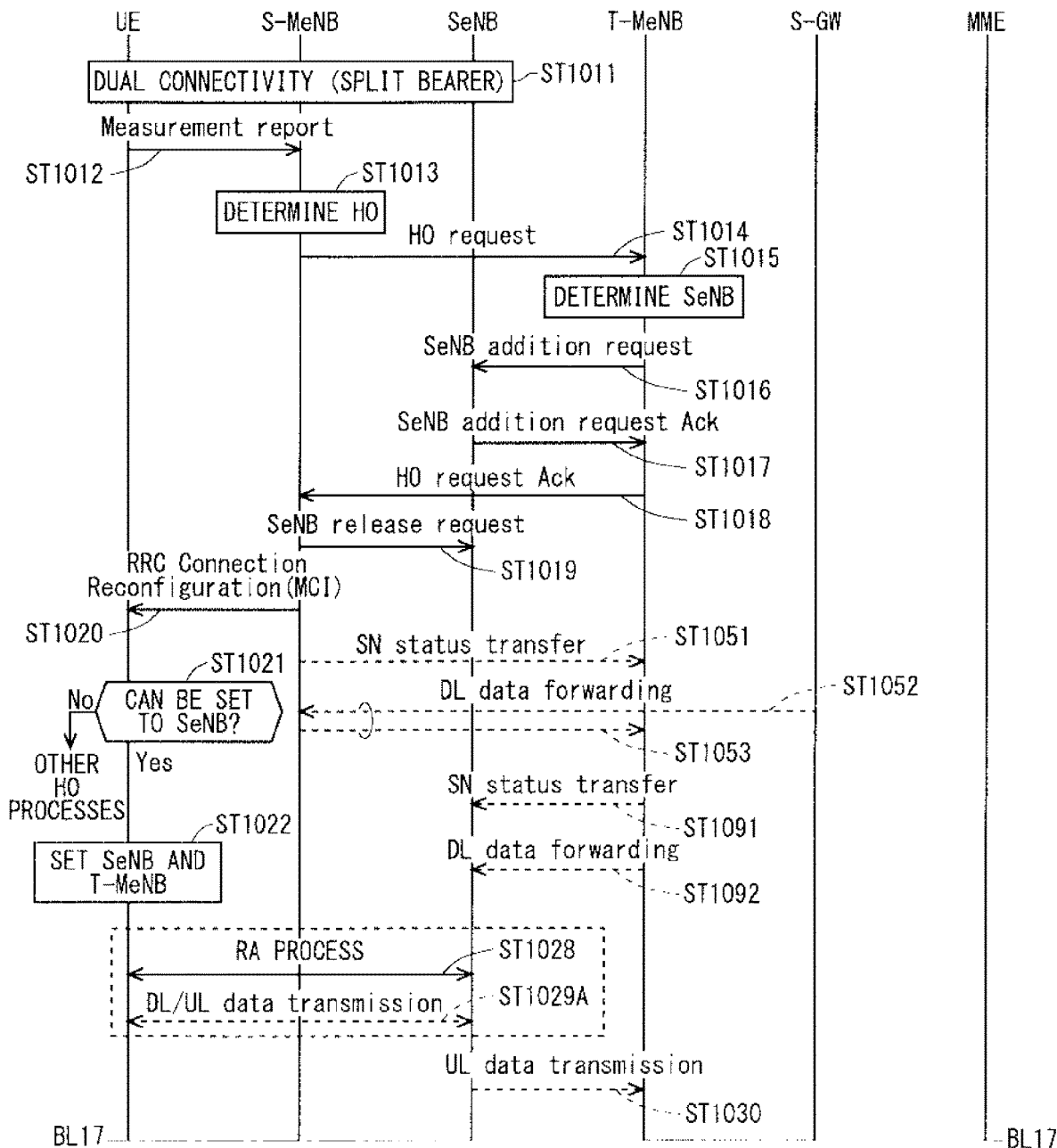

F I G. 4 5
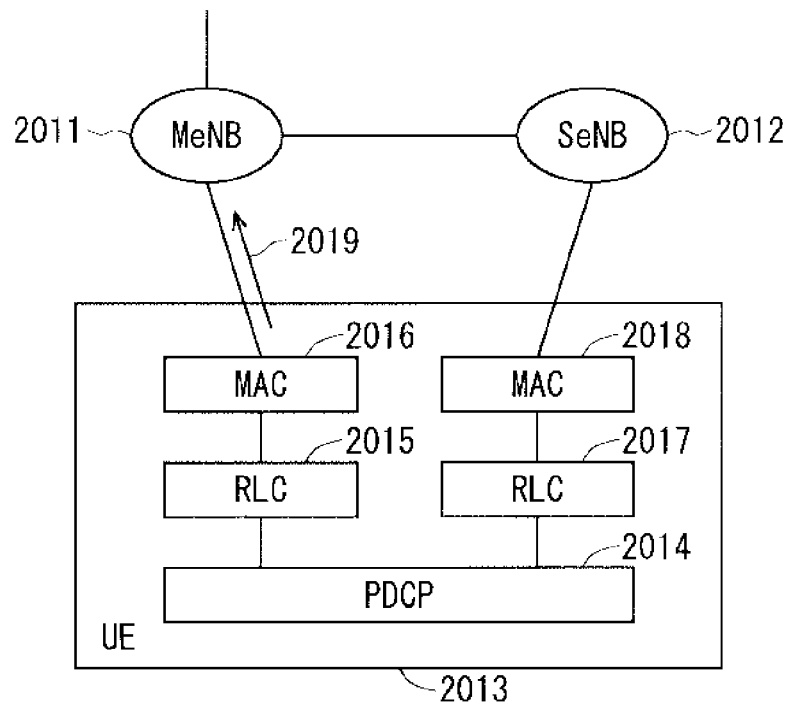
F I G. 4 6
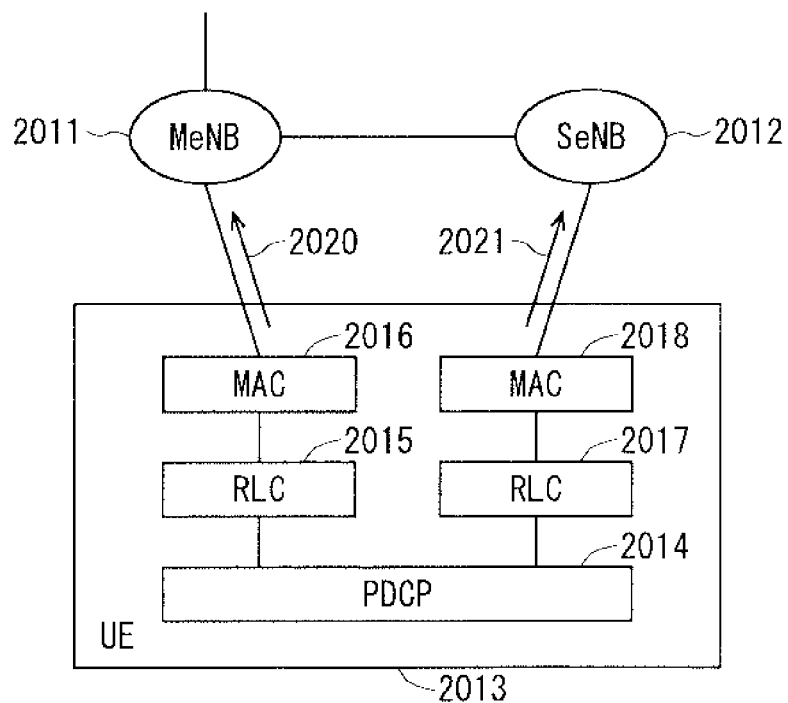

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 11). This communication system is also referred to as 3.9 generation (3.9 G) system.

As the access scheme of the LIE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided hut a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCI) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Mack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LIE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both of the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to communication terminals being served thereby. Being served by a base station means taking the base station as a serving cell.

Non-Patent Document 3 discloses the basic operation of a communication terminal using PCI split. The communication terminal that does not have the PCI split information needs to perform cell search using all PCIs, for example, using all 504 codes. On the other hand, the communication terminal that has the PCI split information is capable of performing cell search using the PCI split information.

Further, 3GPP is pursuing specifications standard of long term evolution advanced (LTE-A) as Release 10 (see Non-Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form and a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 5.

The traffic flow of a mobile network is on the rise, and the communication rate is also increasing. It is expected that the communication rate will be further increased when the operations of the LTE and the LTE-A are fully initiated.

Furthermore, 3GPP is studying the use of small eNBs (hereinafter may be referred to as "small-scale base station devices") configuring small cells to satisfy tremendous traffic in the future. In an example technique under study, a large number of small eNBs will be installed to configure a large number of small cells, thus increasing spectral efficiency and communication capacity. The specific techniques include dual connectivity (DC) in which a UE communicates with two eNBs through connection thereto. Non-Patent Document 6 describes the DC.

PRIOR-ART DOCUMENTS

Non-Patent Documents

Non-Patent Document 1: 3GPP TS36.00 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: 3GPP TR 36.819 V11.2.0
Non-Patent Document 6: 3GPP TR-36.842 V12.0.0
Non-Patent Document 7: 3GPP TS 36.141 V13.0.0
Non-Patent Document 8: 3GPP TR 36.875 V13.0.0
Non-Patent Document 9: 3GPP R2-152359
Non-Patent Document 10: 3GPP R2-151180
Non-Patent Document 11: 3GPP R2-152338

SUMMARY

Problems to be Solved by the Invention

Non-Patent Document 6 fails to disclose a method that enables data transmission when a handover (HO) is performed between macro cells including macro eNBs (hereinafter may be referred to as "large-scale base station devices") while a split bearer is maintained in dual connectivity. The conventional techniques also have a problem with latency in transmitting uplink data when the HO is performed between the macro cells.

The object of the present invention is to provide a communication system that can transmit data from a user equipment device when a handover is performed between the large-scale base station devices that perform both a direct communication with the user equipment device and a communication through a small-scale base station device.

Means to Solve the Problems

A communication system according to the present invention is a communication system including a user equipment device, and a plurality of base station devices capable of radio communication with the user equipment device, wherein the plurality of base station devices include a plurality of large-scale base station devices each having a relatively wide coverage in which communication with the user equipment device is possible, and a small-scale base station device having a coverage relatively narrower than the coverage, the user equipment device is connected to one of the plurality of large-scale base station devices and the small-scale base station device, the user equipment device can directly communicate with the one of the plurality of large-scale base station devices, and can communicate with the one of the plurality of large-scale base station devices through the small-scale base station device, and when a handover process of switching the one of the plurality of large-scale base station devices to which the user equipment device is connected, from a moving-source large-scale base station device to a moving-target large-scale base station device is performed along with moving of the user equipment device, the user equipment device: maintains a connection with the small-scale base station device during the handover process; and starts transmitting data to the small-scale base station device before a communication path between the user equipment device and the one of the plurality of large-scale base station devices is changed from a path formed by the moving-source large-scale base station device and the user equipment device to a path formed by the moving-target large-scale base station device and the user equipment device.

Effects of the Invention

According to the communication system of the present invention, the user equipment device maintains a connection with the small-scale base station device during the handover process, and starts transmitting data to the small-scale base station device before a communication path between the user equipment device and the one of the plurality of large-scale base station devices is changed from a path formed by the moving-source large-scale base station device and the user equipment device to a path formed by the moving-target large-scale base station device and the user equipment device. Thus, when the handover process is performed between the large-scale base station devices that perform both a direct communication with the user equipment device and a communication through the small-scale base station device, the user equipment device can transmit the data.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 3 is a block diagram showing the configuration of a user equipment 202 shown in FIG. 2, which is a communication terminal according to the present invention.

FIG. 4 is a block diagram showing the configuration of a base station 203 shown in FIG. 2, which is a base station according to the present invention.

FIG. 5 is a block diagram showing the configuration of an MME according to the present invention.

FIG. 6 is a flowchart showing an outline from a cell search to an idle state operation performed by a communication terminal (UE) in the LTE communication system.

FIG. 7 shows the concept of a cell configuration when macro eNBs and small eNBs coexist.

FIG. 9 illustrates the example sequence of handover processes in the communication system according to the first embodiment.

FIG. 11 illustrates the example sequence of handover processes in the communication system according to the first modification of the first embodiment.

FIG. 12 illustrates another example sequence of handover processes in the communication system according to the first modification of the first embodiment.

FIG. 13 illustrates the other example sequence of handover processes in the communication system according to the first modification of the first embodiment.

FIG. 15 illustrates the other example sequence of handover processes in the communication system according to the first modification of the first embodiment.

FIG. 16 illustrates an example sequence of handover processes in a communication system according to a second modification of the first embodiment.

FIG. 19 illustrates the other example sequence of handover processes in the communication system according to the second modification of the first embodiment.

FIG. 20 illustrates another example sequence of handover processes in the communication system according to the second modification of the first embodiment.

FIG. 22 illustrates an example sequence of handover processes in a communication system according to a third modification of the first embodiment.

FIG. 25 illustrates the other example sequence of handover processes in the communication system according to the third modification of the first embodiment.

FIG. 27 illustrates the example sequence of handover processes in the communication system according to the fourth modification of the first embodiment.

FIG. 29 illustrates another example sequence of handover processes in the communication system according to the fifth modification of the first embodiment.

FIG. 31 illustrates another example sequence of handover processes in the communication system according to the fifth modification of the first embodiment.

FIG. 32 illustrates the other example sequence of handover processes in the communication system according to the fifth modification of the first embodiment.

FIG. 36 illustrates the other example sequence of handover processes in the communication system according to the fifth modification of the first embodiment.

FIG. 40 illustrates the other example sequence of handover processes in the communication system according to the sixth modification of the first embodiment.

FIG. 41 illustrates an example sequence of handover processes in a communication system according to a seventh modification of the first embodiment.

FIG. 42 illustrates the example sequence of handover processes in the communication system according to the seventh modification of the first embodiment.

FIG. 43 illustrates another example sequence of handover processes in the communication system according to the seventh modification of the first embodiment.

FIG. 45 illustrates a method for transmitting a BSR when the conventional DRAT is set.

FIG. 46 illustrates a method for transmitting the BSR when the conventional DRAT is set.

DESCRIPTION OF EMBODIMENTS

First Embodiment

Figure 2:
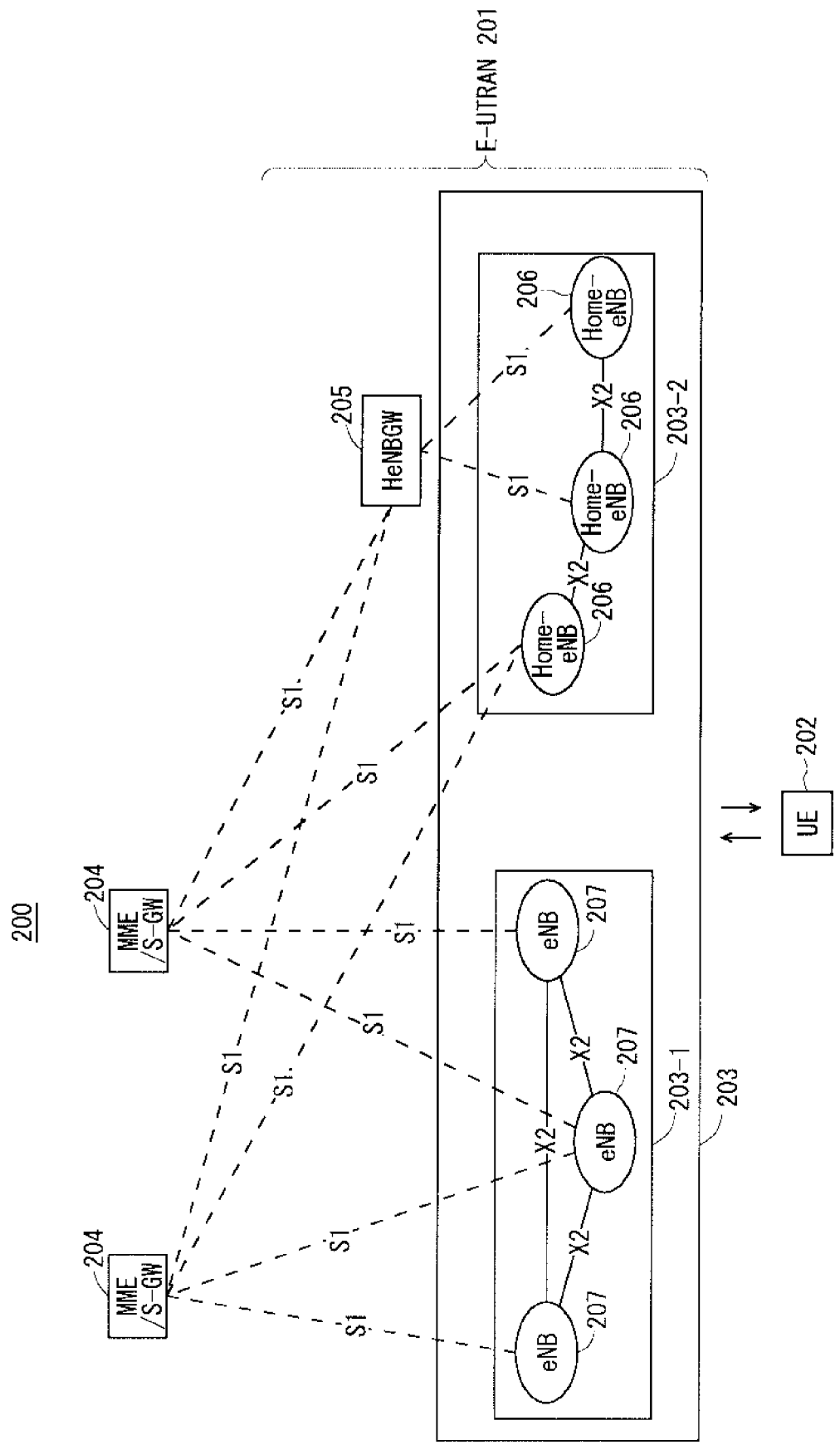
FIG. 2 is a block diagram showing the overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UL)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" (hereinafter may be referred to as a "large-scale base station device") refers to an eNB configuring a macro cell. A "small cell" refers to a cell having a relatively narrow coverage, such as a downsized cell, and a "small eNB" (hereinafter may be referred to as a "small-scale base station device") refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the following description, among eNBs that perform dual connectivity (DC), one of them may be referred to as a master eNB (abbreviated as MeNB), and the other may be referred to as a secondary eNB (abbreviated as SeNB). A HO-source MeNB may be referred to as a source MeNB (abbreviated as S-MeNB), and a HO-target MeNB may be referred to as a target MeNB (abbreviated as T-MeNB).

The HO between the MeNBs during execution of the dual connectivity (DC) requires the SeNB to be released. In other words, the DC is ended, communication only with the MeNB is restored, and the HO between the MeNBs is performed.

In the HO between the MeNBs, however, there may be cases where the SeNB connected to a UE that is a HO subject is not changed prior to and subsequent to the HO or where the SeNB should not be changed.

Without any change in the SeNB in the HO between the MeNBs, a communication between the TIE and the SeNB during the HO enables earlier data communication and reduction in latency.

3GPP is studying cases without any change in the SeNB during the HO between the MeNBs. For example, Non-Patent Document 8 discloses, in FIG. 4.3.2.3-1, a sequence of HO processes between the MeNBs without any change in the SeNB. However, Non-Patent Document 8 fails to disclose, in detail, particularly user plain data indicating, for example, with which timing the uplink data and the downlink data start to be transmitted, etc. Non-Patent Document 8 also fails to disclose the HO between the MeNBs without any change in the SeNB while a split bearer is maintained. Here, the "split bearer" means a bearer split into a direct path between the MeNB and the UE and a path between the MeNB and the UE through the SeNB.

The first embodiment will disclose a method that enables data transmission between the UE and the SeNB during the HO between the MeNBs while the split bearer is maintained.

According to the first embodiment, the MeNBs maintain the split bearer for a HO-subject UE (may also be referred to as a "subject UE") during the HO between the MeNBs.

Figure 8:
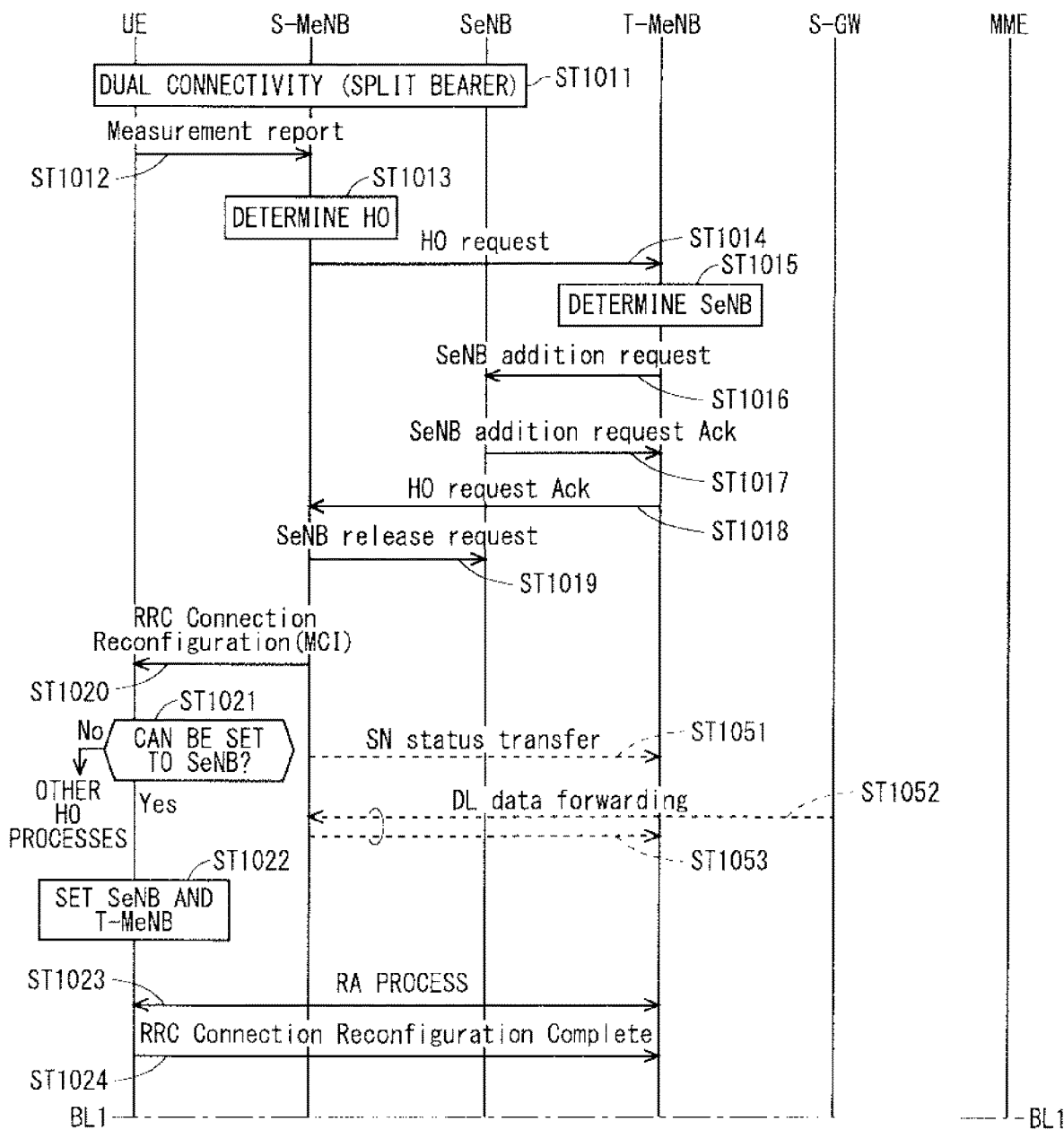
FIG. 8 illustrates an example sequence of handover processes in a communication system according to a first embodiment.

FIGS. 8 and 9 illustrate an example sequence of handover processes in the communication system according to the first embodiment. FIGS. 8 and 9 are connected across a border BL1. FIGS. 8 and 9 illustrate, as the handover processes, the example sequence of transmitting the uplink data and the downlink data during the HO between the MeNBs without any change in the SeNB.

In FIG. 8, Step ST1011 indicates that the HO-subject UE is performing the DC with the S-MeNB and the SeNB. In Step ST1012, the UE notifies the S-MeNB of a measurement result of a connected state with the S-MeNB while performing the DC. The measurement result of the connected state is notified using, for example, a measurement report message disclosed in Non-Patent Document 1.

According to the measurement result of the connected state notified in Step ST1012, the S-MeNB determines to perform the HO in Step ST1013.

In Step ST1014, the S-MeNB requests the T-MeNB to be a HO target for the UE. The request to be a HO target is issued using, for example, a HO Request message disclosed in FIG. 4.3.2.3-1 of Non-Patent Document 8. In Step ST1014, the S-MeNB notifies the T-MeNB of SeNB configuration information that is information on the SeNB configured by the S-MeNB.

Upon receipt of the HO request in Step ST1014, the T-MeNB determines not to change the SeNB to which the HO-subject UE is already connected, in Step ST1015. The T-MeNB also determines to maintain the split bearer in Step ST1015.

In Step ST1015, the T-MeNB determines not to change the SeNB and maintain the split bearer, based on the SeNB configuration information notified from the S-MeNB.

The SeNB configuration information may include an eNB ID of the SeNB, bearer information (E-RAB ID) using the SeNB, bearer information set to the split bearer, and setting information of the split bearer.

In Step ST1016, the T-MeNB instructs the SeNB to set no change in the SeNB while the split bearer is maintained. This instruction is issued using, for example, a SeNB Addition Request message disclosed in FIG. 4.3.2.3-1 of Non-Patent Document 8.

The SeNB instructed in Step ST1016 sets no change in the SeNB while the split bearer is maintained, and replies the setting completion to the T-MeNB in Step ST1017. This reply is issued using, for example, a SeNB Addition Request Ack message disclosed in FIG. 4.3.2.3-1 of Non-Patent Document 8.

In response to the request to be the HO target in Step ST1014, the T-MeNB that has received the reply in Step ST1017 replies to the S-MeNB in Step ST1018. This reply is issued using, for example, a HO Request Ack message disclosed in FIG. 4.3.2.3-1 of Non-Patent Document 8.

Here, a part or the entirety of the split bearer configuration information included in the SeNB Addition Request in Step ST1016 may be omitted. Alternatively, only the portion without any change in the split bearer configuration information may be omitted.

Upon receipt of the reply in Step ST1018, the S-MeNB requests the SeNB a SeNB release in Step ST1019. This request is issued using, for example, a SeNB Release Request message disclosed in FIG. 4.3.2.3-1 of Non-Patent Document 8.

The SeNB Release Request in Step ST1019 is a request to release the bearer configuration of the SeNB that is configured by the S-MeNB.

Upon receipt of the SeNB Release Request in Step ST1019, the SeNB releases the bearer configuration configured by the S-MeNB. Neither the omitted setting nor the split bearer configuration set by the T-MeNB is released.

In Step ST1020, the S-MeNB notifies the subject UE to maintain the split bearer using the same SeNB. The subject UE maintains the already set split bearer according to the notified information without undergoing processes of changing the setting temporarily to an MeNB bearer configuration and back to the split bearer configuration.

A method for notifying the subject UE to maintain the split bearer using the same SeNB will be disclosed. Information indicating that the split bearer is to be maintained may be provided. Additionally, information indicating that the same SeNB is to be used may be provided.

The S-MeNB may notify the subject UE to maintain the split bearer using the same SeNB. Alternatively, the T-MeNB may notify the S-MeNB of the setting information, and then the S-MeNB may notify the subject UE of the setting information.

The information indicating that the same SeNB is to be used may be information of bit. The information indicating that the split bearer is to be maintained may be information of 1 bit. The information indicating that the split bearer is to be maintained using the same SeNB may be information of 1 bit in total.

The information indicating that the split bearer is to be maintained using the same SeNB is notified in Step ST1020 in addition to, for example, an RRC Connection Reconfiguration message disclosed in FIG. 4.3.2.3-1 of Non-Patent Document 8. The information may also be notified together with mobility control information (MCI) of the RRC Connection Reconfiguration message.

When the information indicating that the split bearer is to be maintained is notified in Step ST1020, the detailed configuration of the split bearer may be changed. Information on the detailed configuration of the split bearer may be notified.

Another method for notifying the subject UE to maintain the split bearer using the same SeNB will be disclosed. The T-MeNB notifies the subject UE to reconfigure the split bearer.

The notification to the subject UE is performed by notifying the SeNB configuration information from the T-MeNB to the S-MeNB and notifying the information from the SeNB to the subject UE. The information to be notified is addition of the SeNB and the split bearer configuration. This notification may be made in Step ST1020 in addition to, for example, the RRC Connection Reconfiguration message disclosed in FIG. 4.3.2.3-1 of Non-Patent Document 8. This notification may also be made together with MCI of the RRC Connection Reconfiguration message.

The information to be notified from the T-MeNB to the subject UE has the same setting as that of the bearer configuration information of the SeNB set by the S-MeNB. Here, a part or the entirety of the setting of the SeNB and the split bearer configuration information may be omitted. Only the portion without any change may be omitted When a part or the entirety of the setting of the SeNB and the split bearer configuration information is omitted, the S-MeNB may determine the information to be omitted, using the information from the T-MeNB. Alternatively, the T-MeNB may determine the information to be omitted, using the information from the S-MeNB.

In Step ST1021, the subject UE determines whether the split bearer configuration notified can be set to the SeNB. When determining that the setting is possible, the subject UE proceeds to Step ST1022. When determining that the setting is not possible, the subject UE performs the processes disclosed in FIG. 4.3.2.3-1 of Non-Patent Document 8 as the other HO processes because the HO processes cannot be performed between the MeNBs without any change in the SeNB while the split bearer is maintained.

After determining that the split bearer configuration can be set to the notified SeNB in Step ST1021 and proceeding to Step ST1022, the subject UE sets the split bearer configuration to the corresponding SeNB and T-MeNB in Step ST1022.

Particularly, the setting to the SeNB will be disclosed. When the setting is intended for maintaining the split bearer using the same SeNB, the subject UE may not reset the MAC for the SeNB (a Secondary Cell Group (SCG) of Non-Patent Document 1) but reconfigures the MAC. The RLC for the SeNB (SCG) is reconfigured. The PDCP for the SeNB (SCG) is reconfigured.

In Step ST1023, the subject UE performs an RA process with the T-MeNB to synchronize with the T-MeNB.

The subject UE after performing the RA process notifies the T-MeNB of setting completion of the T-MeNB configuration and the SeNB configuration in Step ST1024. This notification is made using, for example, an RRC Connection Reconfiguration Complete message disclosed in FIG. 4.3.2.3-1 of Non-Patent Document 8.

Upon completion of the connection, the subject UE transmits the uplink data to the T-MeNB in Step ST1025 of FIG. 9. The subject UE transmits the uplink data in Step ST1025, for example, after notification of the setting completion in Step ST1024 when the connection is completed as illustrated in FIGS. 8 and 9.

Upon receipt of the uplink data in Step ST1025, the T-MeNB transmits the received uplink data to the S-GW in Step ST1026.

Upon receipt of the setting completion notification on the T-MeNB configuration and the SeNB configuration in Step ST1024 of FIG. 8, the T-MeNB notifies the SeNB in Step ST1027 of FIG. 9 that the setting for the SeNB has been completed in the UE. This notification is made using, for example, a SeNB Reconfiguration Complete message disclosed in FIG. 4.3.2.3-1 of Non-Patent Document 8.

Upon notification that the setting for the SeNB has been completed in the UE in Step ST1027, the SeNB performs the RA process with the subject UE in Step ST1028. Consequently, the subject UE synchronizes with the SeNB.

The subject UE after performing the RA process transmits the uplink data to the SeNB in Step ST1029.

Upon receipt of the uplink data in Step ST1029, the SeNB transmits the received uplink data to the T-MeNB in Step ST1030.

Upon receipt of the uplink data in Step ST1030, the T-MeNB transmits the received uplink data to the S-GW in Step ST1031. This process causes the uplink data to be in the DC.

Upon completion of the connection with the subject UE, the T-MeNB issues a Path Switch Request to the MME to change a transmission destination of the downlink data from the S-GW, from the S-MeNB to the T-MeNB in Step ST1032. This request is issued using, for example, a Path Switch Request message disclosed in FIG. 4.3.2.3-1 of Non-Patent Document 8.

Upon receipt of the Path Switch Request, the MME requests the S-GW to modify the bearer in Step ST1033. This request is issued using, for example, a Modify Bearer Request message disclosed in FIG. 4.3.2.3-1 of Non-Patent Document 8.

Upon receipt of the Modify Bearer Request, the S-GW performs a Path Switch in Step ST1034. The Path Switch is a process of changing a path that is a communication path between the UE and the MeNB from a path formed by the S-MeNB and the UE to a path formed by the T-MeNB and the UE.

Specifically, the S-GW changes the transmission destination of the downlink data to the T-MeNB in Step ST1034. In Step ST1035, the S-GW transmits the downlink data to the T-MeNB.

Upon receipt of the downlink data, the T-MeNB starts transmission with the SeNB using the split bearer. In Step ST1036, the T-MeNB transmits the downlink data to the subject UE.

In Step ST1037, the T-MeNB transmits the downlink data to the SeNB. Upon receipt of the downlink data in Step ST1037, the SeNB transmits the downlink data to the subject UE in Step ST1038.

The S-GW that has changed the transmission destination of the downlink data to the T-MeNB replies to the MME in Step ST1039 that the S-GW acknowledges the Modify Bearer Request. This reply is made using, for example, a Modify Bearer Request Ack message disclosed in FIG. 4.3.2.3-1 of Non-Patent Document 8.

Upon receipt of the Modify Bearer Request Ack in Step ST1039, the MME transmits the Path Switch Request Ack to the T-MeNB in Step ST1040. This Ack is issued using, for example, a Path Switch Request Ack message disclosed in FIG. 4.3.2.3-1 of Non-Patent Document 8.

Upon receipt of the Path Switch Request Ack in Step ST1040, the T-MeNB notifies the S-MeNB to release the UE context in Step ST1041. This notification is made using, for example, a UE Context Release message disclosed in FIG. 4.3.2.3-1 of Non-Patent Document 8.

Upon receipt of the UE Context Release notification, the S-MeNB requests the SeNB to release the UE context in Step ST1042. This notification is made using, for example, the UE Context Release message disclosed in FIG. 4.3.2.3-1 of Non-Patent Document 8. Upon receipt of the UE Context Release request, the SeNB releases the UE Context.

As described above, the first embodiment discloses a method that enables data transmission between the UE and the SeNB during the HO between the MeNBs while the split bearer is maintained. Specifically, in the first embodiment, transmission of the uplink data is started before a Path Switch process of the S-GW. In other words, the UE maintains a connection with the SeNB during the HO process, and starts transmitting data to the SeNB in Step ST1029 before the Path Switch in Step ST1034.

Consequently, the UE can transmit data when the HO is performed between the MeNBs that perform both a direct communication with the UE and a communication through the SeNB. Thus, latency in transmitting the uplink data can be reduced.

First Modification of First Embodiment

The first modification of the first embodiment will be disclosed as another example of the RA process with the SeNB and transmission of the uplink data according to the first embodiment.

Figure 10:
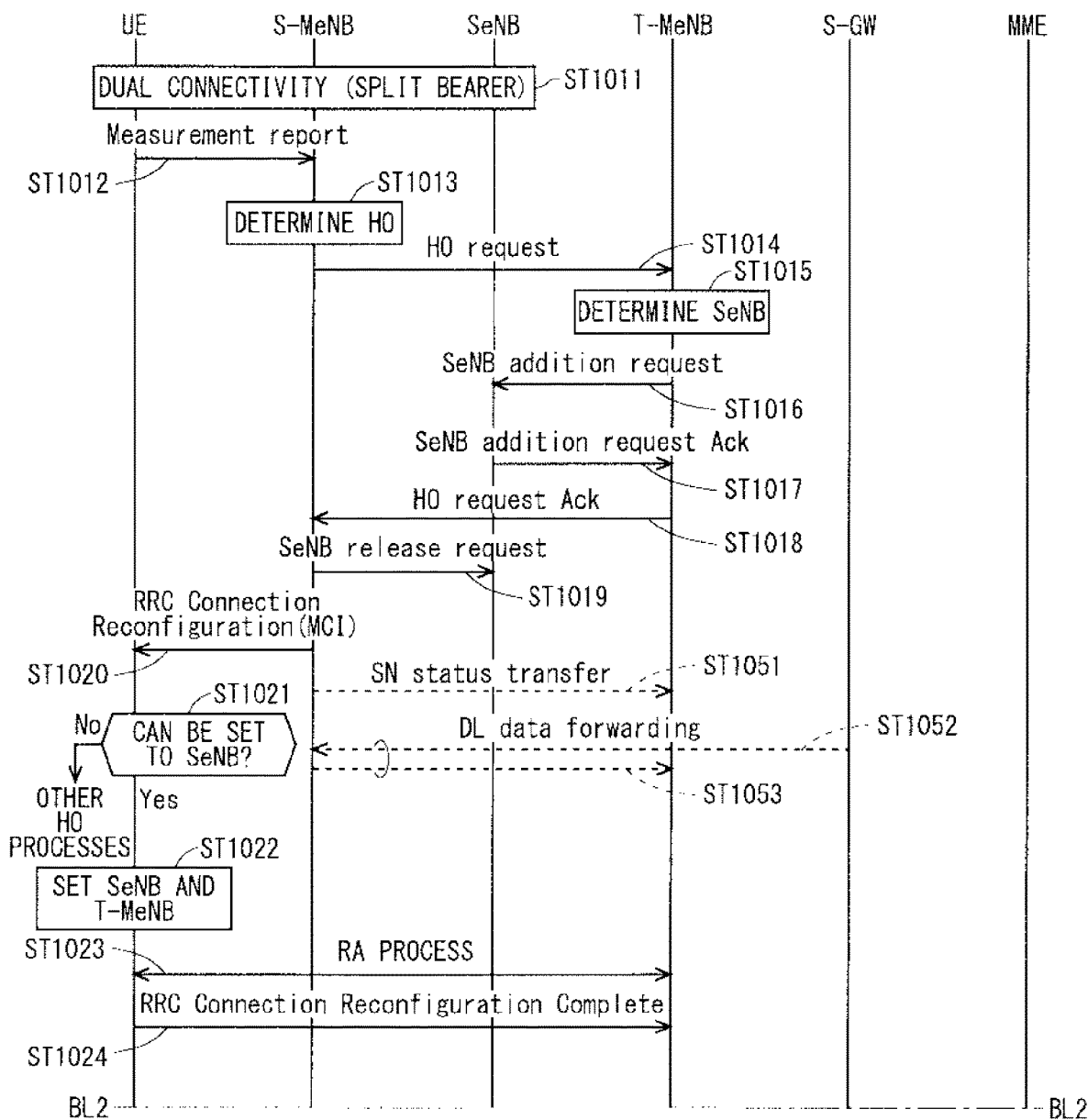
FIG. 10 illustrates an example sequence of handover processes in a communication system according to a first modification of the first embodiment.

FIGS. 10 and 11 illustrate an example sequence of handover processes in a communication system according to the first modification of the first embodiment. FIGS. 10 and 11 are connected across a border BL2. FIGS. 10 and 11 illustrate, as the handover processes, the example sequence of transmitting the uplink data and the downlink data during the HO between the MeNBs without any change in the SeNB. Since the handover processes according to the first modification are similar to those according to the first embodiment illustrated in FIGS. 8 and 9, the same step numbers will be assigned to the same Steps and the common description thereof will be omitted.

Similarly as the first embodiment, the processes in Steps ST1011 to ST1026 and Steps ST1051 to ST1053 are performed. Upon receipt of the notification of the setting completion of the T-MeNB configuration and the SeNB configuration in Step ST1024, the T-MeNB notifies the SeNB in Step ST1027 that the setting for the SeNB has been completed in the UE. This notification is made using, for example, the SeNB Reconfiguration Complete message disclosed in FIG. 4.3.2.3-1 of Non-Patent Document 8.

The subject UE that has transmitted the uplink data in Step ST1025 performs the RA process with the SeNB in Step ST1028B1 to synchronize with the SeNB. The subject UE that synchronizes with the SeNB transmits the uplink data to the SeNB in Step ST1029B1. The SeNB that has received the uplink data may have a buffer for the received uplink data. The received data may be buffered in the buffer.

In the first modification, the RA process in Step ST1028B1 and transmission of the uplink data in Step ST1029B1 are performed before the SeNB receives the notification in Step ST1027 that the setting for the SeNB has been completed in the UE as illustrated in FIG. 11.

Then, the processes in Steps ST1030 to ST1042 are performed similarly as the first embodiment. Consequently, the UE can transmit the uplink data to the SeNB earlier without waiting for the process in Step ST1027. Latency in transmitting the uplink data in the HO can be reduced because the uplink data is immediately transmitted when it is ready to transmit the uplink data from the SeNB to the T-MeNB.

FIGS. 12 and 13 illustrate another example sequence of the handover processes in the communication system according to the first modification of the first embodiment. FIGS. 12 and 13 are connected across a border BL3. FIGS. 12 and 13 illustrate, as the handover processes, the example sequence of transmitting the uplink data in the HO between the MeNBs without any change in the SeNB. Since the handover processes according to the first modification are similar to those according to the first embodiment illustrated in FIGS. 8 and 9, the same step numbers will be assigned to the same Steps and the common description thereof will be omitted.

Similarly as the first embodiment, the processes in Steps ST1011 to ST1022 and Steps ST1051 to ST1053 are performed. Next, the subject UE performs the RA process with the T-MeNB to synchronize with the T-MeNB in Step ST1023.

The subject UE that synchronizes with the T-MeNB through the RA process in Step ST1023 performs the RA process with the SeNB in Step ST1028C1 to synchronize with the SeNB.

The subject UE that synchronizes with the SeNB transmits the uplink data to the SeNB in Step ST1029C1. The SeNB that has received the uplink data may have a buffer for the received uplink data. The received data may be buffered in the buffer.

The subject UE after transmitting the uplink data notifies the T-MeNB of setting completion of the T-MeNB configuration and the SeNB configuration in Step ST1024. This notification is made using, for example, the RRC Connection Reconfiguration Complete message disclosed in FIG. 4.3.2.3-1 of Non-Patent Document 8.

Upon completion of the connection, the subject UE transmits the uplink data to the T-MeNB in Step ST1025. The subject UE transmits the uplink data in Step ST1025, for example, after notification of the setting completion in Step ST1024 when the connection is completed.

Upon receipt of the uplink data in Step ST1025, the T-MeNB transmits the received uplink data to the S-GW in Step ST1026.

Upon receipt of the setting completion notification on the T-MeNB configuration and the SeNB configuration in Step ST1024, the T-MeNB notifies the SeNB in Step ST1027 that the setting for the SeNB has been completed in the UE. This notification is made using, for example, the SeNB Reconfiguration Complete message disclosed in FIG. 4.3.2.3-1 of Non-Patent Document 8.

Then, the processes in Steps ST1030 to ST042 are performed similarly as the first embodiment. Consequently, the UE can transmit the uplink data to the SeNB earlier without waiting for the process in Step ST1024. Latency in transmitting the uplink data in the HO can be reduced because the uplink data is immediately transmitted when it is ready to transmit the uplink data from the SeNB to the T-MeNB.

Figure 14:
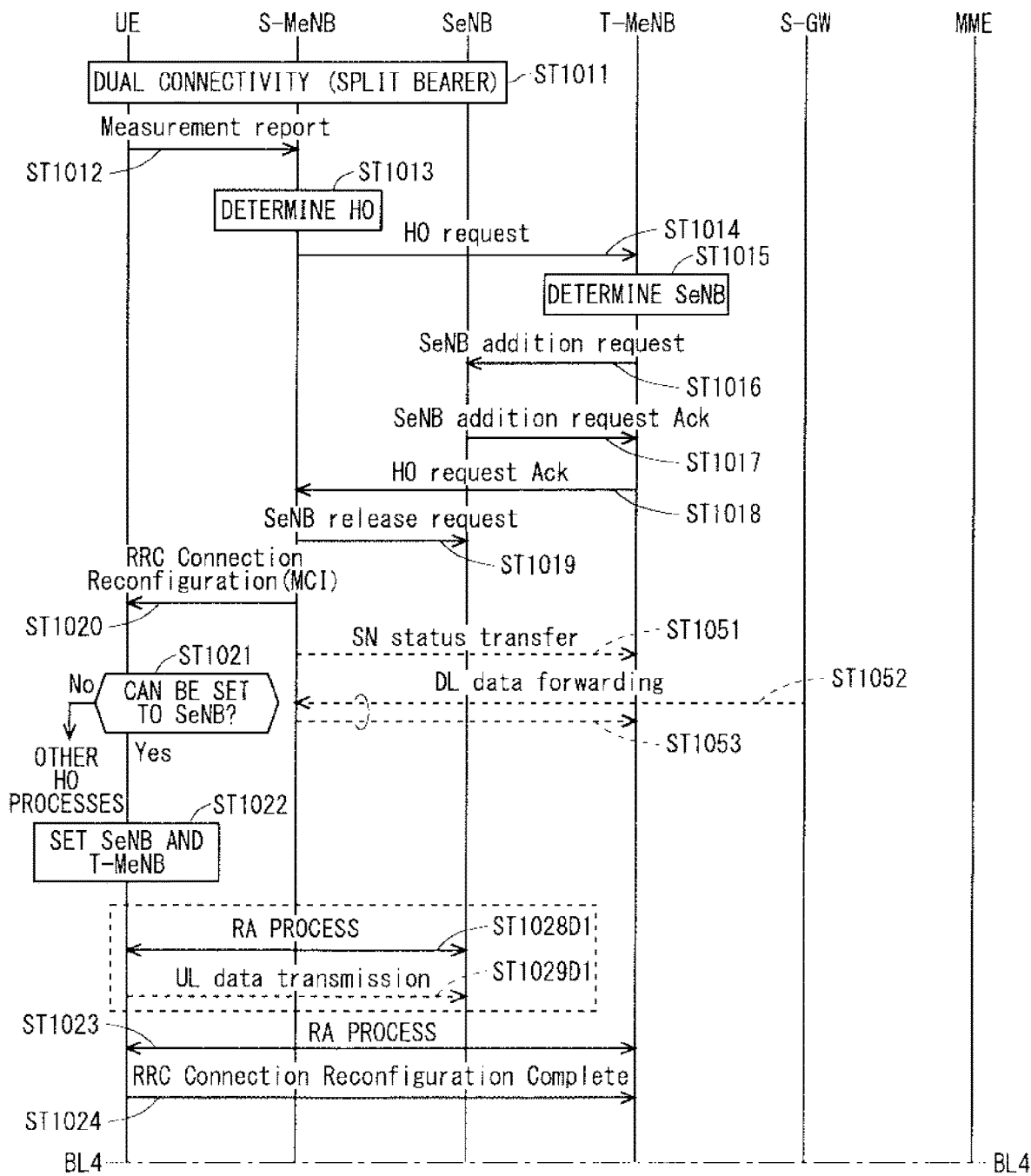
FIG. 14 illustrates another example sequence of handover processes in the communication system according to the first modification of the first embodiment.

FIGS. 14 and 15 illustrate another example sequence of handover processes in the communication system according to the first modification of the first embodiment. FIGS. 14 and 15 are connected across a border BL4. FIGS. 14 and 15 illustrate, as the handover processes, the other example sequence of transmitting the uplink data in the HO between the MeNBs without any change in the SeNB. Since the handover processes according to the first modification are similar to those according to the first embodiment illustrated in FIGS. 8 and 9, the same step numbers will be assigned to the same Steps and the common description thereof will be omitted.

Similarly as the first embodiment, the processes in Steps ST1011 to ST1020 and Steps ST1051 to ST1053 are performed. In Step ST1021, the subject UE determines whether the split bearer configuration notified can be set to the SeNB. When determining that the setting is possible, the subject UE proceeds to Step ST1022. When determining that the setting is not possible, the subject UE performs the processes disclosed in FIG. 4.3.2.3-1 of Non-Patent Document 8 as the other HO processes because the HO processes cannot be performed between the MeNBs without any change in the SeNB while the split bearer is maintained.

In Step ST1022, the subject UE sets the split bearer configuration to the corresponding SeNB and T-MeNB.

Particularly, the setting to the SeNB will be disclosed. When the setting is intended for maintaining the split bearer using the same SeNB, the subject UE may not reset the MAC for the SeNB (SCG) but reconfigures the MAC. The RLC for the SeNB (SCG) is reconfigured. The PDCP for the SeNB (SCG) is reconfigured.

After setting the split bearer configuration to the corresponding SeNB and T-MeNB in Step ST1022, the subject UE performs the RA process with the SeNB in Step ST1028D1. Consequently, the subject UE synchronizes with the SeNB.

The subject UE that synchronizes with the SeNB transmits the uplink data to the SeNB in Step ST1029D1. The SeNB that has received the uplink data may have a buffer for the received uplink data. The received data may be buffered in the buffer.

Upon transmission of the uplink data in Step ST1029D1, the subject UE performs an RA process with the T-MeNB in Step ST1023 to synchronize with the T-MeNB.

The subject UE after performing the RA process notifies the T-MeNB of setting completion of the T-MeNB configuration and the SeNB configuration in Step ST1024. This notification is made using, for example, the RRC Connection Reconfiguration Complete message disclosed in FIG. 4.3.2.3-1 of Non-Patent Document 8.

Upon completion of the connection, the subject UE transmits the uplink data to the T-MeNB in Step ST1025. The subject UE transmits the uplink data in Step ST1025, for example, after notification of the setting completion in Step ST1024 when the connection is completed.

Upon receipt of the uplink data in Step ST1025, the T-MeNB transmits the received uplink data to the S-GW in Step ST1026.

Upon receipt of the setting completion notification on the T-MeNB configuration and the SeNB configuration in Step ST1024, the T-MeNB notifies the SeNB in Step ST1027 that the setting for the SeNB has been completed in the UE. This notification is made using, for example, the SeNB Reconfiguration Complete message disclosed in FIG. 4.3.2.3-1 of Non-Patent Document 8.

Upon receipt of the uplink data in Step ST1029D1, the SeNB transmits the received uplink data to the T-MeNB in Step ST1030. Then, the processes in Steps ST1031 to ST1042 are performed similarly as the first embodiment. Consequently, the UE can transmit the uplink data to the SeNB earlier without waiting for the process in Step ST1023. Latency in transmitting the uplink data in the HO can be reduced because the uplink data is immediately transmitted when it is ready to transmit the uplink data from the SeNB to the T-MeNB.

In any of the examples in FIGS. 10 to 15 according to the first modification, the subject UE transmits the uplink data to the SeNB in Steps ST1029B1, ST1029C1, and ST1029D1 after completion of the RA process between the subject UE and the SeNB in Steps ST1028B1, ST1028C1, and ST1028D1, respectively.

The timing of the RA process between the subject UE and the SeNB in each of Steps ST1028B1, ST1028C1, and ST1028D1 is earlier in sequence than that of the first embodiment. The timing of transmission of the uplink data from the subject UE to the SeNB in each of Steps ST1029B1, ST1029C1, and ST1029D1 is earlier in sequence than that of the first embodiment.

Consequently, the subject UE can transmit the uplink data to the SeNB earlier during the HO between the MeNBs. Latency in transmitting the uplink data in the HO can be reduced because the uplink data is immediately transmitted when it is ready to transmit the uplink data from the SeNB to the T-MeNB.

Second Modification of First Embodiment

The second modification of the first embodiment will be disclosed as another example of transmitting the uplink data between the SeNB and the T-MeNB after the RA process with the SeNB according to the first embodiment.

Figure 17:
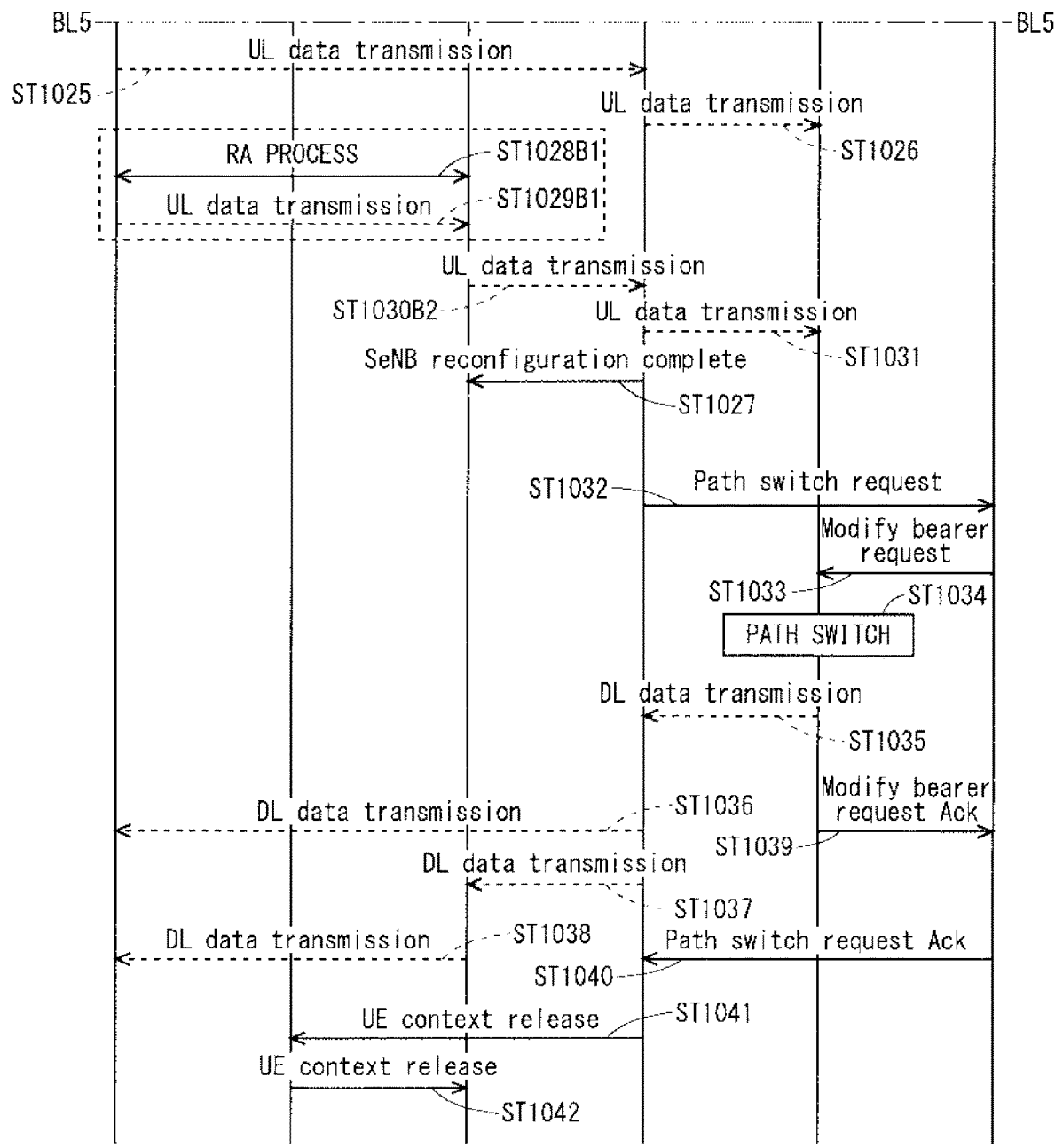
FIG. 17 illustrates the example sequence of handover processes in the communication system according to the second modification of the first embodiment.

FIGS. 16 and 17 illustrate an example sequence of handover processes in a communication system according to the second modification of the first embodiment. FIGS. 16 and 17 are connected across a border BL5. FIGS. 16 and 17 illustrate, as the handover processes, the example sequence of transmitting the uplink data and the downlink data in the HO between the MeNBs without any change in the SeNB according to the second modification. Since the handover processes according to the second modification are similar to those according to the first modification of the first embodiment illustrated in FIGS. 10 and 11, the same step numbers will be assigned to the same Steps and the common description thereof will be omitted.

Similarly as the example illustrated in FIGS. 10 and 11 according to the first modification of the first embodiment, the processes in Steps ST1011 to ST1026, Step ST1028B1, Step ST1029B1, and Steps ST1051 to ST1053 are performed. Before being notified that the setting for the SeNB has been completed in the UE in Step ST1027, the SeNB that has received the uplink data in Step ST1029B1 transmits the uplink data received in Step ST1029B1 to the T-MeNB in Step ST1030B2 immediately after Step ST1029B1.

Upon receipt of the uplink data transmitted in Step ST1030B2, the T-MeNB transmits the uplink data received in Step ST1030B2 to the S-GW in Step ST1031 immediately after Step ST1030B2. The T-MeNB may have a buffer for the received uplink data. The received data may be buffered in the buffer.

Next, the T-MeNB notifies the SeNB in Step ST1027 that the setting for the SeNB has been completed in the UE. Then, the processes in Steps ST1032 to ST1042 are performed similarly as the first modification of the first embodiment. Consequently, the uplink data can be transmitted from the SeNB to the T-MeNB and from the T-MeNB to the S-GW earlier without waiting for the process in Step ST1027. Thus, latency in transmitting the uplink data in the HO can be reduced.

Figure 18:
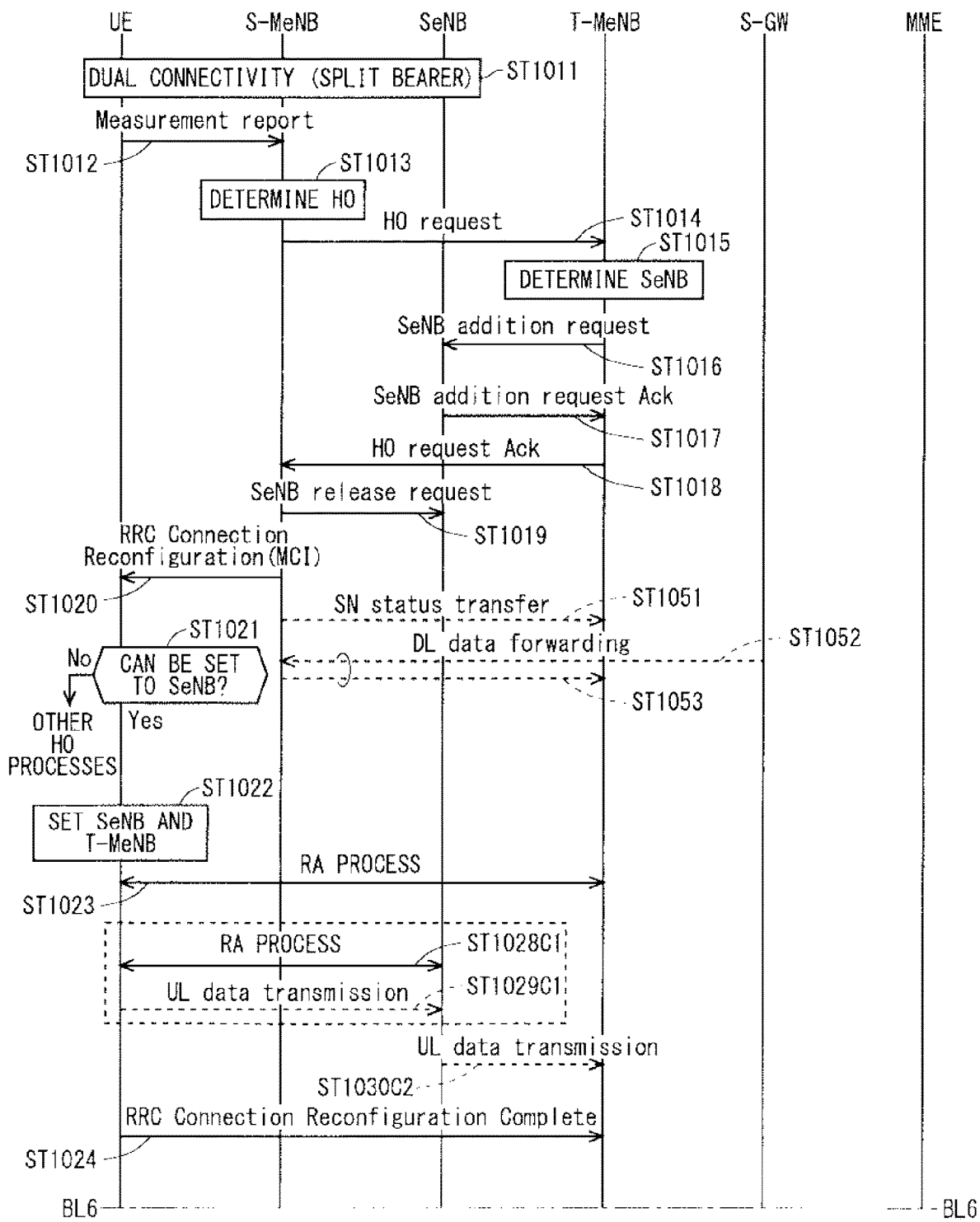
FIG. 18 illustrates another example sequence of handover processes in the communication system according to the second modification of the first embodiment.

FIGS. 18 and 19 illustrate another example sequence of the handover processes in the communication system according to the second modification of the first embodiment. FIGS. 18 and 19 are connected across a border BL6. FIGS. 18 and 19 illustrate, as the handover processes, the other example sequence of transmitting the uplink data in the HO between the MeNBs without any change in the SeNB according to the second modification. Since the handover processes illustrated in FIGS. 18 and 19 are similar to those according to the first modification of the first embodiment illustrated in FIGS. 12 and 13, the same step numbers will be assigned to the same Steps and the common description thereof will be omitted.

Similarly as the example illustrated in FIGS. 12 and 13 according to the first modification of the first embodiment, the processes in Steps ST1011 to ST1023, Step ST1028C1, Step ST1029C1, and Steps ST1051 to ST1053 are performed. Upon receipt of the uplink data transmitted in Step ST1029C1, the SeNB transmits the uplink data received in Step ST1029C1 to the T-MeNB in Step ST1030C2 immediately after Step ST1029C1.

In other words, the T-MeNB receives the uplink data from the SeNB in Step ST1030C2 before receiving the setting completion notification on the T-MeNB configuration and the SeNB configuration in Step ST1024. The T-MeNB may have a buffer for the received uplink data. The received data may be buffered in the buffer.

Next, the subject UE notifies the T-MeNB of setting completion of the T-MeNB configuration and the SeNB configuration in Step ST1024. In Step ST1025, the subject UE transmits the uplink data to the T-MeNB. Upon receipt of the uplink data, the T-MeNB transmits the uplink data to the S-GW in Step ST1026.

After being notified of the setting completion of the T-MeNB configuration and the SeNB configuration in Step ST1024, the T-MeNB transmits the uplink data received in Steps ST1030C2 and ST1025 to the S-GW in Step ST1026.

Then, the processes in Steps ST1027 to ST1042 are performed similarly as the first modification of the first embodiment. Consequently, the SeNB can transmit the uplink data to the T-MeNB earlier without waiting for the process in Step ST1024. Latency in transmitting the uplink data in the HO can be reduced because the uplink data can be immediately transmitted when it is ready to transmit the uplink data from the T-MeNB to the S-GW.

Figure 21:
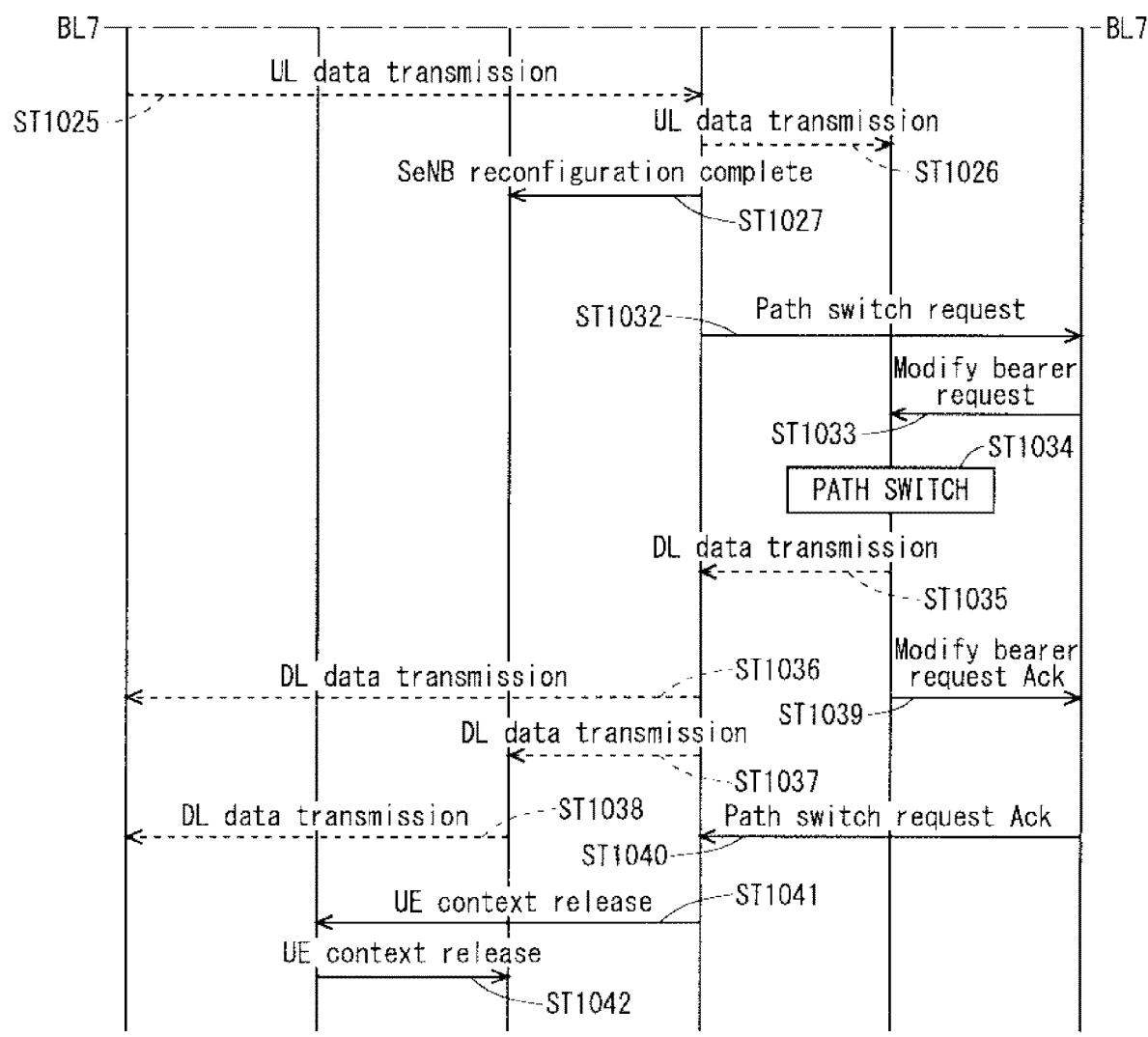
FIG. 21 illustrates the other example sequence of handover processes in the communication system according to the second modification of the first embodiment.

FIGS. 20 and 21 illustrate another example sequence of the handover processes in the communication system according to the second modification of the first embodiment. FIGS. 20 and 21 are connected across a border BL7. FIGS. 20 and 21 illustrate, as the handover processes, the other example sequence of transmitting the uplink data in the HO between the MeNBs without any change in the SeNB according to the second modification. Since the handover processes illustrated in FIGS. 20 and 21 are similar to those according to the first modification of the first embodiment illustrated in FIGS. 14 and 15, the same step numbers will be assigned to the same Steps and the common description thereof will be omitted.

Then, the processes in Steps ST1011 to ST1022 and Steps ST1051 to ST1053 are performed similarly as the example illustrated in FIGS. 14 and 15 according to the first modification of the first embodiment. After setting the split bearer configuration to the corresponding SeNB and T-MeNB in Step ST1022, the subject UE performs the RA process with the SeNB in Step ST1028D1. Consequently, the subject UE synchronizes with the SeNB.

In Step ST1029D1, the subject UE transmits the uplink data to the SeNB. Upon receipt of the uplink data transmitted from the subject UE in Step ST1029D1, the SeNB transmits the uplink data received in Step ST1029D1 to the T-MeNB in Step ST1030D2 immediately after Step ST1029D1.

In other words, the T-MeNB receives the uplink data from the SeNB in Step ST1030D2 before the RA process in Step ST1023. The T-MeNB may have a buffer for the received uplink data. The received data may be buffered in the buffer.

Next, the subject UE performs the RA process with the T-MeNB in Step ST1023. Consequently, the subject UE synchronizes with the SeNB.

Next, the subject UE notifies the T-MeNB of setting completion of the T-MeNB configuration and the SeNB configuration in Step ST1024. In Step ST1025, the subject UE transmits the uplink data to the T-MeNB. Upon receipt of the uplink data, the T-MeNB transmits the uplink data to the S-GW in Step ST1026.

After being notified of the setting completion of the T-MeNB configuration and the SeNB configuration in Step ST1024, the T-MeNB transmits the uplink data received in Steps ST1030D2 and ST1025 to the S-GW in Step ST1026.

Then, the processes in Steps ST1027 to ST1042 are performed similarly as the first modification of the first embodiment.

As described above according to the second modification, upon receipt of the uplink data transmitted from the subject UE in Steps ST1029B1, ST1029C1, and ST1029D1, the SeNB immediately transmits the received uplink data to the T-MeNB in the immediate Steps ST1030B2, ST1030C2, and ST1030D2, respectively. Consequently, the uplink data can be transmitted to the T-MeNB through the SeNB earlier during the HO between the MeNBs. Latency in transmitting the uplink data in the HO can be reduced because the uplink data is immediately transmitted when it is ready to transmit the uplink data from the T-MeNB to the S-GW.

Third Modification of First Embodiment

The third modification of the first embodiment will be disclosed as another example of transmitting, between the T-MeNB and the S-GW, the uplink data received from the SeNB according to the first embodiment.

Figure 23:
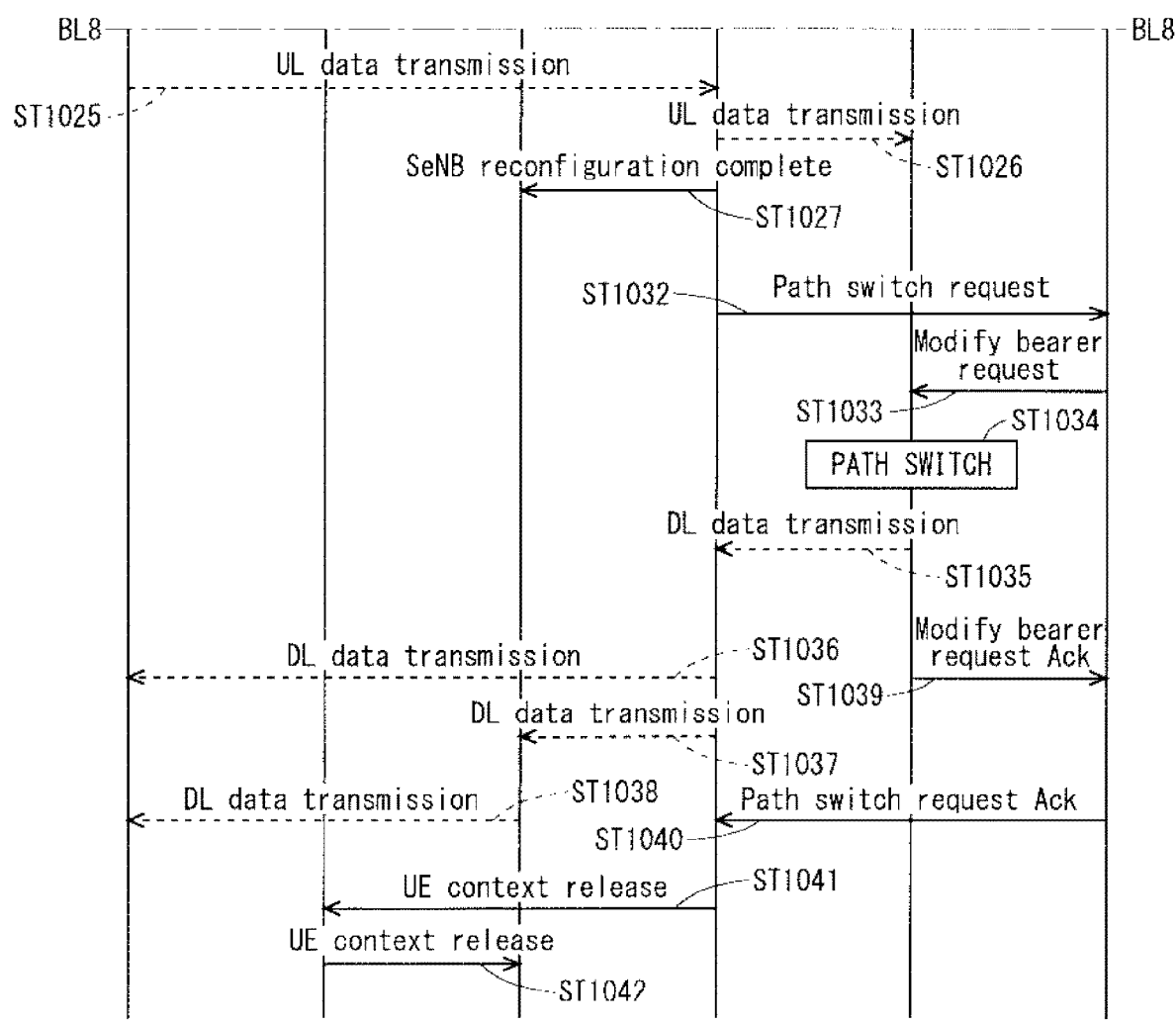
FIG. 23 illustrates the example sequence of handover processes in the communication system according to the third modification of the first embodiment.

FIGS. 22 and 23 illustrate an example sequence of handover processes in a communication system according to the third modification of the first embodiment. FIGS. 22 and 23 are connected across a border BL8. FIGS. 22 and 23 illustrate, as the handover processes, the other example sequence of transmitting the uplink data in the HO between the MeNBs without any change in the SeNB according to the third modification. Since the handover processes according to the third modification are similar to those according to the second modification of the first embodiment illustrated in FIGS. 18 and 19, the same step numbers will be assigned to the same Steps and the common description thereof will be omitted.

Similarly as the second modification of the first embodiment illustrated in FIGS. 18 and 19, the processes in Steps ST1011 to ST1023, ST1028C1, ST1029C1, ST1030C2, and ST1051 to ST1053 are performed.

Upon receipt of the uplink data transmitted from the subject UE in Step ST1030C2, the T-MeNB immediately transmits the uplink data to the S-GW in Step ST1031C3 before receiving the setting completion notification on the T-MeNB configuration and the SeNB configuration in Step ST1024. Then, the processes in Steps ST1024 to ST1042 are performed similarly as the first embodiment.

Figure 24:
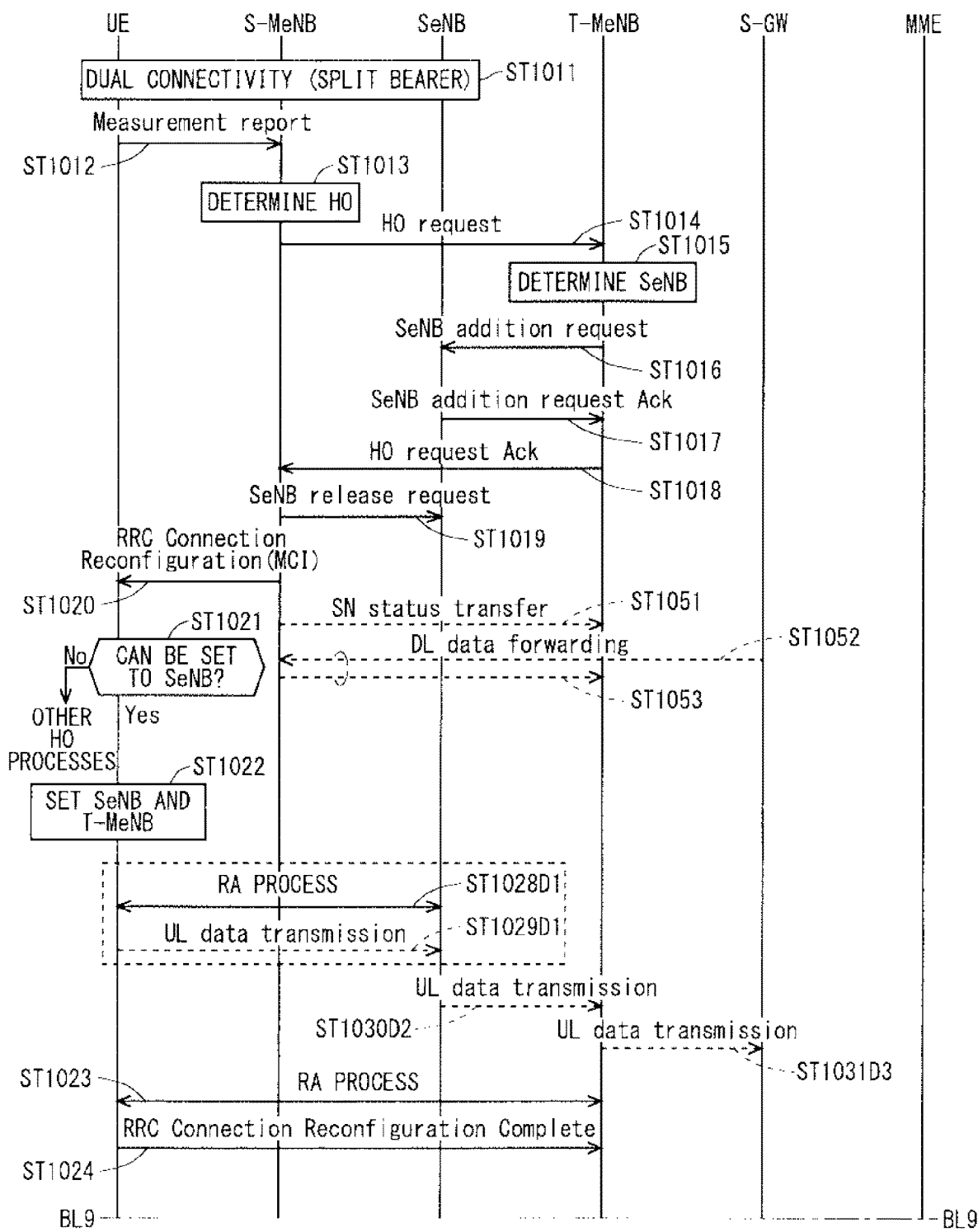
FIG. 24 illustrates another example sequence of handover processes in the communication system according to the third modification of the first embodiment.

FIGS. 24 and 25 illustrate another example sequence of the handover processes in the communication system according to the third modification of the first embodiment. FIGS. 24 and 25 are connected across a border BL9. FIGS. 24 and 25 illustrate, as the handover processes, the example sequence of transmitting the uplink data in the HO between the MeNBs without any change in the SeNB according to the third modification. Since the handover processes according to the third modification are similar to those according to the second modification of the first embodiment illustrated in FIGS. 20 and 21, the same step numbers will be assigned to the same Steps and the common description thereof will be omitted.

Similarly as the second modification of the first embodiment illustrated in FIGS. 20 and 21, the processes in Steps ST1011 to ST1022, ST1028D1, ST1029D1, ST1030D2, and ST1051 to ST1053 are performed.

Upon receipt of the uplink data transmitted from the subject UE in Step ST1030D2, the T-MeNB immediately transmits the uplink data to the S-GW in Step ST1031D3 before the RA process in Step ST1023. The T-MeNB also notifies the subject UE of transmission of the uplink data through the SeNB.

Upon being notified, the UE discards the buffer for the uplink data transmitted in Step ST1029D1. Then, the processes in Steps ST1023 to ST1042 are performed similarly as the first modification of the first embodiment.

As described above according to the third modification, upon receipt of the uplink data transmitted from the SeNB in Steps ST1030C2 and ST1030D2, the T-MeNB immediately transmits the received uplink data to the S-GW in the immediate Steps ST1031C3 and ST1031D3. Consequently, data transmitted to the T-MeNB through the SeNB can be transmitted to the S-GW earlier during the HO between the MeNBs.

Since the uplink data can be transmitted during the HO between the MeNBs by transmitting data through the SeNB, latency in transmitting the uplink data in the HO can be reduced. Since the subject UE can transmit the uplink data to the S-GW earlier, the buffer for the uplink data can be reduced.

Fourth Modification of First Embodiment

The fourth modification of the first embodiment will be disclosed as another example where the subject UE synchronizes with the SeNB during the HO between the MeNBs.

Figure 26:
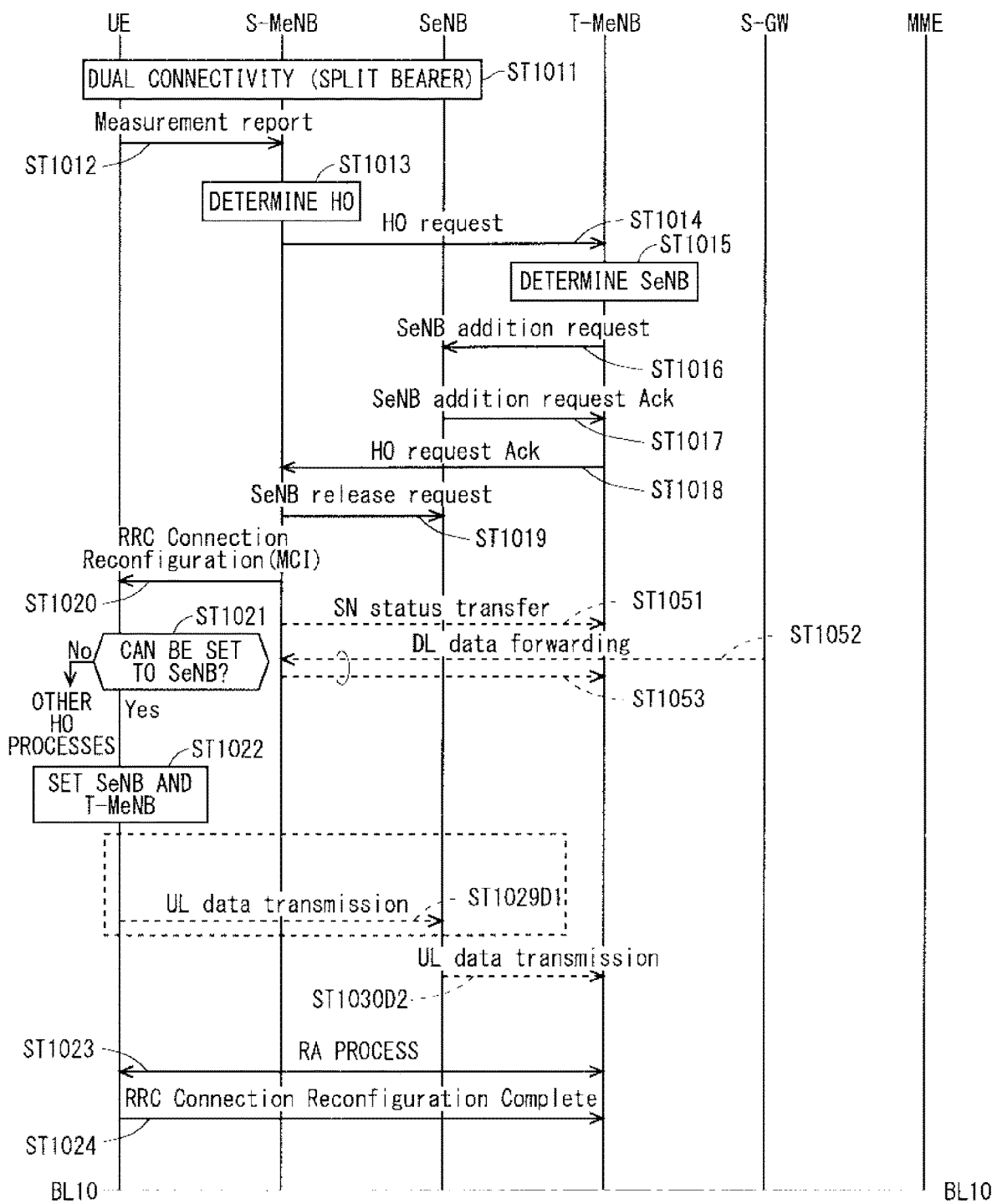
FIG. 26 illustrates an example sequence of handover processes in a communication system according to a fourth modification of the first embodiment.

FIGS. 26 and 27 illustrate an example sequence of handover processes in a communication system according to the fourth modification of the first embodiment. FIGS. 26 and 27 are connected across a border BL10. FIGS. 26 and 27 illustrate, as the handover processes, the example sequence of transmitting the uplink data in the HO between the MeNBs without any change in the SeNB according to the fourth modification. Since the handover processes illustrated in FIGS. 26 and 27 are similar to those according to the third modification of the first embodiment illustrated in FIGS. 24 and 25, the same step numbers will be assigned to the same Steps and the common description thereof will be omitted.

The processes in Steps ST1011 to ST1022 and Steps ST1051 to ST1053 are performed similarly as the third modification of the first embodiment illustrated in FIGS. 24 and 25.

Since the SeNB is not changed during the HO between the MeNBs, it is probable that the subject UE synchronizes with the SeNB. As such, when the subject UE synchronizes with the SeNB, the RA process in Step ST1028D1 of FIG. 24 may be omitted.

Thus, as illustrated in FIG. 26 according to the fourth modification, the subject UE transmits the uplink data to the SeNB in Step ST1029D1 subsequently after setting the split bearer configuration to the corresponding SeNB and T-MeNB in Step ST 1022. In Step ST1029D1, the subject UE may transmit a scheduling request (SR) to the SeNB. After transmitting the SR, the UE transmits the uplink data according to the uplink-scheduling from the SeNB.

Upon receipt of the uplink data from the UE in Step ST1029D1, the SeNB transmits the uplink data to the T-MeNB in Step ST1030D2. Then, the processes in Steps ST1023 to ST1042 are performed similarly as the third modification of the first embodiment.

As described above according to the fourth modification, when the subject UE synchronizes with the SeNB, the subject UE sets the split bearer configuration to the corresponding SeNB and T-MeNB in Step ST 1022, and immediately transmits the uplink data to the SeNB in Step ST1029D1. Consequently, the subject UE can transmit the uplink data to the SeNB much earlier.

Fifth Modification of First Embodiment

The fifth modification will disclose example processes when a Handover Failure (abbreviated as HOF) occurs during the HO between the MeNBs without any change in the SeNB while the split bearer in the DC is being executed.

In a conventional scheme, for example, in the sequence described in FIG. 4.3.2.3-1 of Non-Patent Document 8, the HOF between the MeNBs causes a problem with incapability to release resources allocated by the SeNB in response to the SeNB Addition Request message transmitted from the T-MeNB to the SeNB. Examples of the problem include a problem with incapability to release the SeNB UE X2AP ID, the bearer setting, the UE context, etc. If the resources cannot be released, the resources will be exhausted with repeated HOFs and the communication cannot be performed.

In the fifth modification, when the HOF is detected, a message for releasing these resources set to the SeNB is notified in a process corresponding to the SeNB Addition Request message transmitted from the T-MeNB to the SeNB.

The method for detecting the HOF is preferably a method for starting a timer after the T-MeNB allows the HO and then stopping the timer when it is determined that the UE synchronizes with the SeNB.

Figure 28:
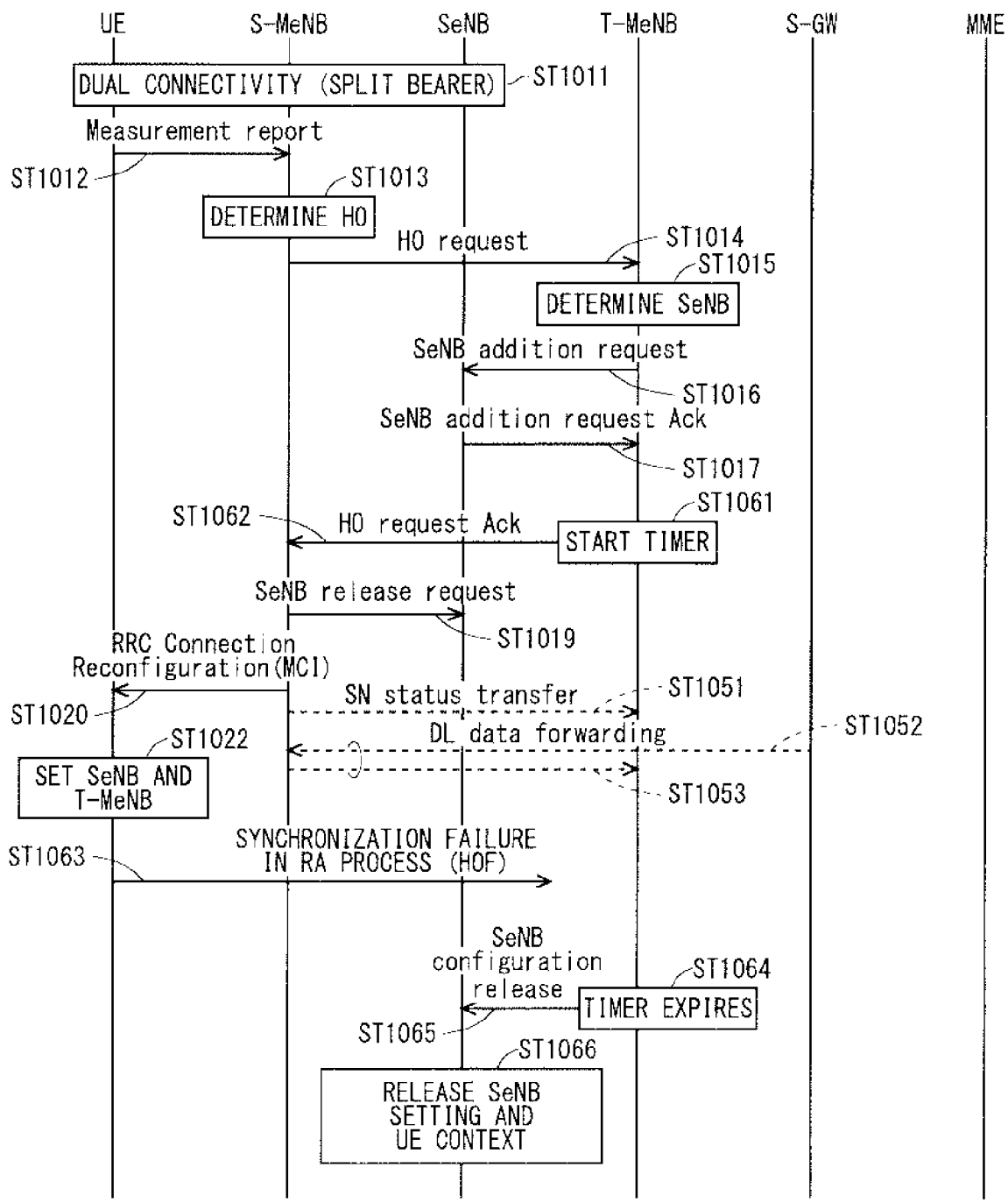
FIG. 28 illustrates an example sequence of handover processes in a communication system according to a fifth modification of the first embodiment.

FIG. 28 illustrates an example sequence of handover processes in the communication system according to the fifth modification of the first embodiment. Since the handover processes according to the fifth modification are similar to those according to the first embodiment illustrated in FIGS. 8 and 9, the same step numbers will be assigned to the same Steps and the common description thereof will be omitted.

Similarly as the first embodiment illustrated in FIGS. 8 and 9, the processes in Steps ST1011 to ST1017 are performed. In this modification, the processes proceed to Steps ST1061 and ST1062 after the process in Step ST1017.

In Step ST1062, the T-MeNB transmits a HO Request Ack to the S-MeNB. The T-MeNB determines transmission of the HO Request Ack as HO allowance to the UE and starts the timer in Step ST1061. Upon receipt of the RRC Connection Reconfiguration Complete message from the UE, it is preferred to determine that the UE synchronizes with the SeNB and stop the timer.

When the synchronization between the UE and the SeNB fails in the RA process as in Step ST1063 and the HOF is detected, for example, when the T-MeNB cannot receive the RRC Connection Reconfiguration Complete message from the UE, the T-MeNB sets the timer to expire in Step ST1064. Then, in Step ST1065, the T-MeNB transmits, to the SeNB, a message for releasing the resources.

Upon receipt of the message for releasing the resources, in Step ST1066, the SeNB releases the resources allocated by the SeNB in response to the SeNB Addition Request message. For example, the SeNB UE X2AP ID, the bearer setting, the UE context, etc. are released. If the resources for the connection between the T-MeNB and the SeNB that are set by the S-MeNB are allocated, such a setting is preferably released.

Examples of the message for releasing the resources from the T-MeNB to the SeNB may include a new message such as a SeNB Configuration Release message. Alternatively, reject information may be provided as information on the SeNB Reconfiguration Complete message, and the HOF may be added as the cause.

Since the resources allocated by the SeNB can be released in the fifth modification, the resources can be prevented from exhaustion even with repeated HOFs.

Figure 30:
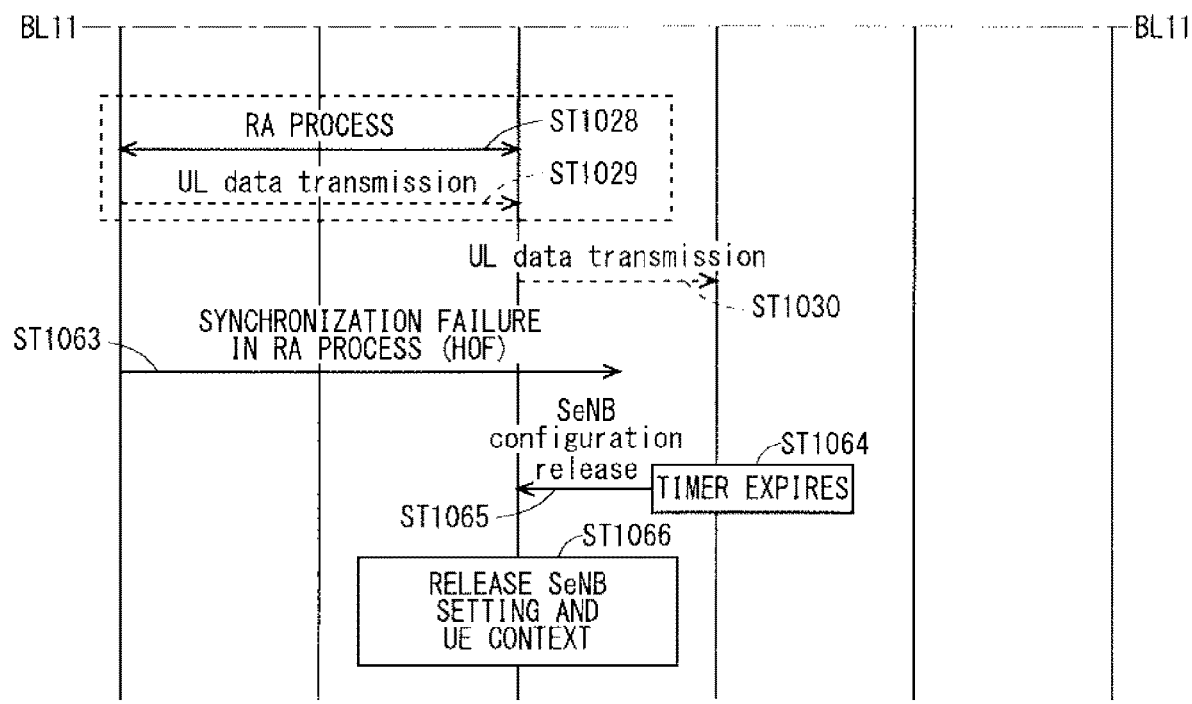
FIG. 30 illustrates the other example sequence of handover processes in the communication system according to the fifth modification of the first embodiment.

Next, a function of handling the uplink data in the T-MeNB will be described with reference to FIGS. 29 and 30. FIGS. 29 and 30 illustrate another example sequence of the handover processes in the communication system according to the fifth modification of the first embodiment. FIGS. 29 and 30 are connected across a border BL11. FIGS. 29 and 30 illustrate, as the handover processes, the example sequence of transmitting the uplink data in the HO between the MeNBs without any change in the SeNB according to the fifth modification. Since the handover processes according to the fifth modification are similar to those according to the first embodiment illustrated in FIGS. 8 and 9 and those according to the fifth modification of the first embodiment illustrated in FIG. 28, the same step numbers will be assigned to the same Steps and the common description thereof will be omitted.

The processes in Steps ST1011 to ST1022 and Steps ST1051 to ST1053 are performed similarly as the first embodiment illustrated in FIGS. 8 and 9. In the fifth modification, processes in Steps ST1028 to ST1030 are performed after the process in Step ST1022.

As described in the first embodiment, it is effective for the SeNB to have a function of transmitting the uplink data to the T-MeNB upon establishment of synchronization with the UE. It is also effective for the T-MeNB to have a function of storing data and waiting for a state in which the S-GW is capable of reception, for example, a Path Switch in the S-GW.

Sometimes herein, synchronization between the UE and the T-MeNB cannot be established, the RA process between the UE and the SeNB in Step ST1028 is performed earlier than the timer expiration, and the T-MeNB detects the HOF in Step ST1063 while the synchronization between the UE and the T-MeNB still cannot be established. Here, the SeNB has already transmitted some PDCP packets to the T-MeNB.

In such a case, the T-MeNB may have a function of discarding the uplink data received from the SeNB before detecting the HOF, when the timer expires in Step ST1064, that is, when the T-MeNB detects the HOF. Since the resources can be released accordingly, it is possible to avoid exhaustion of the resources for buffering data of the T-MeNB with the repeated HOFs.

Then, the processes in Steps ST1065 and ST1066 are performed similarly as those in FIG. 28.

Next, a function of handling the uplink data in the T-MeNB will be described with reference to FIGS. 31 and 32. FIGS. 31 and 32 illustrate another example sequence of the handover processes in the communication system according to the fifth modification of the first embodiment. FIGS. 31 and 32 are connected across a border BL12. FIGS. 31 and 32 illustrate, as the handover processes, the example sequence of transmitting the uplink data in the HO between the MeNBs without any change in the SeNB according to the fifth modification. Since the handover processes according to the fifth modification are similar to those according to the first embodiment illustrated in FIGS. 8 and 9 and those according to the fifth modification of the first embodiment illustrated in FIG. 28, the same step numbers will be assigned to the same Steps and the common description thereof will be omitted.

As described in the first embodiment, it is effective for the SeNB to have a function for transmitting the uplink data to the T-MeNB upon establishment of synchronization with the UE and for the T-MeNB to have a function for promptly transmitting the received uplink data to the S-GW, for example, when the S-GW can always receive data from both the T-MeNB and the S-MeNB. Here, when the synchronization between the UE and the T-MeNB cannot be established and the RA process between the UE and the SeNB is performed earlier than the timer expiration, the SeNB has already transmitted some PDCP packets to the T-MeNB before detecting the HO. Likewise, the T-MeNB has already transmitted data, for example, some General Packet Radio Service (GPRS) Tunneling Protocol (GTP) packets to the S-GW.

In such a case, the T-MeNB may have a function of transmitting the uplink data received from the SeNB before detecting the HOF, when the timer expires, that is, when the T-MeNB detects the HOF. Since the function eliminates the need for discarding the uplink data that can be received by the SeNB and for retransmitting the uplink data from the UE, the efficient transmission becomes possible.

As described in the third modification of the first embodiment, the T-MeNB may transmit, to the UE through the SeNB, a successful reception acknowledgement of the uplink data from the UE. Upon receipt of the successful reception acknowledgement of the uplink data from the T-MeNB, the UE may discard the uplink data. Consequently, the UE can discard earlier the uplink data successfully transmitted, and the buffer capacity of the uplink data can be reduced.

Next, three examples of providing the SeNB with a timer for determining establishment of synchronization will be described with reference to FIGS. 33 to 36.

Figure 33:
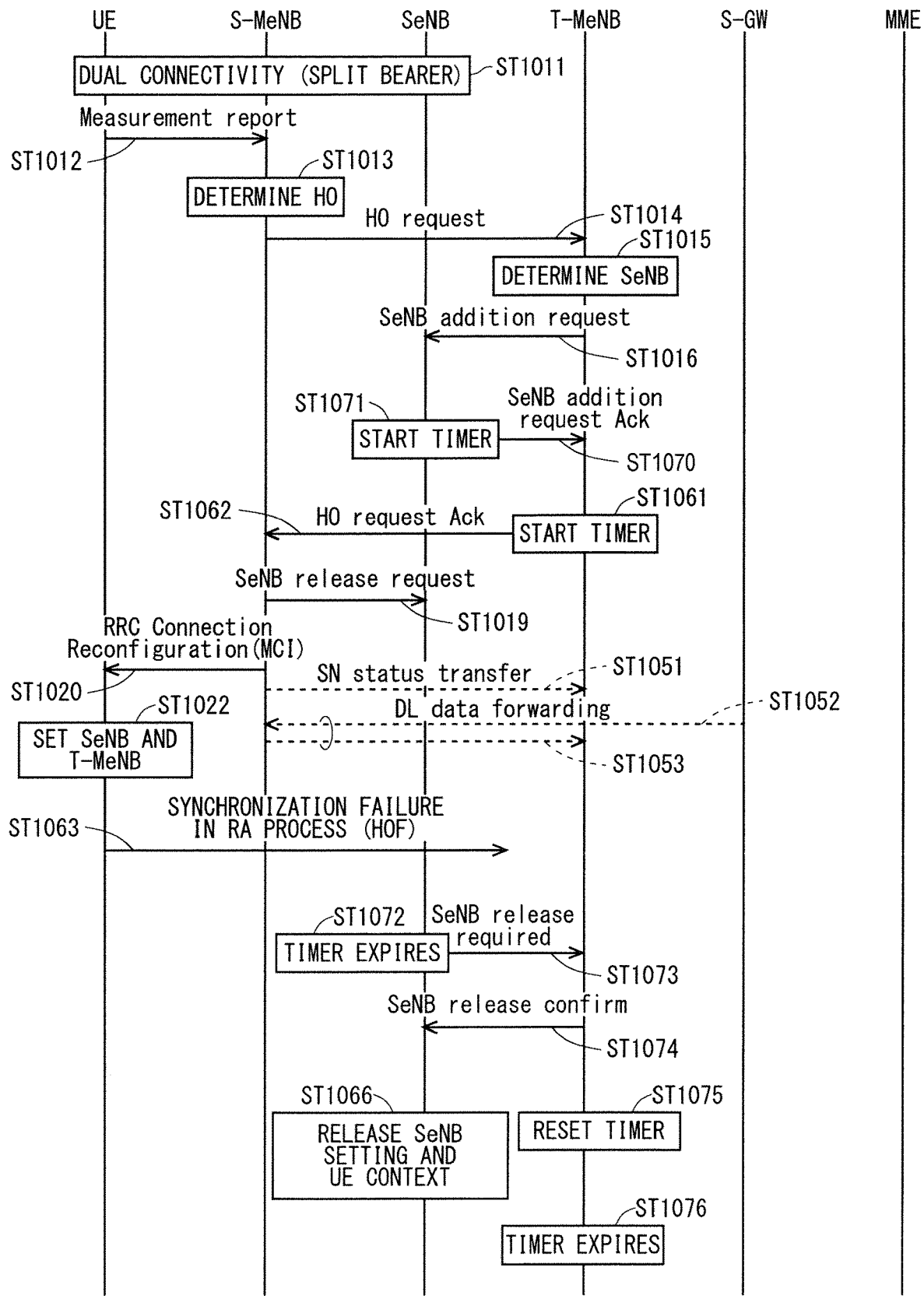
FIG. 33 illustrates another example sequence of handover processes in the communication system according to the fifth modification of the first embodiment.
Figure 34:
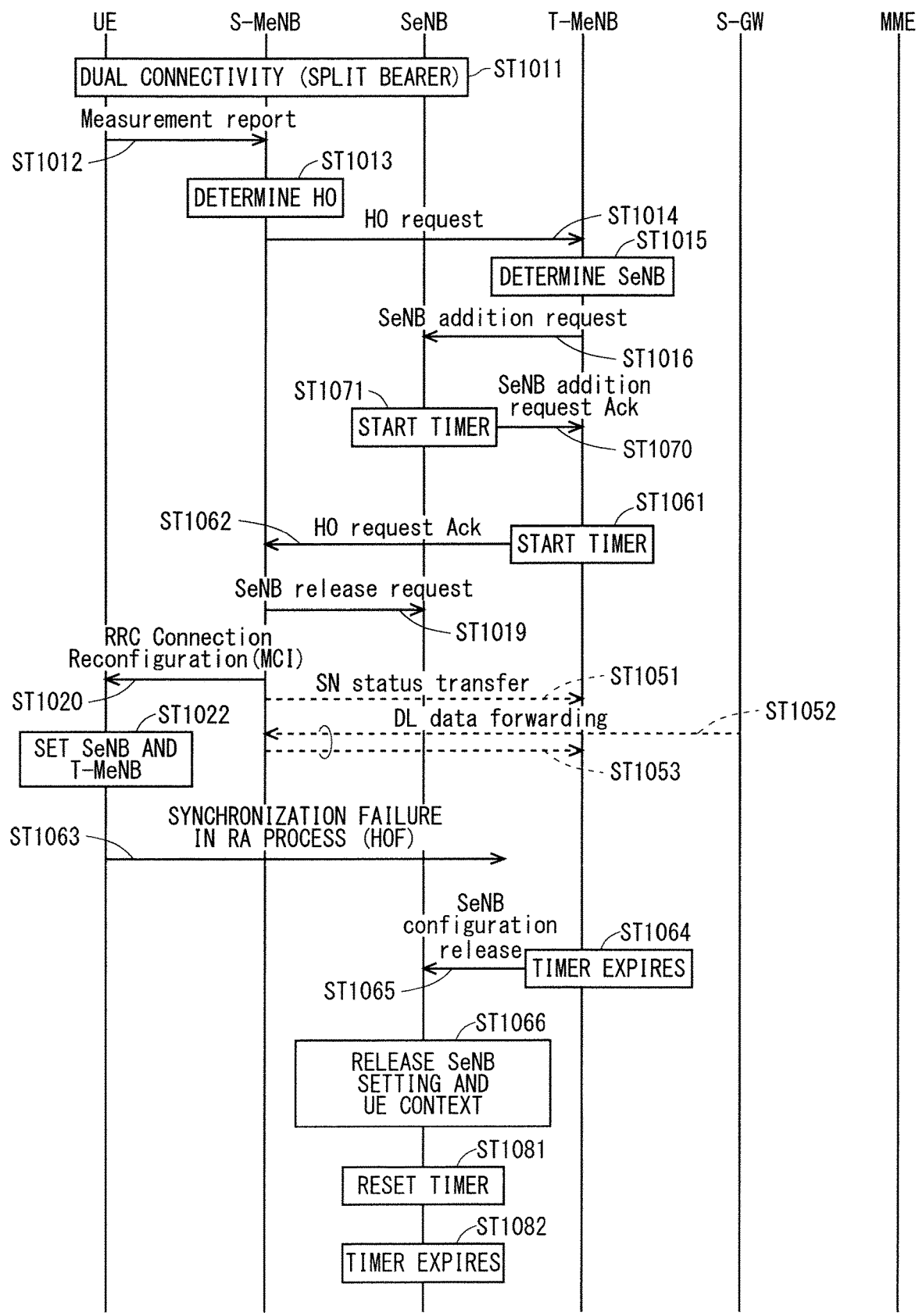
FIG. 34 illustrates another example sequence of handover processes in the communication system according to the fifth modification of the first embodiment.
Figure 35:
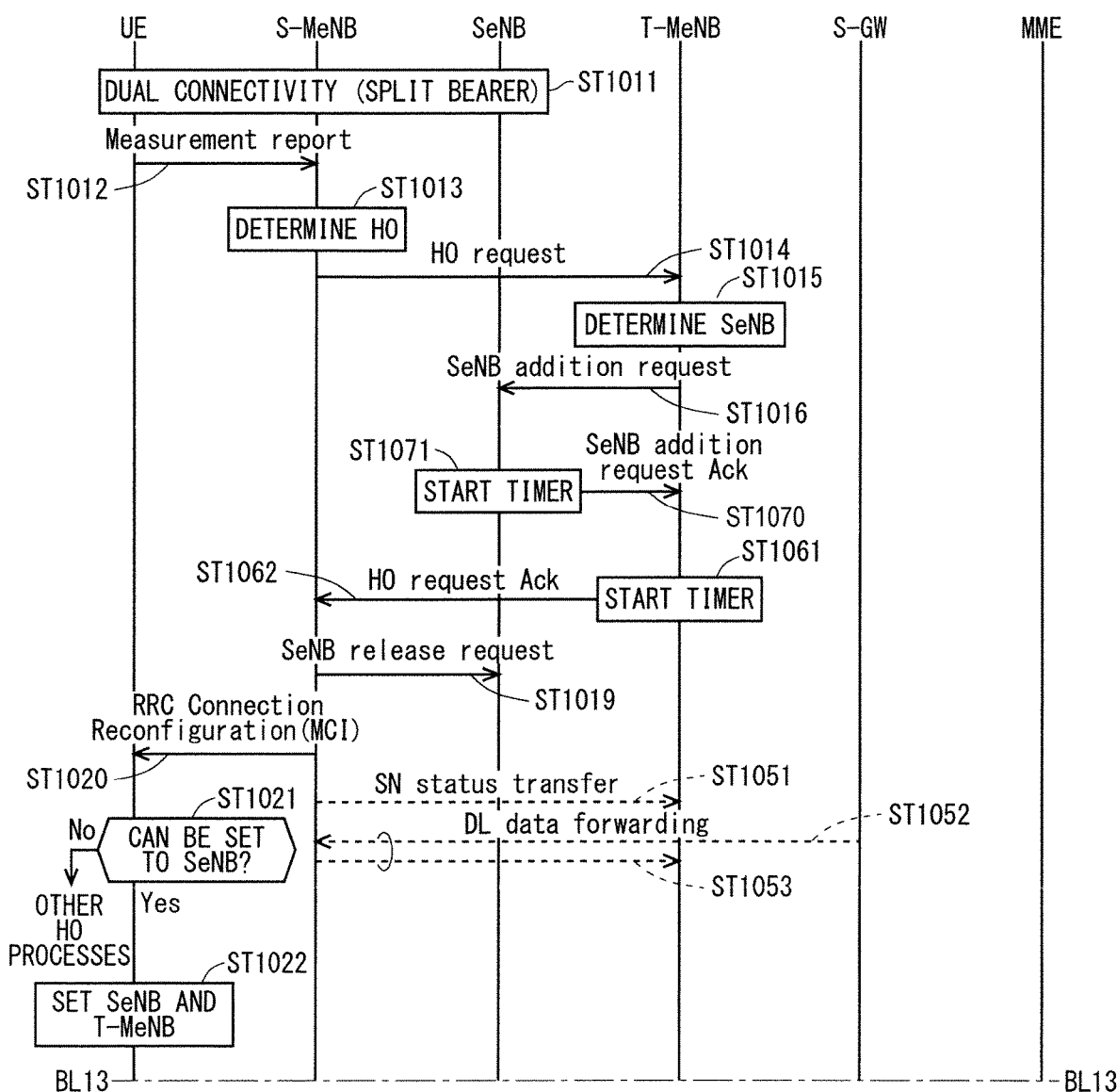
FIG. 35 illustrates another example sequence of handover processes in the communication system according to the fifth modification of the first embodiment.

FIG. 33 illustrates the example where a measurement time (Ts) of the timer of the SeNB is shorter than a measurement time (Tm) of the timer of the T-MeNB (Ts<Tm). FIG. 34 illustrates the example where the measurement time (Ts) of the timer of the SeNB is longer than or equal to the measurement time (Tm) of the timer of the T-MeNB (Ts≥Tm). FIGS. 35 and 36 illustrate the example of how to handle transmission of the uplink data when the measurement time (Ts) of the timer of the SeNB is longer than or equal to the measurement time (Tm) of the timer of the T-MeNB (Ts≥Tm).

FIG. 33 illustrates another example sequence of the handover processes in the communication system according to the fifth modification of the first embodiment. FIG. 33 illustrates, as the handover processes, the example sequence of transmitting the uplink data in the HO between the MeNBs without any change in the SeNB according to the fifth modification. Since the handover processes according to the fifth modification are similar to those according to the first embodiment illustrated in FIGS. 8 and 9 and those according to the fifth modification of the first embodiment illustrated in FIG. 28, the same step numbers will be assigned to the same Steps and the common description thereof will be omitted.

FIG. 34 illustrates another example sequence of the handover processes in the communication system according to the fifth modification of the first embodiment. FIG. 34 illustrates, as the handover processes, the example sequence of transmitting the uplink data in the HO between the MeNBs without any change in the SeNB according to the fifth modification. Since the handover processes according to the fifth modification are similar to those according to the first embodiment illustrated in FIGS. 8 and 9 and those according to the fifth modification of the first embodiment illustrated in FIG. 28, the same step numbers will be assigned to the same Steps and the common description thereof will be omitted.

FIGS. 35 and 36 illustrate another example sequence of the handover processes in the communication system according to the fifth modification of the first embodiment. FIGS. 35 and 36 are connected across a border BL13. FIGS. 35 and 36 illustrate, as the handover processes, the example sequence of transmitting the uplink data in the HO between the MeNBs without any change in the SeNB according to the fifth modification. Since the handover processes according to the fifth modification are similar to those according to the first embodiment illustrated in FIGS. 8 and 9 and those according to the fifth modification of the first embodiment illustrated in FIG. 28, the same step numbers will be assigned to the same Steps and the common description thereof will be omitted.

As illustrated in FIG. 33, when the timer of the SeNB is set so that the measurement time (Ts) of the timer of the SeNB is shorter than the measurement time (Tm) of the timer of the T-MeNB (Ts<Tm) and the SeNB transmits the SeNB Addition Request Ack message to the T-MeNB in Step ST1070, the SeNB may start the timer as in Step ST1071. Likewise, the SeNB may stop the timer when receiving the SeNB Reconfiguration Complete message from the T-MeNB.

Upon expiration of the timer in Step ST1072, the SeNB releases the resources allocated by the SeNB in response to the SeNB Addition Request message, for example, the SeNB UE X2AP ID, the bearer setting, the UE context, etc. If the resources for the connection between the T-MeNB and the SeNB that are set by the S-MeNB are allocated, such a setting is preferably released.

Upon expiration of the timer in Step ST1072, it is effective for the SeNB to have a function of notifying the T-MeNB to release the SeNB setting. Upon expiration of the timer in Step ST1072, it is effective for the SeNB to, for example, transmit the SeNB Release Required message to the T-MeNB in Step ST1073. This message enables the T-MeNB to promptly stop or end the SeNB setting for the subject UE.

Upon receipt of the SeNB Release Required message in Step ST1073, the T-MeNB may notify the SeNB of a SeNB Release Confirm message in Step ST1074. Here, it is effective for the SeNB to release the SeNB setting after receiving the SeNB Release Confirm message in Step ST1074, without releasing the SeNB setting upon expiration of the timer in Step ST1072. This enables a stable operation because it is possible to avoid inconsistencies in state between the SeNB and the T-MeNB, that is, occurrence of the HOF in the SeNB and waiting for establishment of the HO in the T-MeNB.

The T-MeNB notified to release the SeNB setting resets the timer (Tm) of the HOF in Step ST1075. The T-MeNB also ends the SeNB setting for the subject UE. When the timer is not reset, the timer of the HOF of the T-MeNB expires in Step ST1076.

Next, a setting case where the measurement time (Ts) of the timer of the SeNB is longer than or equal to the measurement time (Tm) of the timer of the T-MeNB (Ts≥Tm) as illustrated in FIG. 34 will be described.

Upon expiration of the timer of the T-MeNB in Step ST1064, the T-MeNB notifies the SeNB to release the resources in Step ST1065. Examples of the message for releasing the resources from the T-MeNB to the SeNB may include a new message such as a SeNB Configuration Release message. Alternatively, reject information may be provided as the SeNB Reconfiguration Complete information, and the HOF may be added as the cause. In Step ST1066, the SeNB releases the resources allocated by the SeNB in response to the SeNB Addition Request message, for example, the SeNB UE X2AP ID, the bearer setting, the UE context, etc.

Upon receipt of the resource release from the T-MeNB, the SeNB resets, in Step ST1081, the timer (Ts) set by the SeNB. When the timer is not reset, the timer of the SeNB expires in Step ST1082.

As described in the example illustrated in FIG. 33, since the inconsistencies in state do not occur even without the SeNB Release Required message from the SeNB that is valid when the SeNB timer (Ts)<the T-MeNB timer (Tm), the SeNB timer (Ts)≥the T-MeNB timer (Tm) is more preferable. Thus, setting a timer value to be the SeNB timer (Ts)≥the T-MeNB timer (Tm) is effective in the operation administration and maintenance (OAM).

Setting the SeNB timer (Ts)≥the T-MeNB timer (Tm) is also effective as a value predetermined by an operator in, for example, a non-volatile memory of each of a SeNB device and a T-MeNB device.

Notifying the timer value from the SeNB to the T-MeNB and setting the SeNB timer (Ts)≥the T-MeNB timer (Tm) by the T-MeNB are also effective. The SeNB notifies the timer value to the T-MeNB using, for example, a SeNB Addition Request Ack message.

It is also effective that the HO-source S-MeNB notifies the T-MeNB of a setting value that satisfies the SeNB timer (Ts)≥the T-MeNB timer (Tm). The setting value that satisfies the SeNB timer (Ts)≥the T-MeNB timer (Tm) is notified using a HO Request message or a SN Status Transfer message.

Finally, how to handle transmission of the uplink data when the SeNB timer (Ts)≥the T-MeNB timer (Tm) will be described with reference to FIGS. 35 and 36.

Similarly as FIGS. 31 and 32, the T-MeNB may transmit the uplink data to the S-GW before detecting the HOF. The T-MeNB may transmit, to the UE through the SeNB, a successful reception acknowledgement of the uplink data from the UE. Upon receipt of the successful reception acknowledgement of the uplink data from the T-MeNB, the UE may discard the uplink data. Consequently, the UE can discard earlier the uplink data successfully transmitted, and the buffer capacity of the uplink data can be reduced.

Upon receipt of the resource release from the T-MeNB, the SeNB resets, in Step ST1081, the timer (Ts) set by the SeNB. When the timer is not reset, the timer of the SeNB expires in Step ST1082.

Although the illustration is omitted, the T-MeNB may determine when the timer for the SeNB expires and notify the SeNB of the expiration time, and the SeNB may start the timer with the notified value, irrespective of the magnitude relationship between Ts and Tm.

Alternatively, the T-MeNB may notify the SeNB of the set timer value, and the SeNB may set the timer value of the SeNB.

Sixth Modification of First Embodiment

The previous embodiment and the modifications disclose processes for the uplink data (U-plane data of the UL). The sixth modification will additionally disclose processes for the downlink data (U-plane data of the DL) in addition to the previous embodiment and the modifications.

In the conventional scheme, for example, in the sequence described in FIG. 4.3.2.3-1 of Non-Patent Document 8, transmission cannot be started without any Path Switch from the S-MeNB to the T-MeNB because of no specification of the start timing to forward the downlink data. Since there is no specification of the start timing to forward the downlink data, a problem with increase in the development cost arises due to dependence on the design of the T-MeNB and increase in the number of connection test cases for the SeNB to be connected to various T-MeNBs. The SeNB that is simultaneously connected to a plurality of T-MeNBs performs earlier and greater control and thus encounters wastes, for example, resources for a buffer for the transmission data from the T-MeNB.

Figure 37:
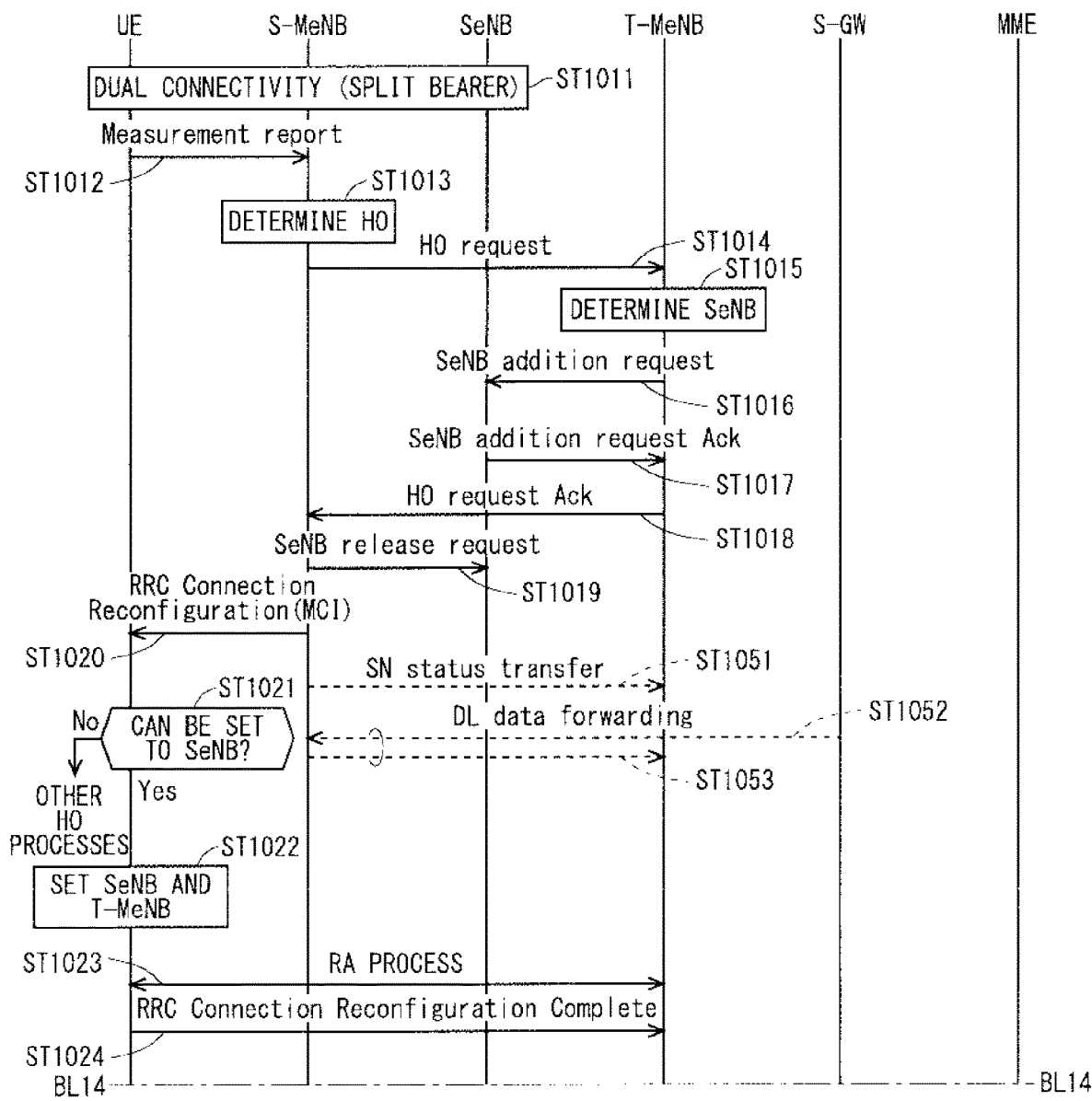
FIG. 37 illustrates an example sequence of handover processes in a communication system according to a sixth modification of the first embodiment.
Figure 38:
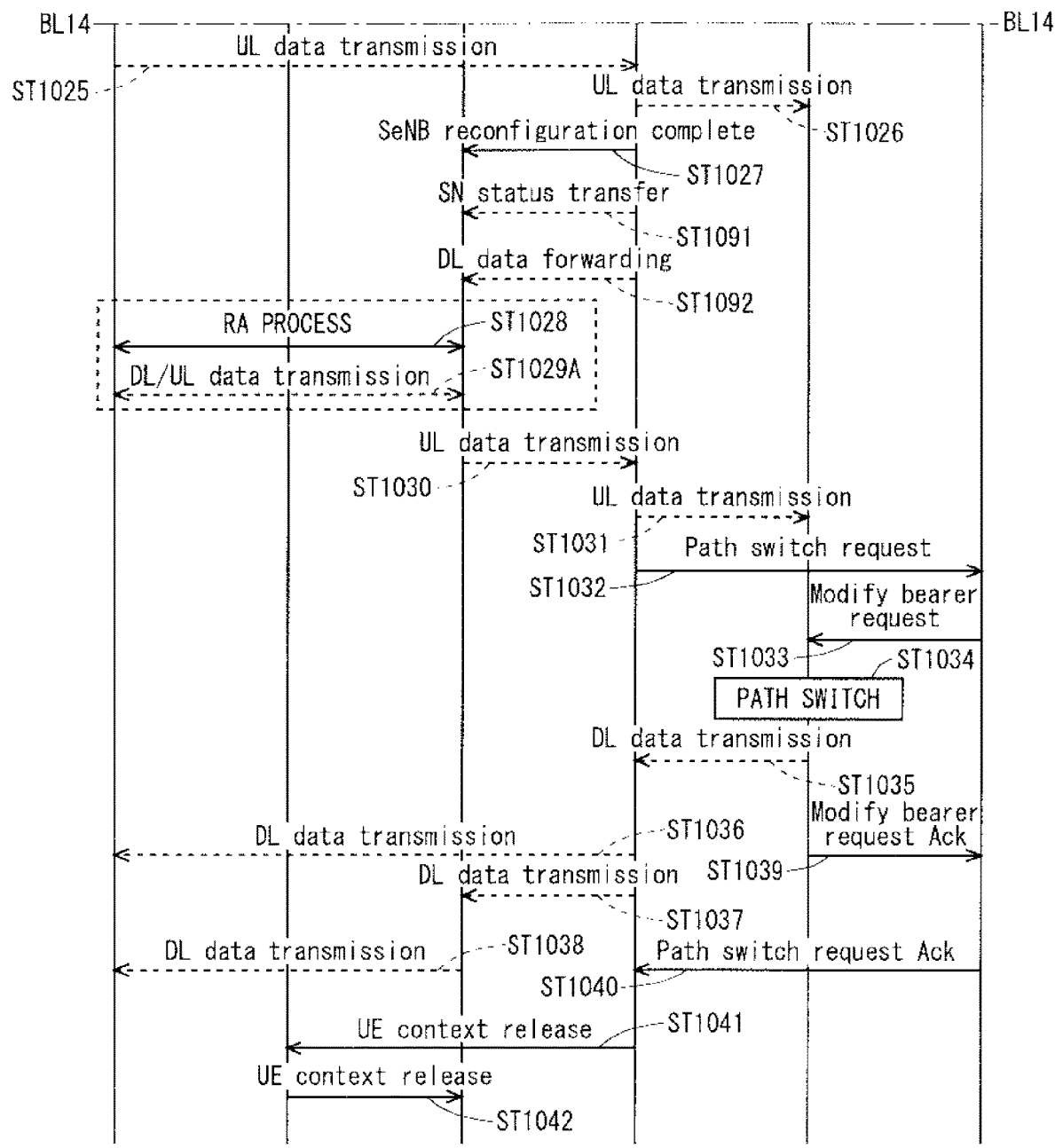
FIG. 38 illustrates the example sequence of handover processes in the communication system according to the sixth modification of the first embodiment.

To solve such problems, a method for forwarding the downlink data with appropriate timing will be described with reference to FIGS. 37 and 38. FIGS. 37 and 38 illustrate an example sequence of handover processes in a communication system according to the sixth modification of the first embodiment. FIGS. 37 and 38 are connected across a border BL14. FIGS. 37 and 38 illustrate, as the handover processes, the example sequence of transmitting the uplink data in the HO between the MeNBs without any change in the SeNB according to the sixth modification. Since the handover processes according to the sixth modification are similar to those according to the first embodiment illustrated in FIGS. 8 and 9, the same step numbers will be assigned to the same Steps and the common description thereof will be omitted.

Only differences with the first embodiment will be described. In the sixth modification, the T-MeNB may detect transmission of the SeNB Reconfiguration Complete message, and may forward the downlink (DL) data to the SeNB in Step ST1092. Before forwarding the downlink data in Step ST1092, the T-MeNB preferably transmits the SN Status Transfer message to the SeNB in Step ST1091.

Alternatively, it is effective for the T-MeNB to forward the downlink data to the SeNB upon detection of receiving the RRC Connection Reconfiguration Complete message from the UE.

The SeNB transmits the downlink data transferred from the T-MeNB to the UE in Step ST1029A after completion of the RA process with the UE in Step ST1028. Also, the UE transmits the uplink data to the SeNB in Step ST1029A, similarly as Step ST1029 according to the first embodiment. The SeNB preferably has a function of buffering the downlink data. The SeNB can store data until completion of the RA process accordingly.

The SeNB preferably has, for example, a buffer with a length corresponding to an extending path along which the downlink data is forwarded. The SeNB preferably has, for example, a buffer with a length corresponding to a path from the S-GW to the S-MeNB, the T-MeNB, and the SeNB as an extension of a path from the S-GW to the S-MeNB and the SeNB. When the path is changed again, for example, when the path from the S-GW to the S-MeNB, the T-MeNB, and the SeNB is changed back to a path from the S-GW to the T-MeNB and the SeNB, data can be transmitted in order from the old data.

With the downlink data forwarded as described above, the downlink data transferred from the S-MeNB can be transmitted before the S-GW performs the Path Switch, during the HO between the MeNBs.

Figure 39:
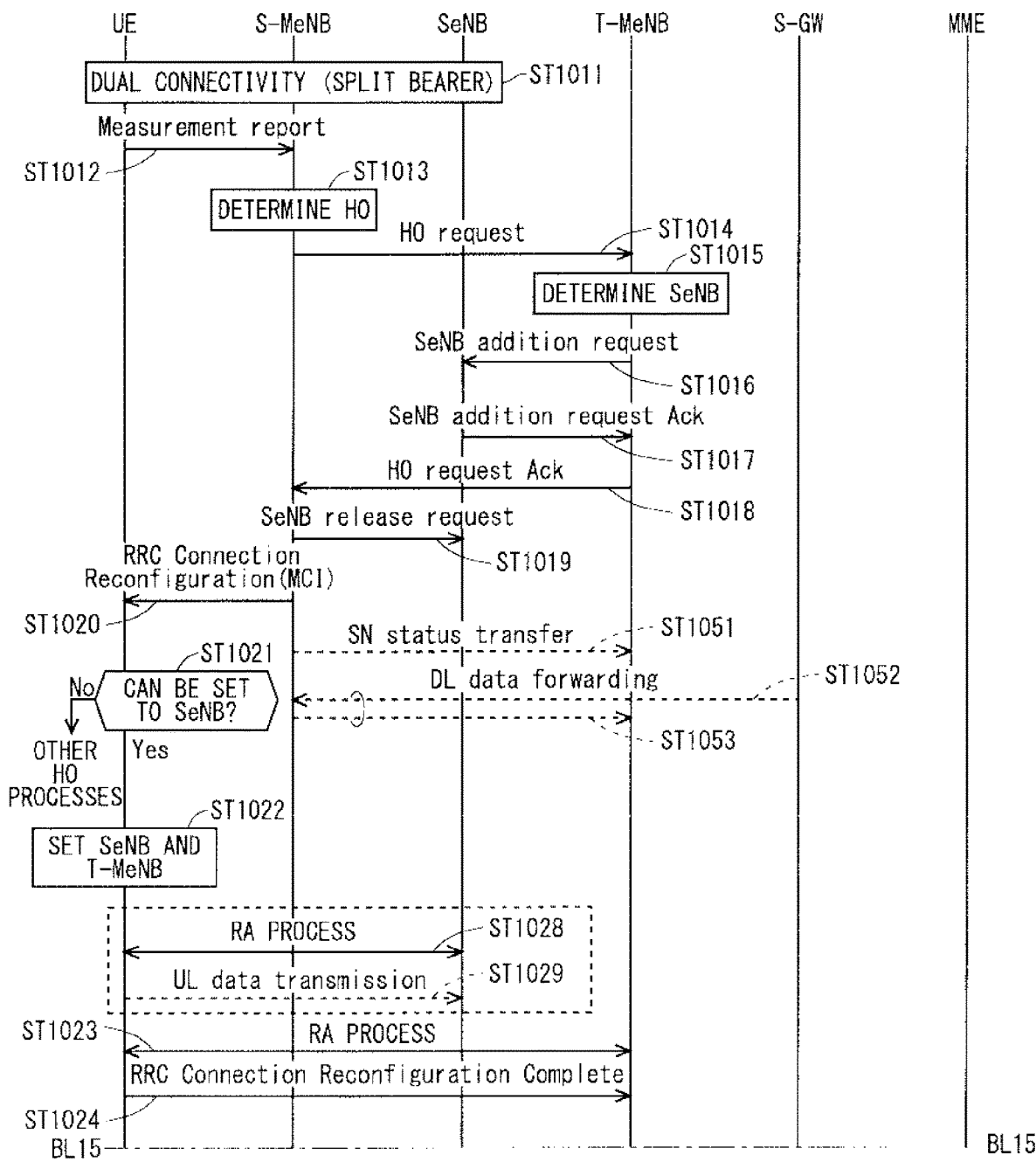
FIG. 39 illustrates another example sequence of handover processes in the communication system according to the sixth modification of the first embodiment.

FIGS. 39 and 40 illustrate that the RA process between the UE and the SeNB precedes the RA process between the UE and the T-MeNB. FIGS. 39 and 40 illustrate another example sequence of the handover processes in the communication system according to the sixth modification of the first embodiment. FIGS. 39 and 40 are connected across a border BL15. FIGS. 39 and 40 illustrate, as the handover processes, the example sequence of transmitting the uplink data in the HO between the MeNBs without any change in the SeNB according to the sixth modification. Since the handover processes according to the sixth modification are similar to those according to the first embodiment illustrated in FIGS. 8 and 9 and those according to the sixth modification of the first embodiment illustrated in FIGS. 37 and 38, the same step numbers will be assigned to the same Steps and the common description thereof will be omitted.

In the example illustrated in FIGS. 39 and 40, after forwarding of the downlink (DL) data in Step ST1092, the SeNB transmits the uplink data to the T-MeNB in Step ST1030. Then, the SeNB transmits the downlink data to the UE in Step ST1093.

In the example illustrated in FIGS. 39 and 40, as soon as the T-MeNB receives the RRC Connection Reconfiguration Complete message from the UE in Step ST1024, the uplink data can be transmitted to the S-GW through Steps ST1025 and ST1026. Thus, the downlink data transferred from the S-MeNB can be transmitted in Steps ST1092 and ST1093 during the HO between the MeNBs in both the uplink and the downlink before the S-GW performs the Path Switch in Step ST1034.

Seventh Modification of First Embodiment

Although the sixth modification of the first embodiment describes the example of forwarding the downlink data after transmission of the SeNB Reconfiguration Complete message or upon reception of the RRC Connection Reconfiguration Complete message, the seventh modification will disclose a method that enables the downlink data to be forwarded earlier.

FIGS. 41 and 42 illustrate an example sequence of handover processes in a communication system according to the seventh modification of the first embodiment. FIGS. 41 and 42 are connected across a border BL16. FIGS. 41 and 42 illustrate, as the handover processes, the example sequence of transmitting the uplink data in the HO between the MeNBs without any change in the SeNB according to the seventh modification. Since the handover processes according to the seventh modification are similar to those according to the first embodiment illustrated in FIGS. 8 and 9, the same step numbers will be assigned to the same Steps and the common description thereof will be omitted.

As illustrated in FIGS. 41 and 42, the T-MeNB has a function of forwarding the downlink data before receiving the SeNB Reconfiguration Complete message in Step ST1024 in the seventh modification. For example, the T-MeNB has a function of detecting completion of a connection between the SeNB and the UE. Upon detection of completion of the connection between the SeNB and the UE in Step ST1101, the T-MeNB may forward the downlink data to the SeNB in Step ST1092. Specifically, the T-MeNB has a function of determining the reception of the uplink data from the SeNB in Step ST1030. It is effective for the T-MeNB to forward the downlink data to the SeNB in Step ST1092 after receiving the uplink data in Step ST1030.

The T-MeNB preferably transmits the SN Status Transfer message to the SeNB in Step ST1091 before forwarding the downlink data to the SeNB in Step ST1092.

Upon reception of the downlink data from the T-MeNB, the SeNB transmits the downlink data to the UE in Step ST1093 after completion of the RA process with the UE in Step ST1028. Then, the processes in Steps ST1023 to ST1042 are performed similarly as the first embodiment.

With such functions, the downlink data transferred from the S-MeNB can be transmitted to the UE without waiting for transmission of the SeNB Reconfiguration Complete message. In other words, the UE, the SeNB, the T-MeNB, and the S-GW can communicate in both the uplink and the downlink.

Figure 44:
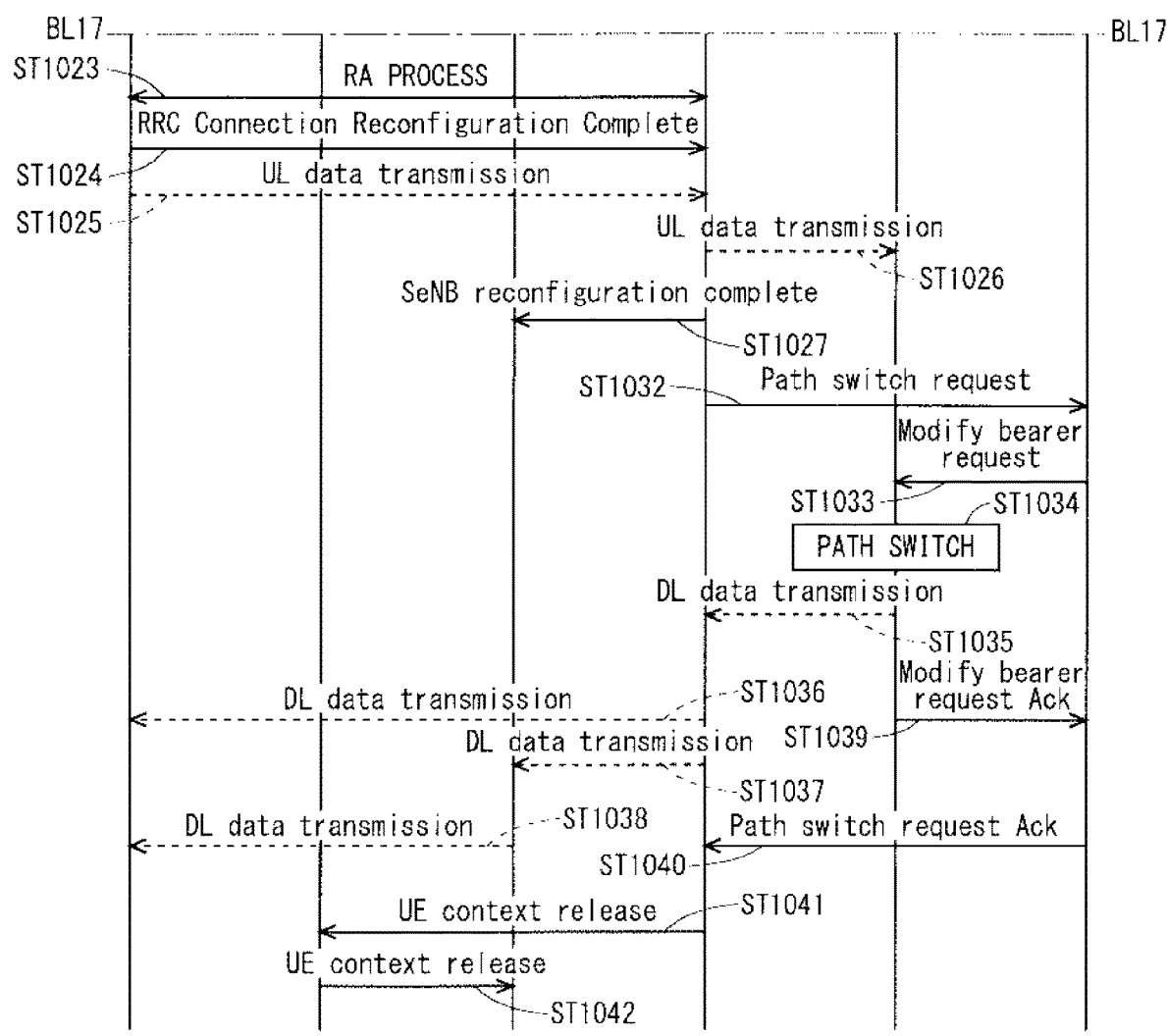
FIG. 44 illustrates the other example sequence of handover processes in the communication system according to the seventh modification of the first embodiment.

FIGS. 43 and 44 illustrate another example sequence of the handover processes in the communication system according to the seventh modification of the first embodiment. FIGS. 43 and 44 are connected across a border BL17. FIGS. 43 and 44 illustrate, as the handover processes, the example sequence of transmitting the uplink data in the HO between the MeNBs without any change in the SeNB according to the seventh modification. Since the handover processes according to the seventh modification are similar to those according to the first embodiment illustrated in FIGS. 8 and 9 and those according to the sixth modification of the first embodiment illustrated in FIGS. 37 and 38, the same step numbers will be assigned to the same Steps and the common description thereof will be omitted.

As illustrated in FIGS. 43 and 44, the T-MeNB may have a function of forwarding the downlink data to the SeNB as soon as receiving data forwarded from the S-MeNB in the downlink, instead of the function of forwarding the downlink data before the SeNB reconfiguration completes.

This function is effective particularly when the SeNB continues downlink synchronization with the UE or can establish instant synchronization with the UE. The SeNB may have a function of, for example, transmitting information indicating whether the SeNB can continue to synchronize with the UE, by the SeNB Addition Request Ack message to be transmitted from the SeNB to the T-MeNB in Step ST1017. When the T-MeNB can continue to synchronize with the SeNB, the T-MeNB preferably forwards the downlink data to the SeNB in Step ST1092 upon receipt of the data forwarded from the S-MeNB in the downlink through Steps ST1052 and ST1053.

Before forwarding the downlink data in Step ST1092, performing the SN status transfer in Step ST1091 is effective.

Upon reception of the downlink data from the T-MeNB in Step ST1092, the SeNB transmits the downlink data to the UE in Step ST1029A after completion of the RA process with the UE in Step ST1028.

As described above, the downlink data transferred from the S-MeNB can be transmitted to the UE earlier than the case in FIGS. 41 and 42, without waiting for transmission of the SeNB Reconfiguration Complete message. In other words, the UE, the SeNB, the T-MeNB, and the S-GW can communicate in both the uplink and the downlink.

Second Embodiment

The first embodiment and the modifications disclose the methods for transmitting and receiving the uplink data and the downlink data between the UE and the network-side nodes upon occurrence of the HO between the MeNBs without any change in the SeNB while a split bearer is executed.

The disclosure indicates that the UE may be already connected to the SeNB before being connected to the T-MeNB in the HO without any change in the SeNB. The UE transmits the uplink data to the SeNB after being connected to the SeNB during the HO. The UE does not transmit the uplink data to the T-MeNB during the HO. The UE transmits the uplink data to the SeNB upon completion of the RA process with the SeNB during the HO. When the UE synchronizes with the SeNB during the HO, the UE may transmit the uplink data to the SeNB after setting the SeNB configuration. Until completion of the RA process with the T-MeNB, the UE does not transmit the uplink data to the T-MeNB during the HO. After completion of the RA process with the SeNB, the UE transmits the uplink data only to the SeNB until completion of the RA process with the T-MeNB during the HO.

Consequently, the uplink data can be transmitted and received between the UE and the SeNB before the UE is connected to the T-MeNB during the HO without any change in the SeNB. Thus, the uplink data can be transmitted and received between the UE and the SeNB much earlier. Thus, latency in transmitting and receiving data in the HO can be reduced.

The following problems may arise if transmission and reception of the uplink data are intended between the UE and the SeNB before the UE is connected to the T-MeNB during the HO without any change in the SeNB while the split bearer is maintained.

3GPP proposes a method based on double reporting and threshold (abbreviated as DRAT) as a method for transmitting a Buffer Status Report (BSR) while an uplink split bearer is executed (see Non-Patent Document 9). When a PDCP data amount is smaller than or equal to a predetermined threshold, a Buffer Status (abbreviated as BS) is reported to one eNB, that is, the MeNB or the SeNB in the DRAT. When the PDCP data amount is larger than the predetermined threshold, BSs indicating the same PDCP data amount are reported to both of the eNBs, that is, the MeNB and the SeNB. When the PDCP data amount is smaller than the predetermined threshold, RRC signaling indicates to which one of the eNBs of the MeNB and the SeNB the BS is reported. The predetermined threshold is set every resource block (RB).

In the DRAT, BSRs are transmitted to both of the eNBs, that is, the MeNB and the SeNB by triggering the BSRs with the same PDCP data amount. When the HO occurs in such a state, the UE unfortunately triggers the BSRs to both the MeNB and the SeNB with the same PDCP data amount. In reality, however, the UE cannot transmit the BSR to the T-MeNB until the UE is connected in synchronization with the T-MeNB during the HO. Moreover, the UE cannot transmit data to the T-MeNB. Thus, it is useless for the UE to trigger the BSR to the T-MeNB during the HO before synchronization with the T-MeNB. The triggering may cause malfunction. When the BSR is triggered to the T-MeNB side, for example, the UE tries to transmit the BSR despite still no connection with the T-MeNB. The UE malfunctions with no idea how to operate.

Another problem also occurs. 3GPP proposes matching an eNB to which the BSR is triggered with the one to which data is transmitted. If this is followed, once a BSR is triggered, the UE cannot ignore the BSR, and thus will transmit data to the T-MeNB even during the HO. Before being connected to the T-MeNB, the UE cannot transmit data to the T-MeNB during the HO even when triggering the BSR to the T-MeNB side. Thus, after being connected to the T-MeNB, the UE transmits the BSR to the T-MeNB and then transmits the data. Thus, when the UE transmits data to the T-MeNB, the transmission latency occurs. The second embodiment will disclose a method for solving such problems.

When the BSR is triggered to the MeNB side and before the UE is connected to the T-MeNB, the UE ignores triggering of the BSR during the HO between the MeNBs. The UE may determine whether being connected to the T-MeNB, depending on the presence or absence of execution of the RA process with the T-MeNB. The UE may also determine whether being connected to the T-MeNB, depending on the presence or absence of notification of the RRC Connection Reconfiguration Complete message.

With the disclosed methods, it is useless for the UE to trigger the BSR to the T-MeNB. Another method will be disclosed hereinafter. The UE triggers the BSR to the SeNB during the HO between the MeNBs. The UE does not trigger the BSR to the MeNBs during the HO between the MeNBs. The time during the HO between the MeNBs may be after the UE is connected to the SeNB or before the UE is connected to the T-MeNB. The UE may determine whether being connected to the SeNB, depending on the presence or absence of execution of the RA process with the SeNB. The UE may also determine whether being connected to the SeNB, depending on whether to synchronize with the SeNB. The UE transmits the BSR to the eNB to which the BSR is triggered.

The UE may perform the disclosed method in performing the HO between the MeNBs without any change in the SeNB. The UE may also perform the disclosed method in performing the HO between the MeNBs without any change in the SeNB while the split bearer is maintained. Even if the DRAT is set, the UE may reset the DRAT and perform the disclosed method. When the DRAT is set, and even when the PDCP data amount is smaller than or equal to the threshold and the eNB to which the uplink data is transmitted is set to the MeNB, the UE may reset the setting and perform the disclosed method.

Consequently, the disclosed method is performed both when the PDCP data amount is smaller than or equal to the threshold and when the PDCP data amount is larger than or equal to the threshold.

Although it has been defined to perform the disclosed method, a method may be switched to the disclosed method. Even when a method other than the disclosed method is set in the methods for triggering and transmitting the BSR, the method is switched to the disclosed method.

When the HO between the MeNBs without any change in the SeNB is performed, the UE may synchronize with the SeNB during the HO because the UE is already connected to the SeNB before the HO.

The UE may perform RLC retransmission on the uplink data transmitted to the SeNB before the HO, through an Automatic Repeat reQuest (ARQ) process. When the UE synchronizes with the SeNB during the HO, the UE may continue to transmit, to the SeNB, the uplink data and also the uplink RLC retransmission data in the HO between the MeNBs without any change in the SeNB. The BSR may include not only the PDCP data but also the RLC retransmission data in consideration of data with which the uplink data is subject to the RLC retransmission to the SeNB.

FIGS. 45 and 46 illustrate a method for transmitting the BSR when the conventional DRAT is set. FIG. 45 illustrates a case where the PDCP data amount is smaller than or equal to the threshold. FIG. 46 illustrates a case where the PDCP data amount is larger than the threshold. A UE 2013 is connected to both an MeNB 2011 and a SeNB 2012, and an uplink split bearer is performed. A PDCP 2014 is a protocol stack that performs PDCP processes for the UE 2013. An RLC 2015 for MeNB is a protocol stack that performs RLC processes for the MeNB 2011. A MAC 2016 for MeNB is a protocol stack that performs MAC processes for the MeNB 2011. An RLC 2017 for SeNB is a protocol stack that performs RLC processes for the SeNB 2012. A MAC 2018 for SeNB is a protocol stack that performs MAC processes for the SeNB 2012.

In FIGS. 45 and 46, the BSR is set for transmission to the MeNB 2011 when the PDCP data amount is smaller than or equal to the threshold. The MeNB 2011 notifies the threshold to the UE 2013. The MeNB 2011 may notify, using the RRC signaling, the UE 2013 of the threshold together with a parameter for setting which one of the eNBs of the MeNB 2011 and the SeNB 2012 is notified when the PDCP data amount is smaller than or equal to the threshold.

When the PDCP data amount is smaller than or equal to the threshold, the UE 2013 triggers the BSR to the MeNB 2011 as illustrated in FIG. 45, and transmits the BSR to the MeNB 2011 as indicated by an arrow mark 2019 of FIG. 45. When the PDCP data amount is larger than the threshold, the UE 2013 triggers the BSRs to both the MeNB 2011 and the SeNB 2012 as illustrated in FIG. 46, and transmits the BSRs to both the MeNB 2011 and the SeNB 2012 as indicated by arrow marks 2020 and 2021 of FIG. 46, respectively. Although Non-Patent Document 9 discloses notifying the same PDCP data amount to both the MeNB 2011 and the SeNB 2012, different values may be notified to the eNBs 2011 and 2012.

Figure 47:
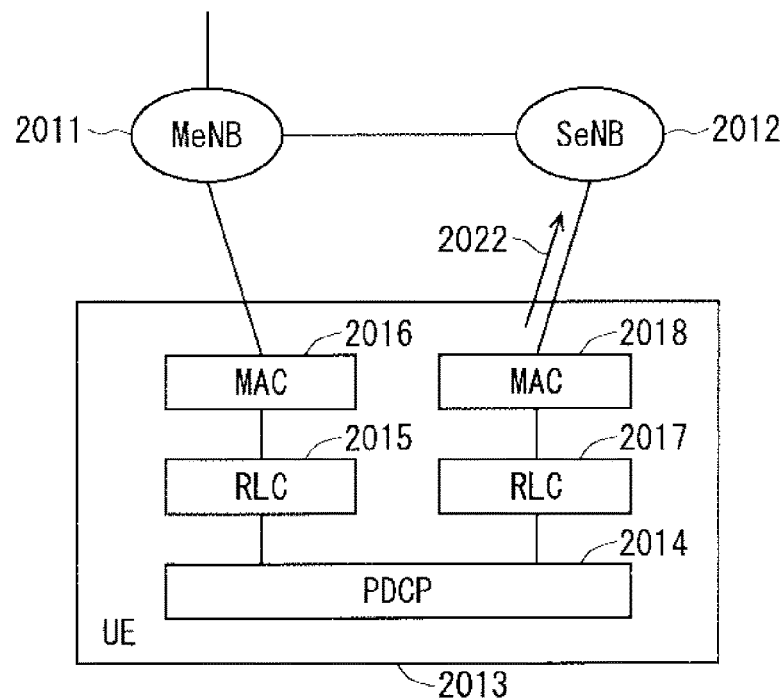
FIG. 47 illustrates a method for transmitting the BSR according to a second embodiment.

FIG. 47 illustrates a method for transmitting the BSR according to the second embodiment. Since FIG. 47 is similar to FIGS. 45 and 46, the same reference numerals will be assigned to the same structures and the common description thereof will be omitted.

The UE 2013 triggers the BSR to the SeNB 2012 and does not trigger the BSR to the MeNB 2011 after being connected to the SeNB 2012 and before being connected to the T-MeNB in the HO between the MeNBs 2011. As indicated by an arrow mark 2022 of FIG. 47, the UE 2013 transmits the BSR to an eNB to which the BSR is triggered, that is, only to the SeNB 2012 herein. The UE 2013 transmits the BSR only to the SeNB 2012 using the aforementioned method both when the PDCP data amount is smaller than or equal to the threshold and when the PDCP data amount is larger than or equal to the threshold, after being connected to the SeNB 2012 and before being connected to the T-MeNB in the HO between the MeNBs 2011.

Even when the DRAT is set in the HO between the MeNBs 2011 while the uplink bearer split is maintained, the BSR is neither triggered nor transmitted to the MeNB 2011 after the UE 2013 is connected to the SeNB 2012 and before the UE 2013 is connected to the T-MeNB. Thus, the MeNB 2011 does not transmit the uplink-scheduling for the PDCP data to the UE 2013. The UE 2013 does not transmit the PDCP data to the MeNB 2011. Consequently, the UE 2013 can eliminate wasteful data transmission to the T-MeNB that is not connected, thus enabling reduction in the transmission latency and the power consumption of the UE 2013. The MeNB 2011 may be the S-MeNB or the T-MeNB.

A method by which the UE switches to the method disclosed in the second embodiment will be disclosed. Upon receipt of an instruction of the HO between the MeNBs without any change in the SeNB, the UE performs the method disclosed in the second embodiment. The UE to which the uplink split bearer is set or the UE set to maintain the uplink split bearer in the instruction of the HO may perform the method disclosed in the second embodiment. The mobility control information (MCI) may include information indicating the HO between the MeNBs without any change in the SeNB, information indicating the uplink split bearer setting, or information indicating the setting to maintain the uplink split bearer. Upon receipt of the MCI including these pieces of information as the HO instruction, the UE may perform the method disclosed in the second embodiment.

Consequently, the UE can perform the method disclosed in the second embodiment without new information being provided and notified. Thus, the amount of signaling can be reduced.

The BSR can be prevented from being triggered to the MeNB when the dual connectivity (DC) is set or even when the uplink split bearer is set in the HO between the MeNBs.

Another method by which the UE switches to the method disclosed in the second embodiment will be disclosed. Information indicating switching to the method disclosed in the second embodiment is newly provided. The T-MeNB notifies the UE of the information when determining that the UE should perform the HO while maintaining the uplink split bearer. The T-MeNB may notify it through the S-MeNB. For example, the T-MeNB includes the information in the HO Request Ack and notifies the S-MeNB of the information. X2 signaling may be used for this notification. Alternatively, S1 signaling via the MME may be used. Upon receipt of the information, the S-MeNB notifies the information to the UE that is a HO subject. The RRC signaling may be used for this notification. Upon receipt of the information, the UE performs the method disclosed in the second embodiment. The information may be included in the MCI, or separately notified without being included in the MCI.

Consequently, the UE can be notified of the information separately from the HO request. Thus, the information can be notified flexibly according to the circumstances.

Another method by which the UE switches to the method disclosed in the second embodiment will be disclosed. The MeNB sets a threshold defined in the DRAT to the settable maximum value, and notifies the UE of the value. Further, the eNB to which the BSR is triggered or transmitted, which is defined in the DRAT, is set to the SeNB, and is notified to the UE. The settable maximum value may be a value larger than or equal to the PDCP data amount that can be handled by the UE. When the uplink bearer split is set, the PDCP data amount generated by the UE is always smaller than or equal to the threshold. Since triggering or transmitting the BSR to the SeNB is defined when the PDCP data amount is smaller than or equal to the threshold, the UE can trigger or transmit the BSR only to the SeNB.

The setting may be changed using the DRAT setting. When, for example, notification only to the SeNB is returned to that in the normal DRAT, the UE can perform the normal DRAT by setting again a threshold and setting the eNB to which the BSR is triggered or transmitted when the PDCP data amount is smaller than or equal to the threshold as necessary. Consequently, the UE can perform the method disclosed in the second embodiment without new information being provided and notified. Thus, the amount of signaling can be reduced.

Alternatively, a threshold indicating triggering or transmitting the BSR only to one eNB may be provided. The MeNB sets a threshold defined in the DRAT to the threshold, and notifies the UE of the threshold. Further, the eNB to which the BSR is triggered or transmitted, which is defined in the DRAT, is set to the SeNB, and is notified to the UE. This is effective when the PDCP data amount generated by the UE is unknown. The threshold is set to, for example, 0. The MeNB sets a threshold defined in the DRAT to 0 and notifies the UE of the threshold when expecting the UE to perform the method disclosed in the second embodiment. Since the threshold "0" indicates triggering or transmitting the BSR only to one eNB, the UE triggers or transmits the BSR only to the one eNB irrespective of the PDCP data amount. To which one of the eNBs of the MeNB and the SeNB the threshold is notified can be recognized by receiving information on the eNB to which the BSR is triggered or transmitted.

A threshold indicating triggering or transmitting the BSR only to the SeNB may be provided. Consequently, the information on the eNB to which the BSR is triggered or transmitted can be omitted. Likewise, a threshold indicating triggering or transmitting the BSR only to the MeNB may be provided. This is effective when it is preferred to set triggering or transmitting the BSR only to the MeNB. The information may be included in the MCI, or separately notified without being included in the MCI.

Processes after completion of the HO between the MeNBs without any change in the SeNB will be disclosed. After completion of the HO between the MeNBs without any change in the SeNB, the UE returns triggering or transmitting the BSR only to the SeNB to that in the normal DRAT. The time after completion of the HO may be after completion of the connection between the UE and the T-MeNB. Alternatively, the time may be after completion of synchronization between the UE and the T-MeNB, after completion of the RA process between the UE and the T-MeNB, or after the UE transmits the RRC Connection Reconfiguration Complete message to the T-MeNB.

After completion of the HO without any change in the SeNB, the UE can be connected to both the T-MeNB and the SeNB. Consequently, the UE can trigger and transmit the BSRs to both of the eNBs of the T-MeNB and the SeNB. Since uplink PDCP data can be transmitted not only to the SeNB but also to the MeNB after completion of the HO, the transmission latency can be reduced.

Using the method disclosed in the second embodiment, the uplink data can be transmitted to the SeNB in the HO between the MeNBs without any change in the SeNB. Since the BSR is neither triggered nor transmitted to the MeNB, neither the uplink-scheduling (an uplink grant) is transmitted from the MeNB nor the PDCP data is transmitted to the MeNB. Consequently, the UE can eliminate wasteful transmission to the MeNB, and reduce the transmission latency and the power consumption of the UE. Since the UE triggers or transmits the BSR to the SeNB, the SeNB transmits the uplink-scheduling to the UE, and the UE transmits the PDCP data to the SeNB. Thus, the UE can transmit data only to the SeNB during the HO, and reduce latency in transmitting the data in the HO.

The method disclosed in the second embodiment is applicable to a process of transmitting the uplink data from the UE to the SeNB without transmitting the uplink data from the UE to the T-MeNB during the HO between the MeNBs without any change in the SeNB while the split bearer is maintained. FIGS. 12, 13, 14, 15, 26, and 27, etc. disclosed in the first and fourth modifications of the first embodiment illustrate the examples.

Third Embodiment

The following problems may arise if transmission and reception of the uplink data are intended between the UE and the SeNB before the UE is connected to the T-MeNB during the HO without any change in the SeNB while the split bearer is maintained.

The UE has to determine whether the PDCP data is transmitted to the RLC for MeNB or to the RLC for SeNB when the uplink split bearer is performed. For example, when the PDCP data amount is larger than a predetermined threshold, the PDCP data is transmitted to both of the RLCs for the eNBs to each of which the BSR is reported. For example, Non-Patent Document 10 discloses predetermining a proportion between the MeNB and the SeNB, and transmitting data generated in the PDCP to both the RLC for MeNB and the RLC for SeNB according to the proportion.

When the HO occurs in this state, the UE unfortunately transmits the data generated in the PDCP to both the RLC for MeNB and the RLC for SeNB during the HO. In reality, however, the UE can transmit neither the BSR nor data to the T-MeNB until being connected in synchronization with the T-MeNB during the HO. Thus, it is useless for the UE to transmit the PDCP data to the RLC for T-MeNB before the UE synchronizes with the T-MeNB during the HO. Since data is accumulated in at least one of buffers of the RLC and the MAC for T-MeNB, a problem with, for example, overflow may occur. The third embodiment will disclose a method for solving such problems.

The UE transmits the uplink PDCP data to the RLC for SeNB during the HO between the MeNBs. The UE does not transmit the uplink PDCP data to the RLC for MeNB during the HO between the MeNBs. The PDCP data may be a PDCP PDU.

The time during the HO between the MeNBs may be after the UE is connected to the SeNB and before the UE is connected to the T-MeNB. The UE may determine whether being connected to the SeNB, depending on the presence or absence of execution of the RA process with the SeNB. The UE may also determine whether being connected to the SeNB, depending on whether to synchronize with the SeNB.

The UE may perform the disclosed method in performing the HO between the MeNBs without any change in the SeNB. The UE may also perform the disclosed method in performing the HO between the MeNBs without any change in the SeNB while the split bearer is maintained. Even if the DRAT is set, the UE may reset the DRAT and perform the disclosed method. When the DRAT is set, and even when the PDCP data amount is smaller than or equal to the threshold and the eNB to which the uplink data is transmitted is set to the MeNB, the UE may reset the setting and perform the disclosed method.

Consequently, the disclosed method is performed both when the PDCP data amount is smaller than or equal to the threshold and when the PDCP data amount is larger than or equal to the threshold.

Although it has been defined to perform the disclosed method, a method may be switched to the disclosed method. Even when a method other than the disclosed method is set in a method for allocating the PDCP data, the method is switched to the disclosed method.

Figure 48:
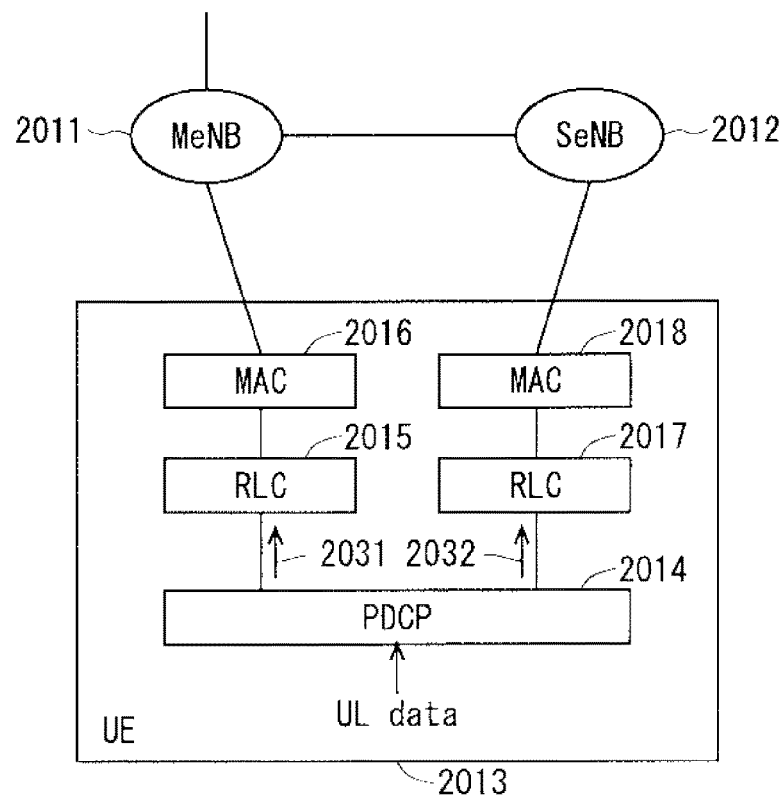
FIG. 48 illustrates a method for allocating PDCP data when the conventional DRAT is set.

FIG. 48 illustrates the method for allocating the PDCP data when the conventional DRAT is set. FIG. 48 illustrates a case where the PDCP data amount is larger than the threshold. Since FIG. 48 is similar to FIGS. 45 and 46, the same reference numerals will be assigned to the same structures and the common description thereof will be omitted.

When the PDCP data amount is larger than the threshold, the UE 2013 transmits data of the PDCP 2014 to both the RLC 2015 for the MeNB 2011 and the RLC 2017 for the SeNB 2012 as indicated by arrow marks 2031 and 2032 of FIG. 48, respectively. The MeNB 2011 notifies, in advance, the UE 2013 of a proportion of the PDCP data between the MeNB 2011 and the SeNB. The MeNB 2011 may notify it to the UE 2013 using the RRC signaling. The MeNB 2011 may notify it to the UE 2013, together with the DRAT setting.

Figure 49:
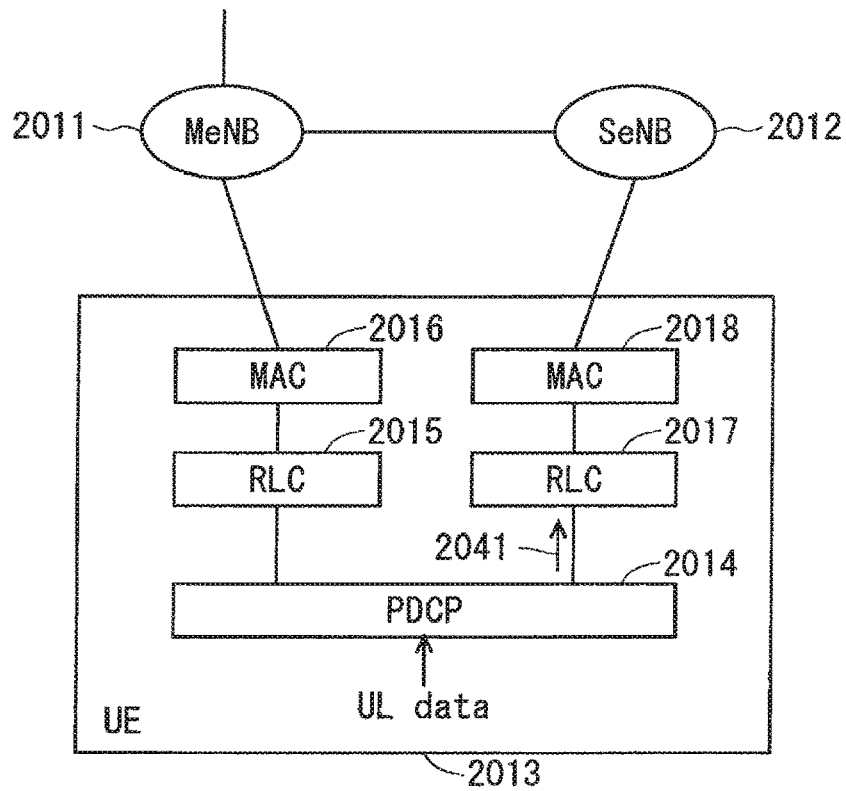
FIG. 49 illustrates a method for transmitting the PDCP data according to a third embodiment.

FIG. 49 illustrates a method for transmitting the PDCP data according to the third embodiment. Since FIG. 49 is similar to FIGS. 45 and 46, the same reference numerals will be assigned to the same structures and the common description thereof will be omitted.

The UE 2013 transmits the uplink PDCP data to the RLC 2017 for SeNB as indicated by an arrow mark 2041 of FIG. 49, after being connected to the SeNB 2012 and before being connected to the T-MeNB 2011 in the HO between the MeNBs 2011. The UE 2013 does not transmit the uplink PDCP data to the RLC 2015 for MeNB. In other words, the UE 2013 transmits the uplink PDCP data only to the RLC 2017 for SeNB.

The method disclosed in the third embodiment may be applied not only when the PDCP data amount is larger than the threshold but also when the PDCP data amount is smaller than or equal to the threshold. With application of the method disclosed in the third embodiment when the PDCP data amount is smaller than or equal to the threshold and the eNB to which the uplink data is transmitted is the MeNB 2011, the UE 2013 transmits the uplink PDCP data only to the RLC 2017 for SeNB after being connected to the SeNB 2012 and before being connected to the T-MeNB in the HO between the MeNBs 2011. Consequently, the uplink PDCP data is transmitted only to the SeNB 2012 both when the PDCP data amount is smaller than or equal to the threshold and when the PDCP data amount is larger than or equal to the threshold.

A method by which the UE switches to the method disclosed in the third embodiment will be disclosed. The MeNB 2011 notifies the UE 2013 to transmit the uplink PDCP data only to the RLC 2017 for SeNB during the HO between the MeNBs 2011. The T-MeNB or the S-MeNB may notify it to the UE 2013. The T-MeNB may notify it to the UE 2013 through the S-MeNB.

The method disclosed in the second embodiment is applicable as the notification method. An instruction method for switching to the method disclosed in the third embodiment based on an instruction of the HO to the UE that is a HO subject may be applied. A method for newly providing information indicating switching to the method disclosed in the third embodiment and notifying the information to the UE may be applied.

A method by which the MeNB sets a threshold defined in the DRAT to the settable maximum value and notifies the value to the UE may be applied.

When this method is applied and the PDCP data amount is smaller than or equal to the predetermined threshold in the DRAT, the PDCP data is transmitted only to the RLC for the eNB to which the BSR is transmitted. This may be predetermined in, for example, a standard, or notified to the UE in advance when the DC is performed. Alternatively, this may be notified to the UE in advance as a setting parameter of the DRAT.

The PDCP data amount generated by the UE is always smaller than or equal to the threshold by setting the threshold defined in the DRAT to the settable maximum value. It is defined that the MeNB triggers or transmits the BSR to the SeNB when the PDCP data amount is smaller than or equal to the threshold. Consequently, the UE can transmit the PDCP data only to the RLC for SeNB.

Processes after completion of the HO between the MeNBs without any change in the SeNB will be disclosed. After completion of the HO between the MeNBs without any change in the SeNB, the UE transmits the PDCP data not limited to the RLC for SeNB but to both the RLC for T-MeNB and the RLC for SeNB. The time after completion of the HO may be after completion of the connection between the UE and the T-MeNB. Alternatively, the time may be after completion of synchronization between the UE and the T-MeNB, after completion of the RA process between the UE and the T-MeNB, or after the UE transmits the RRC Connection Reconfiguration Complete message to the T-MeNB.

Consequently, the UE can transmit the PDCP data to both of the RLCs for the eNBs of the T-MeNB and the SeNB. After completion of the HO without any change in the SeNB, the UE can be connected to both the T-MeNB and the SeNB. Since the uplink PDCP data can be transmitted not only to the SeNB but also to the MeNB after completion of the HO, the transmission latency can be reduced.

With application of the method disclosed in the third embodiment, the entirety of the uplink PDCP data is transmitted only to the RLC for SeNB because the uplink PDCP data is not transmitted to the RLC for MeNB during the HO between the MeNBs without any change in the SeNB. Thus, the uplink PDCP data can be transmitted only to the SeNB.

While the UE is not connected to the T-MeNB during the HO, the uplink data is not accumulated in at least one of the buffers of the RLC and the MAC of the UE for MeNB. Thus, the overflow of these buffers can be prevented. Further, at least one of the capacities of the RLC and MAC buffers of the UE for MeNB can be reduced.

Fourth Embodiment

The following problems may arise if transmission and reception of the uplink data are intended between the UE and the SeNB before the UE is connected to the T-MeNB during the HO without any change in the SeNB while the split bearer is maintained.

3GPP proposes a method by which the MeNB and the SeNB perform uplink-scheduling (uplink grant) for the UE during execution of the uplink split bearer, unlike simply performing an uplink-scheduling method to correspond to a BSR value transmitted from the UE (see Non-Patent Document 11). This method is performed to avoid over-scheduling and under-scheduling from the MeNB and the SeNB to the UE.

For example, when the PDCP data amount is larger than a predetermined threshold in the DRAT, the UE transmits BSRs each including the same PDCP data amount to both the MeNB and the SeNB. When each of the MeNB and the SeNB schedules an amount of resources corresponding to a value of the BSR transmitted from the UE, the amount of resources allocated by the scheduling is double the PDCP data amount to be transmitted by the UE. In other words, the over-scheduling occurs.

To reduce such over-scheduling, there is a method by which, for example, each of the MeNB and the SeNB uplink-schedules the amount obtained by multiplying the BSR received from the UE by a predetermined rate (including 1). When the predetermined rate is 0.7, the MeNB schedules the amount obtained by multiplying the value of the BSR received by the MeNB by 0.7 for the UE. The SeNB also schedules the amount obtained by multiplying the value of the BSR received by the SeNB by 0.7 for the UE. Consequently, the over-scheduling can be reduced.

The other methods include a method for determining a predetermined ratio between the MeNB and the SeNB, and performing the uplink-scheduling according to the ratio. The ratio between the MeNB and the SeNB is, for example, 4 to 6. In the method, the MeNB schedules the amount obtained by multiplying the BSR value received from the UE by 0.4 for the UE, whereas the SeNB schedules the amount obtained by multiplying the BSR value received from the UE by 0.6 for the UE.

The other methods include, in the DRAT, a method by which the MeNB uplink-schedules an excess above the threshold to correspond to the BSR value notified from the UE and by which the SeNB uplink-schedules the amount of the threshold.

As such, a method by which the MeNB and the SeNB perform uplink-scheduling for the UE during execution of the uplink split bearer is proposed, unlike simply performing an uplink-scheduling method to correspond to a BSR value transmitted from the UE.

Without adding ingenuity to these methods, the scheduling efficiency is degraded because it is assumed that the T-MeNB performs the scheduling even before the UE is connected to the T-MeNB and the scheduling by the SeNB is restricted, during the HO without any change in the SeNB while the split bearer is maintained. The fourth embodiment will disclose a method for solving such problems.

The SeNB performs the maximum allocatable uplink-scheduling (uplink grant) to correspond to the BSR received from the UE during the HO between the MeNBs. The MeNB may not perform the uplink-scheduling during the HO between the MeNBs.

The time during the HO between the MeNBs may be after the UE is connected to the SeNB and before the UE is connected to the T-MeNB. A method for the SeNB to determine whether the UE is connected to the T-MeNB may depend on the presence or absence of receipt of the SeNB Reconfiguration Complete message from the T-MeNB. The SeNB determines that the UE is connected to the T-MeNB when receiving the SeNB Reconfiguration Complete message from the T-MeNB. Consequently, the SeNB can determine that the UE is connected to the T-MeNB.

A method for scheduling by the SeNB will be disclosed. This method is applicable when the RA process is performed between the SeNB and the UE during the HO.

The SeNB does not perform uplink-scheduling for the UE until being connected to the UE since performing a SeNB additional setting process on the T-MeNB and the UE. The "since performing a SeNB additional setting process" may be replaced with "since receiving a SeNB Addition Request message" or "since transmitting a SeNB Addition Request Ack message". The SeNB may determine whether being connected to the UE, depending on the presence or absence of execution of the RA process with the UE. The SeNB may determine whether being connected to the UE, depending on whether to synchronize with the UE.

Example methods for the SeNB to prevent the uplink-scheduling for the UE may include a method for preventing the uplink-scheduling when the SeNB does not receive the BSR from the UE.

Alternatively, the SeNB may set a grant ratio (GR) to 0 (0%). The GR is a ratio of the uplink-scheduling to the BSR. Even when the BSR value is indefinite because of being incapable of receiving the BSR from the UE or when a certain BSR value exists, setting the GR to 0 enables the amount of the uplink-scheduling to be 0 and prevention of the uplink-scheduling in internal processes of the SeNB.

The SeNB performs the maximum scheduling for the UE until receiving, from the T-MeNB, a message indicating completion of the reconfiguration of the SeNB after being connected to the UE. The time after being connected to the UE may be a time upon receipt of the BSR after being connected to the UE.

The message indicating completion of the reconfiguration of the SeNB may be the SeNB Reconfiguration Complete message.

Example methods for the SeNB to perform the maximum scheduling for the UE may include performing uplink-scheduling to correspond to the BSR from the UE assuming the GR as 1 (100%).

After receiving the message indicating completion of the reconfiguration of the SeNB from the T-MeNB, the SeNB performs uplink-scheduling to correspond to the BSR from the UE in the normal uplink-scheduling method. When the PDCP data amount is larger than or equal to the threshold in the DRAT, the uplink-scheduling is performed in a preset uplink-scheduling method. Alternatively, the uplink-scheduling may be performed with the GR set when the PDCP data amount is larger than or equal to the threshold in the DRAT.

Consequently, the SeNB can perform the maximum allocatable uplink-scheduling (uplink grant) to correspond to the BSR received from the UE during the HO between the MeNBs.

A method for scheduling by the T-MeNB will be disclosed. The T-MeNB does not perform uplink-scheduling for the UE after transmitting the HO Request Ack to the S-MeNB and before being connected to the UE.

Whether the T-MeNB is connected to the UE may be determined depending on the presence or absence of receipt of the RRC Connection Reconfiguration Complete message from the UE. Alternatively, whether the T-MeNB is connected to the UE may be determined depending on the presence or absence of execution of the RA process with the UE. Alternatively, whether the T-MeNB is connected to the UE may be determined depending on whether to synchronize with the UE.

Example methods for the T-MeNB to prevent the uplink-scheduling for the UE may include preventing the uplink-scheduling when the T-MeNB does not receive the BSR from the UE. Alternatively, the T-MeNB may set a GR to 0 (0%). Even when the BSR value is indefinite because of being incapable of receiving the BSR from the UE or when a certain BSR value exists, setting the OR to 0 enables the amount of the uplink-scheduling to be 0 and prevention of the uplink-scheduling in internal processes of the T-MeNB.

The T-MeNB performs uplink-scheduling to correspond to the BSR from the UE until notifying the SeNB of a message indicating completion of the reconfiguration, after being connected to the UE. The time after being connected to the UE may be a time upon receipt of the BSR after being connected to the UE.

Although performing the uplink-scheduling to correspond to the BSR from the UE is mentioned above, the maximum scheduling to correspond to the BSR from the UE may be performed. Example methods by which the T-MeNB performs the maximum scheduling for the UE may include uplink-scheduling to correspond to the BSR from the UE assuming the GR as 1 (100%).

Alternatively, the T-MeNB may perform uplink-scheduling to correspond to the BSR from the UE in the normal uplink-scheduling method.

When the PDCP data amount is larger than or equal to the threshold in the DRAT, the T-MeNB may perform uplink-scheduling to correspond to the BSR from the UE with the set GR or a GR of the value larger than that of the set GR.

Alternatively, the T-MeNB may perform uplink-scheduling to correspond to the BSR from the UE so that the UE can transmit the uplink data larger in amount than at least 0.

After transmitting the message indicating completion of the reconfiguration to the SeNB, the T-MeNB performs uplink-scheduling to correspond to the BSR from the UE in the normal uplink-scheduling method. When the PDCP data amount is larger than or equal to the threshold in the DRAT, the uplink-scheduling is performed in the preset uplink-scheduling method. Alternatively, the uplink-scheduling may be performed with the GR set when the PDCP data amount is larger than or equal to the threshold in the DRAT.

Consequently, the MeNBs do not perform the uplink-scheduling during the HO between the MeNBs, and the T-MeNB can perform the uplink-scheduling after being connected to the UE.

This enables the uplink data to be transmitted through the T-MeNB even when the UE is connected to the T-MeNB earlier than to the SeNB.

Although examples of the uplink-scheduling include a method by which each of the MeNB and the SeNB uplink-schedules the amount obtained by multiplying the BSR received from the UE by a predetermined rate and a method for performing the uplink-scheduling according to a predetermined ratio between the MeNB and the SeNB in the description above, such cases require adjustment on what kind of scheduling method is used between the MeNB and the SeNB. Hereinafter, the adjustment method will be disclosed.

The MeNB makes the adjustment. The T-MeNB may make the adjustment during the HO between the MeNBs. The MeNB notifies the SeNB of information on the uplink-scheduling method. The MeNB may notify the SeNB of the GR when the GR is set to the SeNB.

The MeNB may notify the information to the SeNB in a SeNB addition process as the notification method. The MeNB may include the information in a SeNB Addition Request message and notify the information. The MeNB may notify the information in a SeNB modification process. The MeNB may include the information in a SeNB Modification Request message and notify the information. In response to the notification, the SeNB may notify the MeNB of Ack that is an acknowledge signal indicating that the information can be set.

The information may be notified together with the SeNB Reconfiguration Complete message. The information may be included in the SeNB Reconfiguration Complete message and notified.

Consequently, what kind of scheduling method is used between the MeNB and the SeNB can be adjusted.

Figure 50:
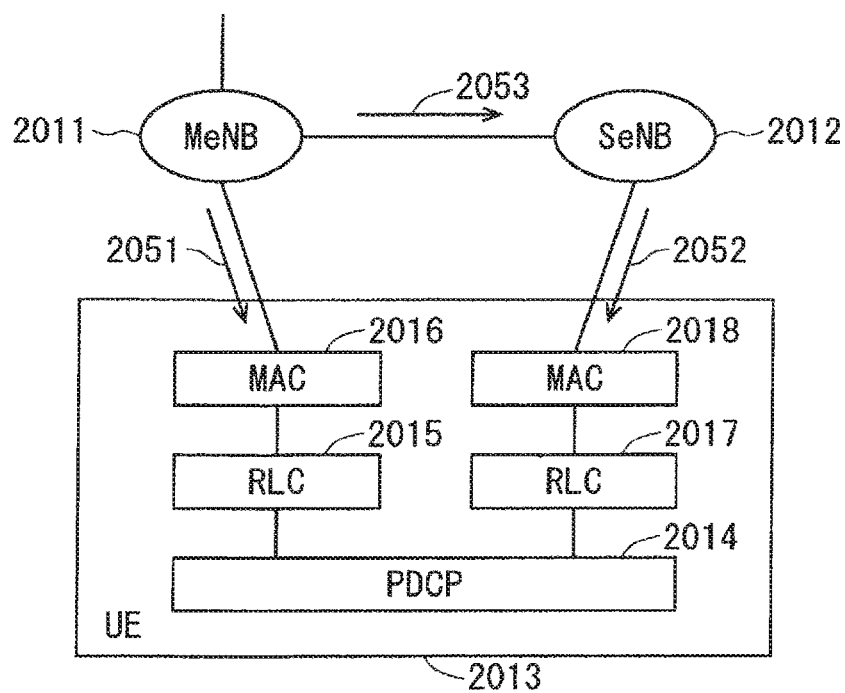
FIG. 50 illustrates an uplink-scheduling method when the conventional DRAT is set.

FIG. 50 illustrates an uplink-scheduling method when the conventional DRAT is set. FIG. 50 illustrates a case where the PDCP data amount is larger than the threshold. Since FIG. 50 is similar to FIGS. 45 and 46, the same reference numerals will be assigned to the same structures and the common description thereof will be omitted.

When the PDCP data amount is larger than the threshold, the MeNB 2011 and the SeNB 2012 notify the UE 2013 of the uplink-scheduling (uplink grant) as indicated by arrow marks 2051 and 2052 of FIG. 50, respectively. Normally, the MeNB 2011 and the SeNB 2012 perform the uplink-scheduling for the UE 2013 during execution of an uplink split bearer, according to a BSR value from the UE 2013.

None of Non-Patent Documents 1 to 11 discloses the adjustment between the MeNB 2011 and the SeNB 2012 in the uplink-scheduling. The aforementioned methods may be applied to the adjustment. When the PDCP data amount is larger than or equal to the threshold in the DRAT, for example, the MeNB 2011 sets the GR and notifies the GR to the SeNB 2012 as indicated by an arrow mark 2053. Consequently, the scheduling between the MeNB 2011 and the SeNB 2012 when the DRAT is set can be adjusted.

This method enables the uplink-scheduling, and the UE 2013 can transmit the uplink data to the MeNB 2011 and the SeNB 2012 according to the received uplink-scheduling.

Figure 51:
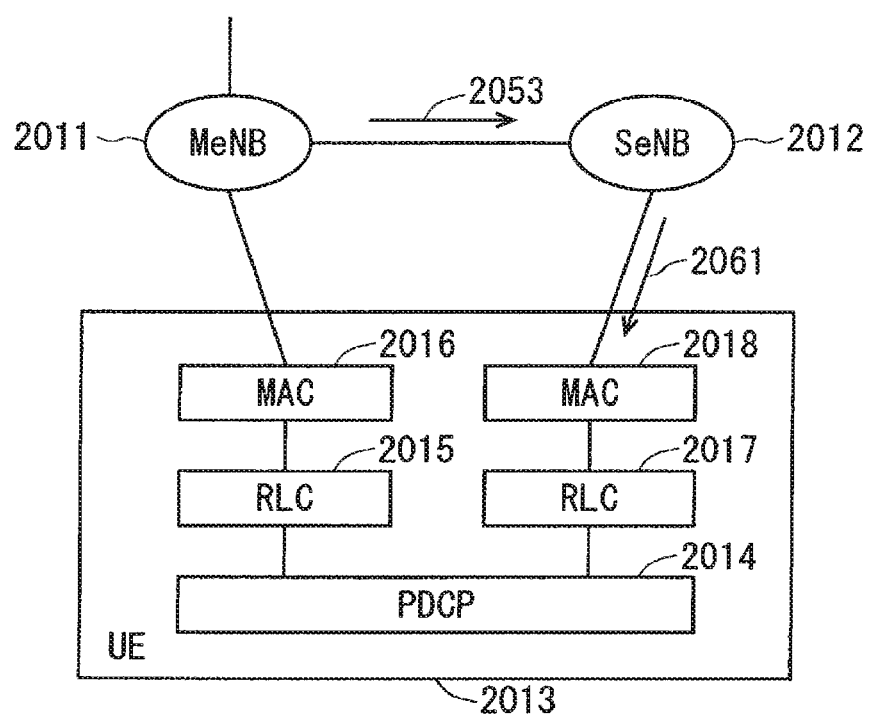
FIG. 51 illustrates an uplink-scheduling method according to a fourth embodiment.

FIG. 51 illustrates the uplink-scheduling method according to the fourth embodiment. Since FIG. 51 is similar to FIGS. 45 and 46, the same reference numerals will be assigned to the same structures and the common description thereof will be omitted.

The SeNB 2012 performs the maximum allocatable uplink-scheduling (uplink grant) to correspond to the BSR received from the UE 2013 during the HO between the MeNBs 2011 as indicated by an arrow mark 2061 of FIG. 51. The uplink-scheduling is not performed by the MeNB 2011 during the HO between the MeNBs 2011.

Consequently, the SeNB 2012 can perform the maximum allocatable uplink-scheduling to correspond to the BSR transmitted by the UE 2013 during the HO between the MeNBs 2011. Since the maximum allocatable uplink-scheduling to correspond to the BSR transmitted to the SeNB 2012 is performed, the UE 2013 can transmit the uplink data as much as possible when being connected to the SeNB 2012 during the HO between the MeNBs 2011. Without being restricted by the GR defined in the DRAT, the uplink data can be transmitted. Thus, even when the MeNB 2011 is not connected to the UE 2013, the UE 2013 can transmit the uplink data to the SeNB 2012 during the HO between the MeNBs 2011.

The aforementioned methods are applicable to adjust the information on the uplink-scheduling between the MeNB 2011 and the SeNB 2012.

Using the method disclosed in the fourth embodiment does not restrict the scheduling by the SeNB, and can prevent degradation in the scheduling efficiency.

As described above, even when each of the MeNB and the SeNB performs the uplink-scheduling differing from the normal scheduling on the UE during execution of the uplink split bearer, the scheduling by the SeNB is not restricted and degradation in the scheduling efficiency can be prevented.

Since the UE can transmit the uplink data to the SeNB earlier during the HO between the MeNBs without any change in the SeNB, latency in transmitting the uplink data can be reduced.

Another method for scheduling by the SeNB will be disclosed. This method is applicable when the SeNB already synchronizes with the UE during the HO.

The SeNB does not perform the uplink-scheduling for the UE until receiving a scheduling request (SR) from the UE since the SeNB additional setting process on the T-MeNB and the UE.

The SeNB performs the maximum scheduling for the UE until receiving, from the T-MeNB, a message indicating completion of the reconfiguration of the SeNB, after receiving the SR from the UE. The time after receiving the SR from the UE may be after receiving the SR from the UE and also the BSR.

After receiving the message indicating completion of the reconfiguration of the SeNB from the T-MeNB, the SeNB performs uplink-scheduling to correspond to the BSR from the UE in the normal uplink-scheduling method. When the PDCP data amount is larger than or equal to the threshold in the DRAT, the uplink-scheduling is performed in the preset uplink-scheduling method. Alternatively, the uplink-scheduling may be performed with the GR set when the PDCP data amount is larger than or equal to the threshold in the DRAT.

The SeNB can perform the maximum allocatable uplink-scheduling (uplink grant) to correspond to the BSR received from the UE when the SeNB already synchronizes with the UE during the HO between the MeNBs.

The connection between the SeNB and the UE may be continued during the HO between the MeNBs without any change in the SeNB, and the uplink-scheduling may be applied to such a case. The UE can transmit the uplink data to the SeNB earlier during the HO.

Another method for scheduling by the SeNB will be disclosed. This method is applicable when the SeNB receives, from the T-MeNB, a message indicating completion of the reconfiguration of the SeNB during the HO, before being connected to the UE or before receiving the SR.

Upon receipt of the message indicating completion of the reconfiguration of the SeNB from the T-MeNB before being connected to the UE or before receiving the SR, the SeNB performs uplink-scheduling to correspond to the BSR from the UE in the normal uplink-scheduling method after receiving the message indicating completion of the reconfiguration of the SeNB. When the PDCP data amount is larger than or equal to the threshold in the DRAT, the uplink-scheduling is performed in the preset uplink-scheduling method. Alternatively, the uplink-scheduling may be performed with the GR set when the PDCP data amount is larger than or equal to the threshold in the DRAT.

Consequently, the control can be clarified and a malfunction can be reduced even when the SeNB receives, from the T-MeNB, the message indicating completion of the reconfiguration of the SeNB during the HO before being connected to the UE or before receiving the SR.

3GPP is studying pre-scheduling (hereinafter referred to as "PS"). The PS is a method of scheduling, in advance, resources for uplink data for the UE without receiving the BSR from the UE.

A method of performing the PS on the SeNB in the DC will be disclosed herein. The PS in the SeNB is performed from the MeNB to the UE. The MeNB performs the PS in the SeNB on the UE.

The PS configuration of the SeNB is set between the MeNB and the SeNB. The PS configuration includes scheduling information and scheduling period, etc. The setting method will be disclosed. The MeNB issues a PS setting request of the SeNB to the SeNB. The setting request may include information on, for example, an ID of the subject UE, a setting of the subject bearer, and a Quality of Service (QoS). Upon receipt of the PS setting request, the SeNB sets the PS configuration to the subject UE. The SeNB notifies the MeNB of the PS configuration set to the subject UE. Consequently, the PS configuration of the SeNB is set between the MeNB and the SeNB.

The PS configuration may be set in the SeNB addition process between the MeNB and the SeNB. The MeNB requests the SeNB to set the PS of the SeNB using the SeNB Addition Request message. The SeNB that has set the PS configuration in response to the request notifies the MeNB of the PS configuration using the SeNB Addition Request Ack message.

Alternatively, the PS configuration may be set in the SeNB modification process between the MeNB and the SeNB. The MeNB requests the SeNB to set the PS of the SeNB using the SeNB Modification Request message. The SeNB that has set the PS configuration in response to the request notifies the MeNB of the PS configuration of the SeNB using the SeNB Modification Request Ack message.

Consequently, the PS configuration can be set using an existing message without requiring a new message for setting the PS between the MeNB and the SeNB. Thus, control over the PS setting can be simplified.

The PS configuration of the SeNB is set between the MeNB and the UE. The MeNB notifies the UE of the PS configuration set with the SeNB. The UE sets the PS configuration of the SeNB that is notified from the MeNB. The RRC signaling may be used for notifying the PS configuration from the MeNB to the UE. The PS configuration may be included in the RRC signaling for setting the SeNB, and notified from the MeNB to the UE. The amount of signaling can be reduced. The control when the UE sets the SeNB can be simplified by notifying the PS configuration together with the SeNB setting.

Alternatively, the notification may be made using MAC signaling. This is effective when the scheduling is performed by the MAC.

Alternatively, the notification may be made using a PDCCH. The scheduling information for the UE is transmitted by a PDCCH. Including also the PS configuration in the PDCCH and notifying the PS configuration facilitate the control when the UE sets the scheduling configuration.

Alternatively, the three notification methods may be combined for use. For example, part of the PS configuration is notified in one of the three notification methods, and another part of the PS configuration is notified in the other notification methods. For example, the scheduling information is notified using a PDCCH, whereas the scheduling period is notified using the RRC signaling. Consequently, the optimal notification method may be used for each piece of information on the PS configuration.

Consequently, the PS can be performed for the SeNB in the DC.

A method for performing the PS for the SeNB in the HO between the MeNBs will be disclosed. The PS in the SeNB is performed from the T-MeNB to the UE. The T-MeNB performs the PS in the SeNB on the UE. The PS configuration of the SeNB is set between the T-MeNB and the SeNB. The aforementioned methods are applicable to the setting method.

The T-MeNB notifies the UE of the PS configuration set with the SeNB. The T-MeNB may notify it to the UE through the S-MeNB. The X2 signaling may be used for this notification from the T-MeNB to the S-MeNB. For example, the PS configuration may be included in the HO Request Ack message and notified. The S-MeNB may notify it to the UE using the RRC signaling. For example, the S-MeNB may include the PS configuration in the RRC Connection Reconfiguration message and notify the PS configuration. For example, the PS configuration may be included in the RRC Connection Reconfiguration message together with the MCI, and notified. The UE sets the PS configuration of the SeNB that is received from the T-MeNB.

The UE transmits the uplink data using the resources set by the received SeNB configuration during the HO, after being connected to the SeNB. The BSR may be transmitted using the resources.

Consequently, the PS can be performed on the SeNB. The UE can transmit the uplink data to the SeNB using the PS configuration.

An uplink-scheduling method when the PS is set to the SeNB in the HO between the MeNBs without any change in the SeNB while the split bearer is maintained will be disclosed.

The SeNB follows the set PS in the uplink-scheduling for the UE since the SeNB additional setting process on the T-MeNB and the UE until receiving the SR from the UE. The SeNB performs the maximum scheduling for the UE until receiving, from the T-MeNB, a message indicating completion of the reconfiguration of the SeNB after receiving the SR from the UE. The time after receiving the SR from the UE may be a time upon receipt of the BSR after receiving the SR from the UE.

After receiving the message indicating completion of the reconfiguration of the SeNB from the T-MeNB, the SeNB performs uplink-scheduling to correspond to the BSR from the UE in the normal uplink-scheduling method. When the PDCP data amount is larger than or equal to the threshold in the DRAT, the uplink-scheduling is performed in the preset uplink-scheduling method. Alternatively, the uplink-scheduling may be performed with the GR set when the PDCP data amount is larger than or equal to the threshold in the DRAT.

As such, the UE can transmit the uplink data to the SeNB earlier by following the PS when the PS is set to the SeNB in the HO between the MeNBs without any change in the SeNB while the split bearer is maintained. Alternatively, the UE can transmit the BSR to the SeNB earlier, and then transmit the uplink data. Consequently, latency in transmitting the uplink data can be reduced.

The embodiments and the modifications are merely illustrations of the present invention and can be freely combined within the scope of the present invention. Any constituent elements of the embodiments and the modifications can be appropriately modified or omitted.

While the invention has been described in detail, the foregoing description is in all aspects illustrative and not restrictive. It is therefore understood that numerous modifications and variations can be devised without departing from the scope of the invention.

DESCRIPTION OF REFERENCES

701 coverage of macro eNB (macro cell), 702 coverage of small eNB (small cell), 703, 2013 user equipment (UE), 2011 MeNB, 2012 SeNB, 2014 PDCP, 2015, 2017 RLC, 2016, 2018 MAC.

The invention claimed is:

1. A communication system comprising:
a user equipment device; and
a plurality of base station devices configured to perform radio communication with the user equipment device,
wherein the plurality of base station devices include a plurality of large-scale base station devices each having a wide coverage in which communication with the user equipment device is possible, and a small-scale base station device having a coverage narrower than the wide coverage of the large-scale base station devices,
the user equipment device is connected to one of the plurality of large-scale base station devices and the small-scale base station device,
the user equipment device being configured to directly communicate with the one of the plurality of large-scale base station devices, and to communicate with the one of the plurality of large-scale base station devices through the small-scale base station device, and
when a handover process of switching the one of the plurality of large-scale base station devices to which the user equipment device is connected, from a moving-source large-scale base station device to a moving-target large-scale base station device is performed along with moving of the user equipment device, the user equipment device:
maintains a connection with the small-scale base station device during the handover process in response to a notification from the small-scale base station that communication between the user equipment device and the small-scale base station device will be maintained; and
starts transmitting data to the small-scale base station device before a communication path between the user equipment device and the one of the plurality of large-scale base station devices is changed from a path formed by the moving-source large-scale base station device and the user equipment device to a path formed by the moving-target large-scale base station device and the user equipment device.

2. The communication system according to claim 1, wherein the small-scale base station device transmits, to the moving-target large-scale base station device, the data received from the user equipment device before the communication path is changed and after the moving-target large-scale base station device notifies the small-scale base station device that a setting for the small-scale base station device has been completed in the user equipment device.

3. The communication system according to claim 1, wherein the small-scale base station device transmits, to the moving-target large-scale base station device, the data received from the user equipment device before the communication path is changed and before the moving-target large-scale base station device notifies the small-scale base station device that a setting of the small-scale base station device has been completed in the user equipment device.

4. The communication system according to claim 1, wherein the notification that the communication between the user equipment device and the small-scale base station device will be maintained is provided by a one-bit notification, and the one-bit notification is included in an RRC message from the small-scale base station.

* * * * *